(12) United States Patent
Shuster et al.

(10) Patent No.: US 7,424,918 B2
(45) Date of Patent: Sep. 16, 2008

(54) INTERPOSED JOINT SEALING LAYER METHOD OF FORMING A WELLBORE CASING

(75) Inventors: Mark Shuster, Houston, TX (US); Lev Ring, Houston, TX (US); Scott Costa, Kingwood, TX (US)

(73) Assignee: Enventure Global Technology, L.L.C., Houston, TX (US)

( * ) Notice: Subject to any disclaimer, the term of this patent is extended or adjusted under 35 U.S.C. 154(b) by 507 days.

(21) Appl. No.: 10/525,402

(22) PCT Filed: Aug. 18, 2003

(86) PCT No.: PCT/US03/25676

§ 371 (c)(1),
(2), (4) Date: Feb. 23, 2005

(87) PCT Pub. No.: WO2004/018823

PCT Pub. Date: Mar. 4, 2004

(65) Prior Publication Data

US 2006/0065406 A1    Mar. 30, 2006

Related U.S. Application Data

(60) Provisional application No. 60/405,394, filed on Aug. 23, 2002.

(51) Int. Cl.
*E21B 23/00* (2006.01)

(52) U.S. Cl. ............................. 166/380; 166/207

(58) Field of Classification Search .............. 166/380, 166/384, 207
See application file for complete search history.

(56) References Cited

U.S. PATENT DOCUMENTS

| 46,818 A | 3/1865 | Patterson |
|---|---|---|
| 331,940 A | 12/1885 | Bole |
| 332,184 A | 12/1885 | Bole |

(Continued)

FOREIGN PATENT DOCUMENTS

AU          767364          2/2004

(Continued)

OTHER PUBLICATIONS

Adams, "Drilling Engineering: A Complete Well Planning Approach," 1985.

(Continued)

*Primary Examiner*—William P Neuder
(74) *Attorney, Agent, or Firm*—Conley Rose, P.C.

(57) ABSTRACT

A method of forming a wellbore casing within a borehole that traverses a subterranean formation, is provided by assembling a tubular liner by coupling a multi-layer tubular insert assembly to a threaded portion of a first tubular member, and coupling a threaded portion of a second tubular member to the threaded portion of the first tubular member and the multi-layer tubular insert. The tubular liner assembly is positioned within the borehole; and the tubular liner assembly within the borehole is radially expanded and plastically deformed. The multi-layer tubular insert includes a first tubular insert having a first modulus of elasticity; and a second tubular insert coupled to the first tubular insert having a second modulus of elasticity. The first modulus of elasticity is different from the second modulus of elasticity.

69 Claims, 8 Drawing Sheets

U.S. PATENT DOCUMENTS

| | | |
|---|---|---|
| 341,237 A | 5/1886 | Healey |
| 519,805 A | 5/1894 | Bavier |
| 802,880 A | 10/1905 | Phillips, Jr. |
| 806,156 A | 12/1905 | Marshall |
| 958,517 A | 5/1910 | Mettler |
| 984,449 A | 2/1911 | Stewart |
| 1,166,040 A | 12/1915 | Burlingham |
| 1,233,888 A | 7/1917 | Leonard |
| 1,494,128 A | 5/1924 | Primrose |
| 1,589,781 A | 6/1926 | Anderson |
| 1,590,357 A | 6/1926 | Feisthamel |
| 1,597,212 A | 8/1926 | Spengler |
| 1,613,461 A | 1/1927 | Johnson |
| 1,756,531 A | 4/1930 | Aldeen et al. |
| 1,880,218 A | 10/1932 | Simmons |
| 1,981,525 A | 11/1934 | Price |
| 2,046,870 A | 7/1936 | Clasen et al. |
| 2,087,185 A | 7/1937 | Dillom |
| 2,122,757 A | 7/1938 | Scott |
| 2,145,168 A | 1/1939 | Flagg |
| 2,160,263 A | 5/1939 | Fletcher |
| 2,187,275 A | 1/1940 | McLennan |
| 2,204,586 A | 6/1940 | Grau |
| 2,211,173 A | 8/1940 | Shaffer |
| 2,214,226 A | 9/1940 | English |
| 2,226,804 A | 12/1940 | Carroll |
| 2,246,038 A | 6/1941 | Graham |
| 2,273,017 A | 2/1942 | Boynton |
| 2,301,495 A | 11/1942 | Abegg |
| 2,305,282 A | 12/1942 | Taylor, Jr. et al. |
| 2,371,840 A | 3/1945 | Otis |
| 2,383,214 A | 8/1945 | Prout |
| 2,447,629 A | 8/1948 | Beissinger et al. |
| 2,500,276 A | 3/1950 | Church |
| 2,546,295 A | 3/1951 | Boice |
| 2,583,316 A | 1/1952 | Bannister |
| 2,609,258 A | 11/1952 | Taylor, Jr. et al. |
| 2,627,891 A | 2/1953 | Clark |
| 2,647,847 A | 8/1953 | Black et al. |
| 2,664,952 A | 1/1954 | Losey |
| 2,691,418 A | 10/1954 | Connolly |
| 2,723,721 A | 11/1955 | Corsette |
| 2,734,580 A | 2/1956 | Layne |
| 2,796,134 A | 6/1957 | Binkley |
| 2,812,025 A | 11/1957 | Teague et al. |
| 2,877,822 A | 3/1959 | Buck |
| 2,907,589 A | 10/1959 | Knox |
| 2,919,741 A | 1/1960 | Strock et al. |
| 2,929,741 A | 1/1960 | Strock et al. |
| 3,015,362 A | 1/1962 | Moosman |
| 3,015,500 A | 1/1962 | Barnett |
| 3,018,547 A | 1/1962 | Marskell |
| 3,039,530 A | 6/1962 | Condra |
| 3,067,801 A | 12/1962 | Sortor |
| 3,067,819 A | 12/1962 | Gore |
| 3,068,563 A | 12/1962 | Reverman |
| 3,104,703 A | 9/1963 | Rike et al. |
| 3,111,991 A | 11/1963 | O'Neal |
| 3,167,122 A | 1/1965 | Lang |
| 3,175,618 A | 3/1965 | Lang et al. |
| 3,179,168 A | 4/1965 | Vincent |
| 3,188,816 A | 6/1965 | Koch |
| 3,191,677 A | 6/1965 | Kinley |
| 3,191,680 A | 6/1965 | Vincent |
| 3,203,451 A | 8/1965 | Vincent |
| 3,203,483 A | 8/1965 | Vincent |
| 3,209,546 A | 10/1965 | Lawton |
| 3,210,102 A | 10/1965 | Joslin |
| 3,233,315 A | 2/1966 | Levake |
| 3,245,471 A | 4/1966 | Howard |
| 3,270,817 A | 9/1966 | Papaila |
| 3,297,092 A | 1/1967 | Jennings |
| 3,326,293 A | 6/1967 | Skipper |
| 3,343,252 A | 9/1967 | Reesor |
| 3,353,599 A | 11/1967 | Swift |
| 3,354,955 A | 11/1967 | Berry |
| 3,358,760 A | 12/1967 | Blagg |
| 3,358,769 A | 12/1967 | Berry |
| 3,364,993 A | 1/1968 | Skipper |
| 3,371,717 A | 3/1968 | Chenoweth |
| 3,397,745 A | 8/1968 | Owens et al. |
| 3,412,565 A | 11/1968 | Lindsey et al. |
| 3,419,080 A | 12/1968 | Lebourg |
| 3,422,902 A | 1/1969 | Bouchillon |
| 3,424,244 A | 1/1969 | Kinley |
| 3,427,707 A | 2/1969 | Nowosadko |
| 3,463,228 A | 8/1969 | Heam |
| 3,477,506 A | 11/1969 | Malone |
| 3,489,220 A | 1/1970 | Kinley |
| 3,489,437 A | 1/1970 | Duret |
| 3,498,376 A | 3/1970 | Sizer et al. |
| 3,504,515 A | 4/1970 | Reardon |
| 3,508,771 A | 4/1970 | Duret |
| 3,520,049 A | 7/1970 | Lysenko et al. |
| 3,528,498 A | 9/1970 | Carothers |
| 3,532,174 A | 10/1970 | Diamantides et al. |
| 3,568,773 A | 3/1971 | Chancellor |
| 3,572,777 A | 3/1971 | Blose et al. |
| 3,574,357 A | 4/1971 | Alexandru et al. |
| 3,578,081 A | 5/1971 | Bodine |
| 3,579,805 A | 5/1971 | Kast |
| 3,581,817 A | 6/1971 | Kammerer, Jr. |
| 3,605,887 A | 9/1971 | Lambie |
| 3,631,926 A | 1/1972 | Young |
| 3,665,591 A | 5/1972 | Kowal |
| 3,667,547 A | 6/1972 | Ahlstone |
| 3,669,190 A | 6/1972 | Sizer et al. |
| 3,678,727 A | 7/1972 | Jackson |
| 3,682,256 A | 8/1972 | Stuart |
| 3,687,196 A | 8/1972 | Mullins |
| 3,691,624 A | 9/1972 | Kinley |
| 3,693,717 A | 9/1972 | Wuenschel |
| 3,704,730 A | 12/1972 | Witzig |
| 3,709,306 A | 1/1973 | Curington |
| 3,711,123 A | 1/1973 | Arnold |
| 3,712,376 A | 1/1973 | Owen et al. |
| 3,746,068 A | 7/1973 | Deckert et al. |
| 3,746,091 A | 7/1973 | Owen et al. |
| 3,746,092 A | 7/1973 | Land |
| 3,764,168 A | 10/1973 | Kisling, III et al. |
| 3,776,307 A | 12/1973 | Young |
| 3,779,025 A | 12/1973 | Godley et al. |
| 3,780,562 A | 12/1973 | Kinley |
| 3,781,966 A | 1/1974 | Lieberman |
| 3,785,193 A | 1/1974 | Kinely et al. |
| 3,797,259 A | 3/1974 | Kammerer, Jr. |
| 3,805,567 A | 4/1974 | Agius-Sincero |
| 3,812,912 A | 5/1974 | Wuenschel |
| 3,818,734 A | 6/1974 | Bateman |
| 3,826,124 A | 7/1974 | Baksay |
| 3,830,294 A | 8/1974 | Swanson |
| 3,830,295 A | 8/1974 | Crowe |
| 3,834,742 A | 9/1974 | McPhillips |
| 3,848,668 A | 11/1974 | Sizer et al. |
| 3,866,954 A | 2/1975 | Slator et al. |
| 3,874,446 A | 4/1975 | Crowe |
| 3,885,298 A | 5/1975 | Pogonowski |
| 3,887,006 A | 6/1975 | Pitts |
| 3,893,718 A | 7/1975 | Powell |
| 3,898,163 A | 8/1975 | Mott |
| 3,915,478 A | 10/1975 | Al et al. |
| 3,915,763 A | 10/1975 | Jennings et al. |
| 3,935,910 A | 2/1976 | Gaudy et al. |
| 3,942,824 A | 3/1976 | Sable |

| | | | | | |
|---|---|---|---|---|---|
| 3,945,444 A | 3/1976 | Knudson | 4,505,017 A | 3/1985 | Schukei |
| 3,948,321 A | 4/1976 | Owen et al. | 4,505,987 A | 3/1985 | Yamada et al. |
| 3,963,076 A | 6/1976 | Winslow | 4,506,432 A | 3/1985 | Smith |
| 3,970,336 A | 7/1976 | O'Sickey et al. | 4,507,019 A | 3/1985 | Thompson |
| 3,977,473 A | 8/1976 | Page, Jr. | 4,508,129 A | 4/1985 | Brown |
| 3,989,280 A | 11/1976 | Schwarz | 4,508,167 A | 4/1985 | Weinberg et al. |
| 3,997,193 A | 12/1976 | Tsuda et al. | 4,511,289 A | 4/1985 | Herron |
| 3,999,605 A | 12/1976 | Braddick | 4,513,995 A | 4/1985 | Niehaus et al. |
| 4,011,652 A | 3/1977 | Black | 4,519,456 A | 5/1985 | Cochran |
| 4,018,634 A | 4/1977 | Fenci | 4,526,232 A | 7/1985 | Hughson et al. |
| 4,019,579 A | 4/1977 | Thuse | 4,526,839 A | 7/1985 | Herman et al. |
| 4,026,583 A | 5/1977 | Gottlieb | 4,527,815 A | 7/1985 | Frick |
| 4,053,247 A | 10/1977 | Marsh, Jr. | 4,530,231 A | 7/1985 | Main |
| 4,069,573 A | 1/1978 | Rogers, Jr. et al. | 4,531,552 A | 7/1985 | Kim |
| 4,076,287 A | 2/1978 | Bill et al. | 4,537,429 A | 8/1985 | Landriault |
| 4,096,913 A | 6/1978 | Kenneday et al. | 4,538,442 A | 9/1985 | Reed |
| 4,098,334 A | 7/1978 | Crowe | 4,538,840 A | 9/1985 | DeLange |
| 4,099,563 A | 7/1978 | Hutchinson et al. | 4,541,655 A | 9/1985 | Hunter |
| 4,125,937 A | 11/1978 | Brown et al. | 4,550,782 A | 11/1985 | Lawson |
| 4,152,821 A | 5/1979 | Scott | 4,550,937 A | 11/1985 | Duret |
| 4,168,747 A | 9/1979 | Youmans | 4,553,776 A | 11/1985 | Dodd |
| 4,190,108 A | 2/1980 | Webber | 4,573,248 A | 3/1986 | Hackett |
| 4,204,312 A | 5/1980 | Tooker | 4,576,386 A | 3/1986 | Benson et al. |
| 4,205,422 A | 6/1980 | Hardwick | 4,581,817 A | 4/1986 | Kelly |
| 4,226,449 A | 10/1980 | Cole | 4,582,348 A | 4/1986 | Dearden et al. |
| 4,253,687 A | 3/1981 | Maples | 4,590,227 A | 5/1986 | Nakamura et al. |
| 4,257,155 A | 3/1981 | Hunter | 4,590,995 A | 5/1986 | Evans |
| 4,274,665 A | 6/1981 | Marsh, Jr. | 4,592,577 A | 6/1986 | Ayres et al. |
| RE30,802 E | 11/1981 | Rogers, Jr. | 4,595,063 A | 6/1986 | Jennings et al. |
| 4,304,428 A | 12/1981 | Grigorian et al. | 4,596,913 A | 6/1986 | Takechi |
| 4,328,983 A | 5/1982 | Gibson | 4,601,343 A | 7/1986 | Lindsey, Jr. et al. |
| 4,355,664 A | 10/1982 | Cook et al. | 4,603,889 A | 8/1986 | Welsh |
| 4,359,889 A | 11/1982 | Kelly | 4,605,063 A | 8/1986 | Ross |
| 4,363,358 A | 12/1982 | Ellis | 4,611,662 A | 9/1986 | Harrington |
| 4,366,971 A | 1/1983 | Lula | 4,614,233 A | 9/1986 | Menard |
| 4,368,571 A | 1/1983 | Cooper, Jr. | 4,629,218 A | 12/1986 | Dubois |
| 4,379,471 A | 4/1983 | Kuenzel | 4,629,224 A | 12/1986 | Landriault |
| 4,380,347 A | 4/1983 | Sable | 4,630,849 A | 12/1986 | Fukui et al. |
| 4,384,625 A | 5/1983 | Roper et al. | 4,632,944 A | 12/1986 | Thompson |
| 4,388,752 A | 6/1983 | Vinciguerra et al. | 4,634,317 A | 1/1987 | Skogberg et al. |
| 4,391,325 A | 7/1983 | Baker et al. | 4,635,333 A | 1/1987 | Finch |
| 4,393,931 A | 7/1983 | Muse et al. | 4,637,436 A | 1/1987 | Stewart, Jr. et al. |
| 4,396,061 A | 8/1983 | Tamplen et al. | 4,646,787 A | 3/1987 | Rush et al. |
| 4,397,484 A | 8/1983 | Miller | 4,649,492 A | 3/1987 | Sinha et al. |
| 4,401,325 A | 8/1983 | Tsuchiya et al. | 4,651,831 A | 3/1987 | Baugh et al. |
| 4,402,372 A | 9/1983 | Cherrington | 4,651,836 A | 3/1987 | Richards |
| 4,407,681 A | 10/1983 | Ina et al. | 4,656,779 A | 4/1987 | Fedeli |
| 4,411,435 A | 10/1983 | McStravick | 4,660,863 A | 4/1987 | Bailey et al. |
| 4,413,395 A | 11/1983 | Garnier | 4,662,446 A | 5/1987 | Brisco et al. |
| 4,413,682 A | 11/1983 | Callihan et al. | 4,669,541 A | 6/1987 | Bissonnette |
| 4,420,866 A | 12/1983 | Mueller | 4,674,572 A | 6/1987 | Gallus |
| 4,421,169 A | 12/1983 | Dearth et al. | 4,676,563 A | 6/1987 | Curlett et al. |
| 4,422,317 A | 12/1983 | Mueller | 4,682,797 A | 7/1987 | Hildner |
| 4,422,507 A | 12/1983 | Reimert | 4,685,191 A | 8/1987 | Mueller et al. |
| 4,423,889 A | 1/1984 | Weise | 4,685,834 A | 8/1987 | Jordan |
| 4,423,986 A | 1/1984 | Skogberg | 4,693,498 A | 9/1987 | Baugh et al. |
| 4,424,865 A | 1/1984 | Payton, Jr. | 4,711,474 A | 12/1987 | Patrick |
| 4,429,741 A | 2/1984 | Hyland | 4,714,117 A | 12/1987 | Dech |
| 4,440,233 A | 4/1984 | Baugh et al. | 4,730,851 A | 3/1988 | Watts |
| 4,442,586 A | 4/1984 | Ridenour | 4,732,416 A | 3/1988 | Dearden et al. |
| 4,444,250 A | 4/1984 | Keithahn et al. | 4,735,444 A | 4/1988 | Skipper |
| 4,449,713 A | 5/1984 | Ishido et al. | 4,739,654 A | 4/1988 | Pilkington et al. |
| 4,458,925 A | 7/1984 | Raulins et al. | 4,739,916 A | 4/1988 | Ayres et al. |
| 4,462,471 A | 7/1984 | Hipp | 4,754,781 A | 7/1988 | Putter |
| 4,467,630 A | 8/1984 | Kelly | 4,758,025 A | 7/1988 | Frick |
| 4,468,309 A | 8/1984 | White | 4,762,344 A | 8/1988 | Perkins et al. |
| 4,469,356 A | 9/1984 | Duret et al. | 4,776,394 A | 10/1988 | Lynde et al. |
| 4,473,245 A | 9/1984 | Raulins et al. | 4,778,088 A | 10/1988 | Miller |
| 4,483,399 A | 11/1984 | Colgate | 4,779,445 A | 10/1988 | Rabe |
| 4,485,847 A | 12/1984 | Wentzell | 4,793,382 A | 12/1988 | Szalvay |
| 4,491,001 A | 1/1985 | Yoshida | 4,796,668 A | 1/1989 | Depret |
| 4,495,073 A | 1/1985 | Beimgraben | 4,799,544 A | 1/1989 | Curlett |
| 4,501,327 A | 2/1985 | Retz | 4,817,710 A | 4/1989 | Edwards et al. |

| | | | | | |
|---|---|---|---|---|---|
| 4,817,712 A | 4/1989 | Bodine | 5,174,376 A | 12/1992 | Singeetham |
| 4,817,716 A | 4/1989 | Taylor et al. | 5,181,571 A | 1/1993 | Mueller et al. |
| 4,822,081 A | 4/1989 | Blose | 5,195,583 A | 3/1993 | Toon et al. |
| 4,825,674 A | 5/1989 | Tanaka et al. | 5,197,553 A | 3/1993 | Leturno |
| 4,826,347 A | 5/1989 | Baril et al. | 5,209,600 A | 5/1993 | Koster |
| 4,827,594 A | 5/1989 | Cartry et al. | 5,226,492 A | 7/1993 | Solaeche P. et al. |
| 4,828,033 A | 5/1989 | Frison | 5,242,017 A | 9/1993 | Hailey |
| 4,830,109 A | 5/1989 | Wedel | 5,249,628 A | 10/1993 | Surjaatmadja |
| 4,832,382 A | 5/1989 | Kapgan | 5,253,713 A | 10/1993 | Gregg et al. |
| 4,836,278 A | 6/1989 | Stone et al. | RE34,467 E | 12/1993 | Reeves |
| 4,836,579 A | 6/1989 | Wester et al. | 5,275,242 A | 1/1994 | Payne |
| 4,838,349 A | 6/1989 | Berzin | 5,282,508 A | 2/1994 | Ellingsen et al. |
| 4,842,082 A | 6/1989 | Springer | 5,286,393 A | 2/1994 | Oldiges et al. |
| 4,848,459 A | 7/1989 | Blackwell et al. | 5,306,101 A | 4/1994 | Rockower et al. |
| 4,854,338 A | 8/1989 | Grantham | 5,309,621 A | 5/1994 | O'Donnell et al. |
| 4,856,592 A | 8/1989 | Van Bilderbeek et al. | 5,314,014 A | 5/1994 | Tucker |
| 4,865,127 A | 9/1989 | Koster | 5,314,209 A | 5/1994 | Kuhne |
| 4,871,199 A | 10/1989 | Ridenour et al. | 5,318,122 A | 6/1994 | Murray et al. |
| 4,872,253 A | 10/1989 | Carstensen | 5,318,131 A | 6/1994 | Baker |
| 4,887,646 A | 12/1989 | Groves | 5,325,923 A | 7/1994 | Surjaatmadja et al. |
| 4,888,975 A | 12/1989 | Soward et al. | 5,326,137 A | 7/1994 | Lorenz et al. |
| 4,892,337 A | 1/1990 | Gunderson et al. | 5,327,964 A | 7/1994 | O'Donnell et al. |
| 4,893,658 A | 1/1990 | Kimura et al. | 5,330,850 A | 7/1994 | Suzuki et al. |
| 4,904,136 A | 2/1990 | Matsumoto | 5,332,038 A | 7/1994 | Tapp et al. |
| 4,907,828 A | 3/1990 | Change | 5,332,049 A | 7/1994 | Tew |
| 4,911,237 A | 3/1990 | Melenyzer | 5,333,692 A | 8/1994 | Baugh et al. |
| 4,913,758 A | 4/1990 | Koster | 5,335,736 A | 8/1994 | Windsor |
| 4,915,177 A | 4/1990 | Claycomb | 5,337,808 A | 8/1994 | Graham |
| 4,915,426 A | 4/1990 | Skipper | 5,337,823 A | 8/1994 | Nobileau |
| 4,917,409 A | 4/1990 | Reeves | 5,337,827 A | 8/1994 | Hromas et al. |
| 4,919,989 A | 4/1990 | Colangelo | 5,339,894 A | 8/1994 | Stotler |
| 4,921,045 A | 5/1990 | Richardson | 5,343,949 A | 9/1994 | Ross et al. |
| 4,924,949 A | 5/1990 | Curlett | 5,346,007 A | 9/1994 | Dillon et al. |
| 4,930,573 A | 6/1990 | Lane et al. | 5,348,087 A | 9/1994 | Williamson, Jr. |
| 4,934,038 A | 6/1990 | Caudill | 5,348,093 A | 9/1994 | Wood et al. |
| 4,934,312 A | 6/1990 | Koster et al. | 5,348,095 A | 9/1994 | Worrall et al. |
| 4,938,291 A | 7/1990 | Lynde et al. | 5,348,668 A | 9/1994 | Oldiges et al. |
| 4,941,512 A | 7/1990 | McParland | 5,351,752 A | 10/1994 | Wood et al. |
| 4,941,532 A | 7/1990 | Hurt et al. | 5,360,239 A | 11/1994 | Klementich |
| 4,942,925 A | 7/1990 | Themig | 5,360,292 A | 11/1994 | Allen et al. |
| 4,942,926 A | 7/1990 | Lessi | 5,361,836 A | 11/1994 | Sorem et al. |
| 4,958,691 A | 9/1990 | Hipp | 5,361,843 A | 11/1994 | Shy et al. |
| 4,968,184 A | 11/1990 | Reid | 5,366,010 A | 11/1994 | Zwart |
| 4,971,152 A | 11/1990 | Koster et al. | 5,366,012 A | 11/1994 | Lohbeck |
| 4,976,322 A | 12/1990 | Abdrakhmanov et al. | 5,368,075 A | 11/1994 | Bäro et al. |
| 4,981,250 A | 1/1991 | Persson | 5,370,425 A | 12/1994 | Dougherty et al. |
| 4,995,464 A | 2/1991 | Watkins et al. | 5,375,661 A | 12/1994 | Daneshy et al. |
| 5,014,779 A | 5/1991 | Meling et al. | 5,388,648 A | 2/1995 | Jordan, Jr. |
| 5,015,017 A | 5/1991 | Geary | 5,390,735 A | 2/1995 | Williamson, Jr. |
| 5,026,074 A | 6/1991 | Hoes et al. | 5,390,742 A | 2/1995 | Dines et al. |
| 5,031,370 A | 7/1991 | Jewett | 5,396,957 A | 3/1995 | Surjaatmadja et al. |
| 5,031,699 A | 7/1991 | Artynov et al. | 5,400,827 A | 3/1995 | Baro et al. |
| 5,040,283 A | 8/1991 | Pelgrom | 5,405,171 A | 4/1995 | Allen et al. |
| 5,044,676 A | 9/1991 | Burton et al. | 5,411,301 A | 5/1995 | Moyer et al. |
| 5,048,871 A | 9/1991 | Pfeiffer et al. | 5,413,180 A | 5/1995 | Ross et al. |
| 5,052,483 A | 10/1991 | Hudson | 5,419,595 A | 5/1995 | Yamamoto et al. |
| 5,059,043 A | 10/1991 | Kuhne | 5,425,559 A | 6/1995 | Nobileau |
| 5,064,004 A | 11/1991 | Lundel | 5,426,130 A | 6/1995 | Thurder et al. |
| 5,079,837 A | 1/1992 | Vanselow | 5,431,831 A | 7/1995 | Vincent |
| 5,083,608 A | 1/1992 | Abdrakhmanov et al. | 5,435,395 A | 7/1995 | Connell |
| 5,093,015 A | 3/1992 | Oldiges | 5,439,320 A | 8/1995 | Abrams |
| 5,095,991 A | 3/1992 | Milberger | 5,443,129 A | 8/1995 | Bailey et al. |
| 5,097,710 A | 3/1992 | Palynchuk | 5,447,201 A | 9/1995 | Mohn |
| 5,101,653 A | 4/1992 | Hermes et al. | 5,454,419 A | 10/1995 | Vloedman |
| 5,105,888 A | 4/1992 | Pollock et al. | 5,456,319 A | 10/1995 | Schmidt et al. |
| 5,107,221 A | 4/1992 | N'Guyen et al. | 5,458,194 A | 10/1995 | Brooks |
| 5,119,661 A | 6/1992 | Abdrakhmanov et al. | 5,462,120 A | 10/1995 | Gondouin |
| 5,134,891 A | 8/1992 | Canevet | 5,467,822 A | 11/1995 | Zwart |
| 5,150,755 A | 9/1992 | Cassel et al. | 5,472,055 A | 12/1995 | Simson et al. |
| 5,156,043 A | 10/1992 | Ose | 5,474,334 A | 12/1995 | Eppink |
| 5,156,213 A | 10/1992 | George et al. | 5,492,173 A | 2/1996 | Kilgore et al. |
| 5,156,223 A | 10/1992 | Hipp | 5,494,106 A | 2/1996 | Gueguen et al. |
| 5,174,340 A | 12/1992 | Peterson et al. | 5,507,343 A | 4/1996 | Carlton et al. |

| Patent | Kind | Date | Inventor |
|---|---|---|---|
| 5,511,620 | A | 4/1996 | Baugh et al. |
| 5,524,937 | A | 6/1996 | Sides, III et al. |
| 5,535,824 | A | 7/1996 | Hudson |
| 5,536,422 | A | 7/1996 | Oldiges et al. |
| 5,540,281 | A | 7/1996 | Round |
| 5,554,244 | A | 9/1996 | Ruggles et al. |
| 5,566,772 | A | 10/1996 | Coone et al. |
| 5,567,335 | A | 10/1996 | Baessler et al. |
| 5,576,485 | A | 11/1996 | Serata |
| 5,584,512 | A | 12/1996 | Carstensen |
| 5,606,792 | A | 3/1997 | Schafer |
| 5,611,399 | A | 3/1997 | Richard et al. |
| 5,613,557 | A | 3/1997 | Blount et al. |
| 5,617,918 | A | 4/1997 | Cooksey et al. |
| 5,642,560 | A | 7/1997 | Tabuchi et al. |
| 5,642,781 | A | 7/1997 | Richard |
| 5,662,180 | A | 9/1997 | Coffman et al. |
| 5,664,327 | A | 9/1997 | Swars |
| 5,667,011 | A | 9/1997 | Gill et al. |
| 5,667,252 | A | 9/1997 | Schafer et al. |
| 5,678,609 | A | 10/1997 | Washburn |
| 5,685,369 | A | 11/1997 | Ellis et al. |
| 5,689,871 | A | 11/1997 | Carstensen |
| 5,695,008 | A | 12/1997 | Bertet et al. |
| 5,695,009 | A | 12/1997 | Hipp |
| 5,697,442 | A | 12/1997 | Baldridge |
| 5,697,449 | A | 12/1997 | Hennig et al. |
| 5,718,288 | A | 2/1998 | Bertet et al. |
| 5,738,146 | A | 4/1998 | Abe |
| 5,743,335 | A | 4/1998 | Bussear |
| 5,749,419 | A | 5/1998 | Coronado et al. |
| 5,749,585 | A | 5/1998 | Lembcke |
| 5,755,895 | A | 5/1998 | Tamehiro et al. |
| 5,775,422 | A | 7/1998 | Wong et al. |
| 5,785,120 | A | 7/1998 | Smalley et al. |
| 5,787,933 | A | 8/1998 | Russ et al. |
| 5,791,419 | A | 8/1998 | Valisalo |
| 5,794,702 | A | 8/1998 | Nobileau |
| 5,797,454 | A | 8/1998 | Hipp |
| 5,829,520 | A | 11/1998 | Johnson |
| 5,829,524 | A | 11/1998 | Flanders et al. |
| 5,829,797 | A | 11/1998 | Yamamoto et al. |
| 5,833,001 | A | 11/1998 | Song et al. |
| 5,845,945 | A | 12/1998 | Carstensen |
| 5,849,188 | A | 12/1998 | Voll et al. |
| 5,857,524 | A | 1/1999 | Harris |
| 5,862,866 | A | 1/1999 | Springer |
| 5,875,851 | A | 3/1999 | Vick, Jr. et al. |
| 5,885,941 | A | 3/1999 | Sateva et al. |
| 5,895,079 | A | 4/1999 | Carstensen et al. |
| 5,901,789 | A | 5/1999 | Donnelly et al. |
| 5,918,677 | A | 7/1999 | Head |
| 5,924,745 | A | 7/1999 | Campbell |
| 5,931,511 | A | 8/1999 | DeLange et al. |
| 5,933,945 | A | 8/1999 | Thomeer et al. |
| 5,944,100 | A | 8/1999 | Hipp |
| 5,944,107 | A | 8/1999 | Ohmer |
| 5,944,108 | A | 8/1999 | Baugh et al. |
| 5,951,207 | A | 9/1999 | Chen |
| 5,957,195 | A | 9/1999 | Bailey et al. |
| 5,964,288 | A | 10/1999 | Leighton et al. |
| 5,971,443 | A | 10/1999 | Noel et al. |
| 5,975,587 | A | 11/1999 | Wood et al. |
| 5,979,560 | A | 11/1999 | Nobileau |
| 5,984,369 | A | 11/1999 | Crook et al. |
| 5,984,568 | A | 11/1999 | Lohbeck |
| 6,009,611 | A | 1/2000 | Richardson et al. |
| 6,012,521 | A | 1/2000 | Zunkel et al. |
| 6,012,522 | A | 1/2000 | Donnelly et al. |
| 6,012,523 | A | 1/2000 | Campbell et al. |
| 6,012,874 | A | 1/2000 | Groneck et al. |
| 6,015,012 | A | 1/2000 | Reddick |
| 6,017,168 | A | 1/2000 | Fraser et al. |
| 6,021,850 | A | 2/2000 | Woo et al. |
| 6,027,145 | A | 2/2000 | Tsuru et al. |
| 6,029,748 | A | 2/2000 | Forsyth et al. |
| 6,035,954 | A | 3/2000 | Hipp |
| 6,044,906 | A | 4/2000 | Saltel |
| 6,047,505 | A | 4/2000 | Willow |
| 6,047,774 | A | 4/2000 | Allen |
| 6,050,341 | A | 4/2000 | Metcalf |
| 6,050,346 | A | 4/2000 | Hipp |
| 6,056,059 | A | 5/2000 | Ohmer |
| 6,056,324 | A | 5/2000 | Reimert et al. |
| 6,062,324 | A | 5/2000 | Hipp |
| 6,065,500 | A | 5/2000 | Metcalfe |
| 6,070,671 | A | 6/2000 | Cumming et al. |
| 6,073,332 | A | 6/2000 | Turner |
| 6,073,692 | A | 6/2000 | Wood et al. |
| 6,073,698 | A | 6/2000 | Shultz et al. |
| 6,074,133 | A | 6/2000 | Kelsey |
| 6,078,031 | A | 6/2000 | Bliault et al. |
| 6,079,495 | A | 6/2000 | Ohmer |
| 6,085,838 | A | 7/2000 | Vercaemer et al. |
| 6,089,320 | A | 7/2000 | LaGrange |
| 6,098,717 | A | 8/2000 | Bailey et al. |
| 6,102,119 | A | 8/2000 | Raines |
| 6,109,355 | A | 8/2000 | Reid |
| 6,112,818 | A | 9/2000 | Campbell |
| 6,131,265 | A | 10/2000 | Bird |
| 6,135,208 | A | 10/2000 | Gano et al. |
| 6,138,761 | A | 10/2000 | Freeman et al. |
| 6,142,230 | A | 11/2000 | Smalley et al. |
| 6,155,613 | A | 12/2000 | Quadflieg et al. |
| 6,158,785 | A | 12/2000 | Beaulier et al. |
| 6,158,963 | A | 12/2000 | Hollis |
| 6,167,970 | B1 | 1/2001 | Stout |
| 6,182,775 | B1 | 2/2001 | Hipp |
| 6,196,336 | B1 | 3/2001 | Fincher et al. |
| 6,220,306 | B1 | 4/2001 | Omura et al. |
| 6,226,855 | B1 | 5/2001 | Maine |
| 6,231,086 | B1 | 5/2001 | Tierling |
| 6,237,967 | B1 | 5/2001 | Yamamoto et al. |
| 6,250,385 | B1 | 6/2001 | Montaron |
| 6,253,846 | B1 | 7/2001 | Nazzai et al. |
| 6,253,850 | B1 | 7/2001 | Nazzai et al. |
| 6,263,966 | B1 | 7/2001 | Haut et al. |
| 6,263,968 | B1 | 7/2001 | Freeman et al. |
| 6,263,972 | B1 | 7/2001 | Richard et al. |
| 6,267,181 | B1 | 7/2001 | Rhein-Knudsen et al. |
| 6,273,634 | B1 | 8/2001 | Lohbeck |
| 6,275,556 | B1 | 8/2001 | Kinney et al. |
| 6,283,211 | B1 | 9/2001 | Vloedman |
| 6,286,558 | B1 | 9/2001 | Quigley et al. |
| 6,302,211 | B1 | 10/2001 | Nelson et al. |
| 6,311,792 | B1 | 11/2001 | Scott et al. |
| 6,315,040 | B1 | 11/2001 | Donnelly |
| 6,315,043 | B1 | 11/2001 | Farrant et al. |
| 6,318,457 | B1 | 11/2001 | Den Boer et al. |
| 6,318,465 | B1 | 11/2001 | Coon et al. |
| 6,322,109 | B1 | 11/2001 | Campbell et al. |
| 6,325,148 | B1 | 12/2001 | Trahan et al. |
| 6,328,113 | B1 | 12/2001 | Cook |
| 6,334,351 | B1 | 1/2002 | Tsuchiya |
| 6,343,495 | B1 | 2/2002 | Cheppe et al. |
| 6,343,657 | B1 | 2/2002 | Baugh et al. |
| 6,345,373 | B1 | 2/2002 | Chakradhar et al. |
| 6,345,431 | B1 | 2/2002 | Greig |
| 6,352,112 | B1 | 3/2002 | Mills |
| 6,354,373 | B1 | 3/2002 | Vercaemer et al. |
| 6,390,720 | B1 | 5/2002 | LeBegue et al. |
| 6,405,761 | B1 | 6/2002 | Shimizu et al. |
| 6,406,063 | B1 | 6/2002 | Pfeiffer |
| 6,409,175 | B1 | 6/2002 | Evans et al. |
| 6,419,025 | B1 | 7/2002 | Lohbeck et al. |
| 6,419,026 | B1 | 7/2002 | MacKenzie et al. |

| | | | | | | |
|---|---|---|---|---|---|---|
| 6,419,033 B1 | 7/2002 | Hahn et al. | | 6,719,064 B2 | 4/2004 | Price-Smith et al. |
| 6,419,147 B1 | 7/2002 | Daniel | | 6,722,427 B2 | 4/2004 | Gano et al. |
| 6,425,444 B1 | 7/2002 | Metcalfe et al. | | 6,722,437 B2 | 4/2004 | Vercaemer et al. |
| 6,431,277 B1 | 8/2002 | Cox et al. | | 6,722,443 B1 | 4/2004 | Metcalfe |
| 6,443,247 B1 | 9/2002 | Wardley | | 6,725,917 B2 | 4/2004 | Metcalfe |
| 6,446,724 B2 | 9/2002 | Baugh et al. | | 6,725,919 B2 | 4/2004 | Cook et al. |
| 6,447,025 B1 | 9/2002 | Smith | | 6,725,934 B2 | 4/2004 | Coronado et al. |
| 6,450,261 B1 | 9/2002 | Baugh | | 6,725,939 B2 | 4/2004 | Richard |
| 6,454,013 B1 | 9/2002 | Metcalfe | | 6,732,806 B2 | 5/2004 | Mauldin et al. |
| 6,454,024 B1 | 9/2002 | Nackerud | | 6,739,392 B2 | 5/2004 | Cook et al. |
| 6,457,532 B1 | 10/2002 | Simpson | | 6,745,845 B2 | 6/2004 | Cook et al. |
| 6,457,533 B1 | 10/2002 | Metcalfe | | 6,755,447 B2 | 6/2004 | Galle, Jr. et al. |
| 6,457,749 B1 | 10/2002 | Heijnen | | 6,758,278 B2 | 7/2004 | Cook et al. |
| 6,460,615 B1 | 10/2002 | Heijnen | | 6,772,841 B2 | 8/2004 | Gano |
| 6,464,008 B1 | 10/2002 | Roddy et al. | | 6,796,380 B2 | 9/2004 | Xu |
| 6,464,014 B1 | 10/2002 | Bernat | | 6,814,147 B2 | 11/2004 | Baugh |
| 6,470,966 B2 | 10/2002 | Cook et al. | | 6,817,633 B2 | 11/2004 | Brill et al. |
| 6,470,996 B1 | 10/2002 | Kyle et al. | | 6,820,690 B2 | 11/2004 | Vercaemer et al. |
| 6,478,092 B2 | 11/2002 | Voll et al. | | 6,823,937 B1 | 11/2004 | Cook et al. |
| 6,491,108 B1 | 12/2002 | Slup et al. | | 6,832,649 B2 | 12/2004 | Bode et al. |
| 6,497,289 B1 | 12/2002 | Cook et al. | | 6,834,725 B2 | 12/2004 | Whanger et al. |
| 6,516,887 B2 | 2/2003 | Nguyen et al. | | 6,843,322 B2 | 1/2005 | Burtner et al. |
| 6,517,126 B1 | 2/2003 | Peterson et al. | | 6,857,473 B2 | 2/2005 | Cook et al. |
| 6,527,049 B2 | 3/2003 | Metcalfe et al. | | 6,880,632 B2 | 4/2005 | Tom et al. |
| 6,543,545 B1 | 4/2003 | Chatterji et al. | | 6,892,819 B2 | 5/2005 | Cook et al. |
| 6,543,552 B1 | 4/2003 | Metcalfe et al. | | 6,902,000 B2 | 6/2005 | Simpson et al. |
| 6,550,539 B2 | 4/2003 | Maguire et al. | | 6,907,652 B1 | 6/2005 | Heijnen |
| 6,550,821 B2 | 4/2003 | DeLange et al. | | 6,923,261 B2 | 8/2005 | Metcalfe et al. |
| 6,557,640 B1 | 5/2003 | Cook et al. | | 6,935,429 B2 | 8/2005 | Badrack |
| 6,557,906 B1 | 5/2003 | Carcagno | | 6,935,430 B2 | 8/2005 | Harrall et al. |
| 6,561,227 B2 | 5/2003 | Cook et al. | | 6,966,370 B2 | 11/2005 | Cook et al. |
| 6,561,279 B2 | 5/2003 | MacKenzie et al. | | 6,976,539 B2 | 12/2005 | Metcalfe et al. |
| 6,564,875 B1 | 5/2003 | Bullock | | 6,976,541 B2 | 12/2005 | Brisco et al. |
| 6,568,471 B1 | 5/2003 | Cook et al. | | 7,000,953 B2 | 2/2006 | Berghaus |
| 6,568,488 B2 | 5/2003 | Wentworth et al. | | 7,007,760 B2 | 3/2006 | Lohbeck |
| 6,575,240 B1 | 6/2003 | Cook et al. | | 7,021,390 B2 | 4/2006 | Cook et al. |
| 6,578,630 B2 | 6/2003 | Simpson et al. | | 7,036,582 B2 | 5/2006 | Cook et al. |
| 6,585,053 B2 | 7/2003 | Coon | | 7,077,211 B2 | 7/2006 | Cook et al. |
| 6,585,299 B1 | 7/2003 | Quadflieg et al. | | 7,077,213 B2 | 7/2006 | Cook et al. |
| 6,591,905 B2 | 7/2003 | Coon | | 7,086,475 B2 | 8/2006 | Cook |
| 6,598,677 B1 | 7/2003 | Baugh et al. | | 7,100,685 B2 | 9/2006 | Cook et al. |
| 6,598,678 B1 | 7/2003 | Simpson | | 7,121,337 B2 | 10/2006 | Cook et al. |
| 6,604,763 B1 | 8/2003 | Cook et al. | | 7,121,352 B2 | 10/2006 | Cook et al. |
| 6,607,220 B2 | 8/2003 | Sivley, IV | | 7,195,073 B2 * | 3/2007 | Fraser, III .................. 166/380 |
| 6,609,735 B1 | 8/2003 | DeLange et al. | | 2001/0002626 A1 | 6/2001 | Frank et al. |
| 6,619,696 B2 | 9/2003 | Baugh et al. | | 2001/0020532 A1 | 9/2001 | Baugh et al. |
| 6,622,797 B2 | 9/2003 | Sivley, IV | | 2001/0045284 A1 | 11/2001 | Simpson et al. |
| 6,629,567 B2 | 10/2003 | Lauritzen et al. | | 2001/0045289 A1 | 11/2001 | Cook et al. |
| 6,631,759 B2 | 10/2003 | Cook et al. | | 2001/0047870 A1 | 12/2001 | Cook et al. |
| 6,631,760 B2 | 10/2003 | Cook et al. | | 2002/0011339 A1 | 1/2002 | Murray |
| 6,631,765 B2 | 10/2003 | Baugh et al. | | 2002/0014339 A1 | 2/2002 | Ross |
| 6,631,769 B2 | 10/2003 | Cook et al. | | 2002/0020524 A1 | 2/2002 | Gano |
| 6,634,431 B2 | 10/2003 | Cook et al. | | 2002/0020531 A1 | 2/2002 | Ohmer |
| 6,640,895 B2 | 11/2003 | Murray | | 2002/0033261 A1 | 3/2002 | Metcalfe |
| 6,640,903 B1 | 11/2003 | Cook et al. | | 2002/0060068 A1 | 5/2002 | Cook et al. |
| 6,648,075 B2 | 11/2003 | Badrak et al. | | 2002/0062956 A1 | 5/2002 | Murray et al. |
| 6,659,509 B2 | 12/2003 | Goto et al. | | 2002/0066576 A1 | 6/2002 | Cook et al. |
| 6,662,876 B2 | 12/2003 | Lauritzen | | 2002/0066578 A1 | 6/2002 | Broome |
| 6,668,937 B1 | 12/2003 | Murray | | 2002/0070023 A1 | 6/2002 | Turner et al. |
| 6,672,759 B2 | 1/2004 | Feger | | 2002/0070031 A1 | 6/2002 | Voll et al. |
| 6,679,328 B2 | 1/2004 | Davis et al. | | 2002/0079101 A1 | 6/2002 | Baugh et al. |
| 6,681,862 B2 | 1/2004 | Freeman | | 2002/0084070 A1 | 7/2002 | Voll et al. |
| 6,684,947 B2 | 2/2004 | Cook et al. | | 2002/0092654 A1 | 7/2002 | Coronado et al. |
| 6,688,397 B2 | 2/2004 | McClurkin et al. | | 2002/0108756 A1 | 8/2002 | Harrall et al. |
| 6,695,012 B1 | 2/2004 | Ring et al. | | 2002/0139540 A1 | 10/2002 | Lauritzen |
| 6,695,065 B2 | 2/2004 | Simpson et al. | | 2002/0144822 A1 | 10/2002 | Hackworth et al. |
| 6,698,517 B2 | 3/2004 | Simpson | | 2002/0148612 A1 | 10/2002 | Cook et al. |
| 6,701,598 B2 | 3/2004 | Chen et al. | | 2002/0185274 A1 | 12/2002 | Simpson et al. |
| 6,702,030 B2 | 3/2004 | Simpson | | 2002/0189816 A1 | 12/2002 | Cook et al. |
| 6,705,395 B2 | 3/2004 | Cook et al. | | 2002/0195252 A1 | 12/2002 | Maguire et al. |
| 6,708,767 B2 | 3/2004 | Harrall et al. | | 2002/0195256 A1 | 12/2002 | Metcalfe et al. |
| 6,712,154 B2 | 3/2004 | Cook et al. | | 2003/0024708 A1 | 2/2003 | Ring et al. |
| 6,712,401 B2 | 3/2004 | Coulon et al. | | 2003/0024711 A1 | 2/2003 | Simpson et al. |

| | | | | | | |
|---|---|---|---|---|---|---|
| 2003/0034177 A1 | 2/2003 | Chitwood et al. | | 2005/0150098 A1 | 7/2005 | Cook et al. |
| 2003/0042022 A1 | 3/2003 | Lauritzen et al. | | 2005/0150660 A1 | 7/2005 | Cook et al. |
| 2003/0047322 A1 | 3/2003 | Maguire et al. | | 2005/0161228 A1 | 7/2005 | Cook et al. |
| 2003/0047323 A1 | 3/2003 | Jackson et al. | | 2005/0166387 A1 | 8/2005 | Cook et al. |
| 2003/0056991 A1 | 3/2003 | Hahn et al. | | 2005/0166388 A1 | 8/2005 | Cook et al. |
| 2003/0066655 A1 | 4/2003 | Cook et al. | | 2005/0173108 A1 | 8/2005 | Cook et al. |
| 2003/0067166 A1 | 4/2003 | Maguire | | 2005/0175473 A1 | 8/2005 | Cook et al. |
| 2003/0075337 A1 | 4/2003 | Sivley, IV | | 2005/0183863 A1 | 8/2005 | Cook et al. |
| 2003/0075338 A1 | 4/2003 | Sivley, IV | | 2005/0199385 A1 * | 9/2005 | Metcalfe .................... 166/206 |
| 2003/0075339 A1 | 4/2003 | Gano et al. | | 2005/0205253 A1 | 9/2005 | Cook et al. |
| 2003/0094277 A1 | 5/2003 | Cook et al. | | 2005/0217768 A1 | 10/2005 | Asahi et al. |
| 2003/0094278 A1 | 5/2003 | Cook et al. | | 2005/0217865 A1 | 10/2005 | Ring et al. |
| 2003/0094279 A1 | 5/2003 | Ring et al. | | 2005/0217866 A1 | 10/2005 | Watson et al. |
| 2003/0098154 A1 | 5/2003 | Cook et al. | | 2005/0223535 A1 | 10/2005 | Cook et al. |
| 2003/0098162 A1 | 5/2003 | Cook | | 2005/0224225 A1 | 10/2005 | Cook et al. |
| 2003/0107217 A1 | 6/2003 | Daigle et al. | | 2005/0230102 A1 | 10/2005 | Cook et al. |
| 2003/0111234 A1 | 6/2003 | McClurkin et al. | | 2005/0230103 A1 | 10/2005 | Cook et al. |
| 2003/0116318 A1 | 6/2003 | Metcalfe | | 2005/0230104 A1 | 10/2005 | Cook et al. |
| 2003/0116325 A1 | 6/2003 | Cook et al. | | 2005/0230123 A1 | 10/2005 | Cook et al. |
| 2003/0121558 A1 | 7/2003 | Cook et al. | | 2005/0236159 A1 | 10/2005 | Cook et al. |
| 2003/0121655 A1 | 7/2003 | Lauritzen et al. | | 2005/0236163 A1 | 10/2005 | Cook et al. |
| 2003/0121669 A1 | 7/2003 | Cook et al. | | 2005/0244578 A1 | 11/2005 | Van Egmond et al. |
| 2003/0140673 A1 | 7/2003 | Marr et al. | | 2005/0246883 A1 | 11/2005 | Alliot et al. |
| 2003/0150608 A1 | 8/2003 | Smith, Jr. et al. | | 2005/0247453 A1 | 11/2005 | Shuster et al. |
| 2003/0168222 A1 | 9/2003 | Maguire et al. | | 2005/0265788 A1 | 12/2005 | Renkema |
| 2003/0173090 A1 | 9/2003 | Cook et al. | | 2005/0269107 A1 | 12/2005 | Cook et al. |
| 2003/0192705 A1 | 10/2003 | Cook et al. | | 2006/0027371 A1 | 2/2006 | Gorrara |
| 2003/0221841 A1 | 12/2003 | Burtner et al. | | 2006/0032640 A1 | 2/2006 | Costa et al. |
| 2003/0222455 A1 | 12/2003 | Cook et al. | | 2006/0048948 A1 | 3/2006 | Noel |
| 2004/0011534 A1 | 1/2004 | Simonds et al. | | 2006/0054330 A1 | 3/2006 | Metcalfe et al. |
| 2004/0045616 A1 | 3/2004 | Cook et al. | | 2006/0065403 A1 | 3/2006 | Watson et al. |
| 2004/0045718 A1 | 3/2004 | Brisco et al. | | 2006/0065406 A1 | 3/2006 | Shuster et al. |
| 2004/0060706 A1 | 4/2004 | Stephenson | | 2006/0096762 A1 | 5/2006 | Brisco |
| 2004/0065446 A1 | 4/2004 | Tran et al. | | 2006/0102360 A1 | 5/2006 | Brisco et al. |
| 2004/0069499 A1 | 4/2004 | Cook et al. | | 2006/0112768 A1 | 6/2006 | Shuster et al. |
| 2004/0112589 A1 | 6/2004 | Cook et al. | | 2006/0113086 A1 | 6/2006 | Costa et al. |
| 2004/0112606 A1 | 6/2004 | Lewis et al. | | | | |
| 2004/0118574 A1 | 6/2004 | Cook et al. | | | FOREIGN PATENT DOCUMENTS | |
| 2004/0123983 A1 | 7/2004 | Cook et al. | | AU | 773168 | 5/2004 |
| 2004/0123988 A1 | 7/2004 | Cook et al. | | AU | 770008 | 7/2004 |
| 2004/0129431 A1 | 7/2004 | Jackson | | AU | 770359 | 7/2004 |
| 2004/0149431 A1 | 8/2004 | Wylie et al. | | AU | 771884 | 8/2004 |
| 2004/0159446 A1 | 8/2004 | Haugen et al. | | AU | 776580 | 1/2005 |
| 2004/0188099 A1 | 9/2004 | Cook et al. | | AU | 780123 | 3/2005 |
| 2004/0194966 A1 | 10/2004 | Zimmerman | | AU | 2001269810 | 8/2005 |
| 2004/0216873 A1 | 11/2004 | Frost, Jr. et al. | | AU | 782901 | 9/2005 |
| 2004/0221996 A1 | 11/2004 | Burge | | AU | 783245 | 10/2005 |
| 2004/0231839 A1 | 11/2004 | Ellington et al. | | AU | 2001294802 | 10/2005 |
| 2004/0231855 A1 | 11/2004 | Cook et al. | | AU | 2001283026 | 7/2006 |
| 2004/0238181 A1 | 12/2004 | Cook et al. | | AU | 2002239857 | 8/2006 |
| 2004/0244968 A1 | 12/2004 | Cook et al. | | CA | 736288 | 6/1966 |
| 2004/0262014 A1 | 12/2004 | Cook et al. | | CA | 771462 | 11/1967 |
| 2005/0011641 A1 | 1/2005 | Cook et al. | | CA | 1171310 | 7/1984 |
| 2005/0015963 A1 | 1/2005 | Costa et al. | | CA | 2292171 | 6/2000 |
| 2005/0028988 A1 | 2/2005 | Cook et al. | | CA | 2298139 | 8/2000 |
| 2005/0039910 A1 | 2/2005 | Lohbeck | | CA | 2234386 | 3/2003 |
| 2005/0039928 A1 | 2/2005 | Cook et al. | | CA | 2414449 | 9/2006 |
| 2005/0045324 A1 | 3/2005 | Cook et al. | | DE | 174521 | 4/1953 |
| 2005/0045341 A1 | 3/2005 | Cook et al. | | DE | 2458188 | 6/1975 |
| 2005/0045342 A1 | 3/2005 | Luke et al. | | DE | 203767 | 11/1983 |
| 2005/0056433 A1 | 3/2005 | Watson et al. | | DE | 233607 A1 | 3/1986 |
| 2005/0056434 A1 | 3/2005 | Ring et al. | | DE | 278517 A1 | 5/1990 |
| 2005/0077051 A1 | 4/2005 | Cook et al. | | EP | 0084940 A1 | 8/1983 |
| 2005/0081358 A1 | 4/2005 | Cook et al. | | EP | 0272511 | 12/1987 |
| 2005/0087337 A1 | 4/2005 | Brisco et al. | | EP | 0294264 | 5/1988 |
| 2005/0098323 A1 | 5/2005 | Cook et al. | | EP | 0553566 A1 | 12/1992 |
| 2005/0103502 A1 | 5/2005 | Watson et al. | | EP | 0633391 A2 | 1/1995 |
| 2005/0123639 A1 | 6/2005 | Ring et al. | | EP | 0713953 B1 | 11/1995 |
| 2005/0133225 A1 | 6/2005 | Oosterling | | EP | 0823534 | 2/1998 |
| 2005/0138790 A1 | 6/2005 | Cook et al. | | EP | 0881354 | 12/1998 |
| 2005/0144771 A1 | 7/2005 | Cook et al. | | EP | 0881359 | 12/1998 |
| 2005/0144772 A1 | 7/2005 | Cook et al. | | EP | 0899420 | 3/1999 |
| 2005/0144777 A1 | 7/2005 | Cook et al. | | | | |

| | | | | | | |
|---|---|---|---|---|---|---|
| EP | 0937861 | 8/1999 | | GB | 2347950 B | 8/2003 |
| EP | 0952305 | 10/1999 | | GB | 2380213 B | 8/2003 |
| EP | 0952306 | 10/1999 | | GB | 2380214 B | 8/2003 |
| EP | 1141515 A | 1/2001 | | GB | 2380215 B | 8/2003 |
| EP | 1152120 A2 | 11/2001 | | GB | 2348223 B | 9/2003 |
| EP | 1152120 A3 | 11/2001 | | GB | 2347952 B | 10/2003 |
| EP | 1235972 A | 9/2002 | | GB | 2348657 B | 10/2003 |
| EP | 1555386 A1 | 7/2005 | | GB | 2384800 B | 10/2003 |
| FR | 1325596 | 6/1962 | | GB | 2384801 B | 10/2003 |
| FR | 2717855 A1 | 9/1995 | | GB | 2384802 B | 10/2003 |
| FR | 2741907 A1 | 6/1997 | | GB | 2384803 B | 10/2003 |
| FR | 2771133 A | 5/1999 | | GB | 2384804 B | 10/2003 |
| FR | 2780751 | 1/2000 | | GB | 2384805 B | 10/2003 |
| FR | 2841626 A1 | 1/2004 | | GB | 2384806 B | 10/2003 |
| GB | 557823 | 12/1943 | | GB | 2384807 B | 10/2003 |
| GB | 788150 | 12/1957 | | GB | 2384808 B | 10/2003 |
| GB | 851096 | 10/1960 | | GB | 2385353 B | 10/2003 |
| GB | 961750 | 6/1964 | | GB | 2385354 B | 10/2003 |
| GB | 1000383 | 10/1965 | | GB | 2385355 B | 10/2003 |
| GB | 1062610 | 3/1967 | | GB | 2385356 B | 10/2003 |
| GB | 1111536 | 5/1968 | | GB | 2385357 B | 10/2003 |
| GB | 1448304 | 9/1976 | | GB | 2385358 B | 10/2003 |
| GB | 1460864 | 1/1977 | | GB | 2385359 B | 10/2003 |
| GB | 1542847 | 3/1979 | | GB | 2385360 B | 10/2003 |
| GB | 1563740 | 3/1980 | | GB | 2385361 B | 10/2003 |
| GB | 2058877 A | 4/1981 | | GB | 2385362 B | 10/2003 |
| GB | 2108228 A | 5/1983 | | GB | 2385363 B | 10/2003 |
| GB | 2115860 A | 9/1983 | | GB | 2385619 B | 10/2003 |
| GB | 2125876 A | 3/1984 | | GB | 2385620 B | 10/2003 |
| GB | 2211573 A | 7/1989 | | GB | 2385621 B | 10/2003 |
| GB | 2216926 A | 10/1989 | | GB | 2385622 B | 10/2003 |
| GB | 2243191 A | 10/1991 | | GB | 2385623 B | 10/2003 |
| GB | 2256910 A | 12/1992 | | GB | 2387405 A | 10/2003 |
| GB | 2257184 A | 6/1993 | | GB | 2387861 A | 10/2003 |
| GB | 2305682 A | 4/1997 | | GB | 2388134 A | 11/2003 |
| GB | 2325949 A | 5/1998 | | GB | 2388860 A | 11/2003 |
| GB | 2322655 A | 9/1998 | | GB | 2355738 B | 12/2003 |
| GB | 2326896 A | 1/1999 | | GB | 2374622 B | 12/2003 |
| GB | 2329916 A | 4/1999 | | GB | 2388391 B | 12/2003 |
| GB | 2329918 A | 4/1999 | | GB | 2388392 B | 12/2003 |
| GB | 2336383 A | 10/1999 | | GB | 2388393 B | 12/2003 |
| GB | 2355738 A | 4/2000 | | GB | 2388394 B | 12/2003 |
| GB | 2343691 A | 5/2000 | | GB | 2388395 B | 12/2003 |
| GB | 2344606 A | 6/2000 | | GB | 2356651 B | 2/2004 |
| GB | 2368865 A | 7/2000 | | GB | 2368865 B | 2/2004 |
| GB | 2346165 A | 8/2000 | | GB | 2388860 B | 2/2004 |
| GB | 2346632 A | 8/2000 | | GB | 2388861 B | 2/2004 |
| GB | 2347445 A | 9/2000 | | GB | 2388862 B | 2/2004 |
| GB | 2347446 A | 9/2000 | | GB | 2391886 A | 2/2004 |
| GB | 2347950 A | 9/2000 | | GB | 2390628 B | 3/2004 |
| GB | 2347952 A | 9/2000 | | GB | 2391033 B | 3/2004 |
| GB | 2348223 A | 9/2000 | | GB | 2392686 A | 3/2004 |
| GB | 2348657 A | 10/2000 | | GB | 2393199 A | 3/2004 |
| GB | 2357099 A | 12/2000 | | GB | 2373524 B | 4/2004 |
| GB | 2356651 A | 5/2001 | | GB | 2390387 B | 4/2004 |
| GB | 2350137 B | 8/2001 | | GB | 2392686 B | 4/2004 |
| GB | 2361724 | 10/2001 | | GB | 2392691 B | 4/2004 |
| GB | 2365898 A | 2/2002 | | GB | 2391575 B | 5/2004 |
| GB | 2359837 B | 4/2002 | | GB | 2394979 A | 5/2004 |
| GB | 2370301 A | 6/2002 | | GB | 2395506 A | 5/2004 |
| GB | 2371064 A | 7/2002 | | GB | 2392932 B | 6/2004 |
| GB | 2371574 A | 7/2002 | | GB | 2395734 A | 6/2004 |
| GB | 2373524 | 9/2002 | | GB | 2396635 A | 6/2004 |
| GB | 2367842 A | 10/2002 | | GB | 2396639 A | 6/2004 |
| GB | 2374098 A | 10/2002 | | GB | 2396640 A | 6/2004 |
| GB | 2374622 A | 10/2002 | | GB | 2396641 A | 6/2004 |
| GB | 2375560 A | 11/2002 | | GB | 2396642 A | 6/2004 |
| GB | 2380213 A | 4/2003 | | GB | 2396643 A | 6/2004 |
| GB | 2380503 A | 4/2003 | | GB | 2396644 A | 6/2004 |
| GB | 2381019 A | 4/2003 | | GB | 2396646 A | 6/2004 |
| GB | 2343691 B | 5/2003 | | GB | 2373468 B | 7/2004 |
| GB | 2382828 B | 6/2003 | | GB | 2396869 A | 7/2004 |
| GB | 2344606 B | 8/2003 | | GB | 2397261 A | 7/2004 |

| | | | | | | |
|---|---|---|---|---|---|---|
| GB | 2397262 | A | 7/2004 | GB | 2406125 | A | 3/2005 |
| GB | 2397263 | A | 7/2004 | GB | 2406126 | A | 3/2005 |
| GB | 2397264 | A | 7/2004 | GB | 2410518 | A | 3/2005 |
| GB | 2397265 | A | 7/2004 | GB | 2389597 | B | 5/2005 |
| GB | 2390622 | B | 8/2004 | GB | 2399119 | B | 5/2005 |
| GB | 2398087 | A | 8/2004 | GB | 2399580 | B | 5/2005 |
| GB | 2398317 | A | 8/2004 | GB | 2401630 | B | 5/2005 |
| GB | 2398318 | A | 8/2004 | GB | 2401631 | B | 5/2005 |
| GB | 2398319 | A | 8/2004 | GB | 2401632 | B | 5/2005 |
| GB | 2398320 | A | 8/2004 | GB | 2401633 | B | 5/2005 |
| GB | 2398321 | A | 8/2004 | GB | 2401634 | B | 5/2005 |
| GB | 2398322 | A | 8/2004 | GB | 2401635 | B | 5/2005 |
| GB | 2398323 | A | 8/2004 | GB | 2401636 | B | 5/2005 |
| GB | 2398326 | A | 8/2004 | GB | 2401637 | B | 5/2005 |
| GB | 2382367 | B | 9/2004 | GB | 2401638 | B | 5/2005 |
| GB | 2396641 | B | 9/2004 | GB | 2401639 | B | 5/2005 |
| GB | 2396643 | B | 9/2004 | GB | 2408278 | A | 5/2005 |
| GB | 2397261 | B | 9/2004 | GB | 2399579 | B | 6/2005 |
| GB | 2397262 | B | 9/2004 | GB | 2409216 | A | 6/2005 |
| GB | 2397263 | B | 9/2004 | GB | 2409218 | A | 6/2005 |
| GB | 2397264 | B | 9/2004 | GB | 2401893 | B | 7/2005 |
| GB | 2397265 | B | 9/2004 | GB | 2414749 | A | 7/2005 |
| GB | 2399120 | A | 9/2004 | GB | 2414750 | A | 7/2005 |
| GB | 2399579 | A | 9/2004 | GB | 2414751 | A | 7/2005 |
| GB | 2399580 | A | 9/2004 | GB | 2 403970 | B | 8/2005 |
| GB | 2399848 | A | 9/2004 | GB | 2398326 | B | 8/2005 |
| GB | 2399849 | A | 9/2004 | GB | 2403971 | B | 8/2005 |
| GB | 2399850 | A | 9/2004 | GB | 2403972 | B | 8/2005 |
| GB | 2384502 | B | 10/2004 | GB | 2380503 | B | 10/2005 |
| GB | 2396644 | B | 10/2004 | GB | 2382828 | B | 10/2005 |
| GB | 2400126 | A | 10/2004 | GB | 2398317 | B | 10/2005 |
| GB | 2400393 | A | 10/2004 | GB | 2398318 | B | 10/2005 |
| GB | 2400624 | A | 10/2004 | GB | 2398319 | B | 10/2005 |
| GB | 2396640 | B | 11/2004 | GB | 2398321 | B | 10/2005 |
| GB | 2396642 | B | 11/2004 | GB | 2398322 | B | 10/2005 |
| GB | 2401136 | A | 11/2004 | GB | 2412681 | A | 10/2005 |
| GB | 2401137 | A | 11/2004 | GB | 2412682 | A | 10/2005 |
| GB | 2401138 | A | 11/2004 | GB | 2413136 | A | 10/2005 |
| GB | 2401630 | A | 11/2004 | GB | 2414493 | A | 11/2005 |
| GB | 2401631 | A | 11/2004 | GB | 2409217 | B | 12/2005 |
| GB | 2401632 | A | 11/2004 | GB | 2410518 | B | 12/2005 |
| GB | 2401633 | A | 11/2004 | GB | 2415003 | A | 12/2005 |
| GB | 2401634 | A | 11/2004 | GB | 2415219 | A | 12/2005 |
| GB | 2401635 | A | 11/2004 | GB | 2395506 | B | 1/2006 |
| GB | 2401636 | A | 11/2004 | GB | 2412681 | B | 1/2006 |
| GB | 2401637 | A | 11/2004 | GB | 2412682 | B | 1/2006 |
| GB | 2401638 | A | 11/2004 | GB | 2415979 | A | 1/2006 |
| GB | 2401639 | A | 11/2004 | GB | 2415983 | A | 1/2006 |
| GB | 2381019 | B | 12/2004 | GB | 2415987 | A | 1/2006 |
| GB | 2382368 | B | 12/2004 | GB | 2415988 | A | 1/2006 |
| GB | 2394979 | B | 12/2004 | GB | 2416177 | A | 1/2006 |
| GB | 2401136 | B | 12/2004 | GB | 2416361 | A | 1/2006 |
| GB | 2401137 | B | 12/2004 | GB | 2416556 | A | 2/2006 |
| GB | 2401138 | B | 12/2004 | GB | 2416794 | A | 2/2006 |
| GB | 2403970 | A | 1/2005 | GB | 2416795 | A | 2/2006 |
| GB | 2403971 | A | 1/2005 | GB | 2417273 | A | 2/2006 |
| GB | 2403972 | A | 1/2005 | GB | 2417275 | A | 2/2006 |
| GB | 2400624 | B | 2/2005 | GB | 2418216 | A | 3/2006 |
| GB | 2404402 | A | 2/2005 | GB | 2418217 | A | 3/2006 |
| GB | 2404676 | A | 2/2005 | GB | 2418690 | A | 4/2006 |
| GB | 2404680 | A | 2/2005 | GB | 2418941 | A | 4/2006 |
| GB | 2384807 | C | 3/2005 | GB | 2418942 | A | 4/2006 |
| GB | 2388134 | B | 3/2005 | GB | 2418943 | A | 4/2006 |
| GB | 2398320 | B | 3/2005 | GB | 2418944 | A | 4/2006 |
| GB | 2398323 | B | 3/2005 | GB | 2419907 | A | 5/2006 |
| GB | 2399120 | B | 3/2005 | GB | 2419913 | A | 5/2006 |
| GB | 2399848 | B | 3/2005 | GB | 2400126 | B | 6/2006 |
| GB | 2399849 | B | 3/2005 | GB | 2414749 | B | 6/2006 |
| GB | 2405893 | A | 3/2005 | GB | 2420810 | A | 6/2006 |
| GB | 2406117 | A | 3/2005 | GB | 2421257 | A | 6/2006 |
| GB | 2406118 | A | 3/2005 | GB | 2421258 | A | 6/2006 |
| GB | 2406119 | A | 3/2005 | GB | 2421259 | A | 6/2006 |
| GB | 2406120 | A | 3/2005 | GB | 2421262 | A | 6/2006 |

| | | | | | | |
|---|---|---|---|---|---|---|
| GB | 2421529 | A | 6/2006 | SU | 1627663 A2 | 2/1991 |
| GB | 2422164 | A | 7/2006 | SU | 1659621 A1 | 6/1991 |
| GB | 2406599 | B | 8/2006 | SU | 1663179 A2 | 7/1991 |
| GB | 2418690 | B | 8/2006 | SU | 1663180 A1 | 7/1991 |
| GB | 2421257 | B | 8/2006 | SU | 1677225 A1 | 9/1991 |
| GB | 2421258 | B | 8/2006 | SU | 1677248 A1 | 9/1991 |
| GB | 2422859 | A | 8/2006 | SU | 1686123 A1 | 10/1991 |
| GB | 2422860 | A | 8/2006 | SU | 1686124 A1 | 10/1991 |
| GB | 2423317 | | 8/2006 | SU | 1686125 A1 | 10/1991 |
| GB | 2414493 | B | 9/2006 | SU | 1698413 A1 | 12/1991 |
| GB | 2424077 | A | 9/2006 | SU | 1710694 A | 2/1992 |
| GB | 2408277 | A | 5/2008 | SU | 1730429 A1 | 4/1992 |
| ID | P01.012.197/2005 | | 1/2005 | SU | 1745873 A1 | 7/1992 |
| ID | 09.044.392/2005 | | 9/2005 | SU | 1747673 A1 | 7/1992 |
| ID | 09.046.2804/2006 | | 8/2006 | SU | 1749267 A1 | 7/1992 |
| JP | 208458 | | 10/1985 | SU | 1295799 A1 | 2/1995 |
| JP | 6475715 | | 3/1989 | WO | WO81/00132 | 1/1981 |
| JP | 102875 | | 4/1995 | WO | WO90/05598 | 3/1990 |
| JP | 11-169975 | | 6/1999 | WO | WO92/01859 | 2/1992 |
| JP | 94068 | A | 4/2000 | WO | WO92/08875 | 5/1992 |
| JP | 107870 | A | 4/2000 | WO | WO93/25799 | 12/1993 |
| JP | 162192 | | 6/2000 | WO | WO93/25800 | 12/1993 |
| JP | 2001-47161 | | 2/2001 | WO | WO94/21887 | 9/1994 |
| NL | 9001081 | | 12/1991 | WO | WO94/25655 | 11/1994 |
| RO | 113267 | B1 | 5/1998 | WO | WO95/03476 | 2/1995 |
| RU | 1786241 | A1 | 1/1993 | WO | WO96/01937 | 1/1996 |
| RU | 1804543 | A3 | 3/1993 | WO | WO96/21083 | 7/1996 |
| RU | 1810482 | A1 | 4/1993 | WO | WO96/26350 | 8/1996 |
| RU | 1818459 | A1 | 5/1993 | WO | WO96/37681 | 11/1996 |
| RU | 2016345 | C1 | 7/1994 | WO | WO97/06346 | 2/1997 |
| RU | 2039214 | C1 | 7/1995 | WO | WO97/11306 | 3/1997 |
| RU | 2056201 | C1 | 3/1996 | WO | WO97/17524 | 5/1997 |
| RU | 2064357 | C1 | 7/1996 | WO | WO97/17526 | 5/1997 |
| RU | 2068940 | C1 | 11/1996 | WO | WO97/17527 | 5/1997 |
| RU | 2068943 | C1 | 11/1996 | WO | WO97/20130 | 6/1997 |
| RU | 2079633 | C1 | 5/1997 | WO | WO97/21901 | 6/1997 |
| RU | 2083798 | C1 | 7/1997 | WO | WO97/35499 | 9/1997 |
| RU | 2091655 | C1 | 9/1997 | WO | WO98/00626 | 1/1998 |
| RU | 2095179 | C1 | 11/1997 | WO | WO98/07957 | 2/1998 |
| RU | 2105128 | C1 | 2/1998 | WO | WO98/09053 | 3/1998 |
| RU | 2108445 | C1 | 4/1998 | WO | WO98/22690 | 5/1998 |
| RU | 2144128 | C1 | 1/2000 | WO | WO98/26152 | 6/1998 |
| SU | 350833 | | 9/1972 | WO | WO98/42947 | 10/1998 |
| SU | 511468 | | 9/1976 | WO | WO98/49423 | 11/1998 |
| SU | 607950 | | 5/1978 | WO | WO99/02818 | 1/1999 |
| SU | 612004 | | 5/1978 | WO | WO99/04135 | 1/1999 |
| SU | 620582 | | 7/1978 | WO | WO99/06670 | 2/1999 |
| SU | 641070 | | 1/1979 | WO | WO99/08827 | 2/1999 |
| SU | 909114 | | 5/1979 | WO | WO99/08828 | 2/1999 |
| SU | 832049 | | 5/1981 | WO | WO99/18328 | 4/1999 |
| SU | 853089 | | 8/1981 | WO | WO99/23354 | 5/1999 |
| SU | 874952 | | 10/1981 | WO | WO99/25524 | 5/1999 |
| SU | 894169 | | 1/1982 | WO | WO99/25951 | 5/1999 |
| SU | 899850 | | 1/1982 | WO | WO99/35368 | 7/1999 |
| SU | 907220 | | 2/1982 | WO | WO99/43923 | 9/1999 |
| SU | 953172 | | 8/1982 | WO | WO00/01926 | 1/2000 |
| SU | 959878 | | 9/1982 | WO | WO00/04271 | 1/2000 |
| SU | 976019 | | 11/1982 | WO | WO00/08301 | 2/2000 |
| SU | 976020 | | 11/1982 | WO | WO00/26500 | 5/2000 |
| SU | 989038 | | 1/1983 | WO | WO00/26501 | 5/2000 |
| SU | 1002514 | | 3/1983 | WO | WO00/26502 | 5/2000 |
| SU | 1041671 | A | 9/1983 | WO | WO00/31375 | 6/2000 |
| SU | 1051222 | A | 10/1983 | WO | WO00/37766 | 6/2000 |
| SU | 1086118 | A | 4/1984 | WO | WO00/37767 | 6/2000 |
| SU | 1077803 | A | 7/1984 | WO | WO00/37768 | 6/2000 |
| SU | 1158400 | A | 5/1985 | WO | WO00/37771 | 6/2000 |
| SU | 1212575 | A | 2/1986 | WO | WO00/37772 | 6/2000 |
| SU | 1250637 | A1 | 8/1986 | WO | WO00/39432 | 7/2000 |
| SU | 1324722 | A1 | 7/1987 | WO | WO00/46484 | 8/2000 |
| SU | 1411434 | | 7/1988 | WO | WO00/50727 | 8/2000 |
| SU | 1430498 | A1 | 10/1988 | WO | WO00/50732 | 8/2000 |
| SU | 1432190 | A1 | 10/1988 | WO | WO00/50733 | 8/2000 |
| SU | 1601330 | A1 | 10/1990 | WO | WO00/77431 A2 | 12/2000 |

| | | | | | | | |
|---|---|---|---|---|---|---|---|
| WO | WO01/04520 | A1 | 1/2001 | WO | WO2004/009950 | A1 | 1/2004 |
| WO | WO01/04535 | A1 | 1/2001 | WO | WO2004/010039 | A2 | 1/2004 |
| WO | WO01/18354 | A1 | 3/2001 | WO | WO2004/010039 | A3 | 1/2004 |
| WO | WO01/21929 | A1 | 3/2001 | WO | WO2004/011776 | A2 | 2/2004 |
| WO | WO01/26860 | A1 | 4/2001 | WO | WO2004/011776 | A3 | 2/2004 |
| WO | WO01/33037 | A1 | 5/2001 | WO | WO2004/018823 | A2 | 3/2004 |
| WO | WO01/38693 | A1 | 5/2001 | WO | WO2004/018823 | A3 | 3/2004 |
| WO | WO01/60545 | A1 | 8/2001 | WO | WO2004/018824 | A2 | 3/2004 |
| WO | WO01/83943 | A1 | 11/2001 | WO | WO2004/018824 | A3 | 3/2004 |
| WO | WO01/98623 | A1 | 12/2001 | WO | WO2004/020895 | A2 | 3/2004 |
| WO | WO02/01102 | A1 | 1/2002 | WO | WO2004/020895 | A3 | 3/2004 |
| WO | WO02/10550 | A1 | 2/2002 | WO | WO2004/023014 | A2 | 3/2004 |
| WO | WO02/10551 | A1 | 2/2002 | WO | WO2004/023014 | A3 | 3/2004 |
| WO | WO 02/20941 | A1 | 3/2002 | WO | WO2004/026017 | A2 | 4/2004 |
| WO | WO02/25059 | A1 | 3/2002 | WO | WO2004/026017 | A3 | 4/2004 |
| WO | WO02/29199 | A1 | 4/2002 | WO | WO2004/026073 | A2 | 4/2004 |
| WO | WO02/40825 | A1 | 5/2002 | WO | WO2004/026073 | A3 | 4/2004 |
| WO | WO02/053867 | A2 | 7/2002 | WO | WO2004/026500 | A2 | 4/2004 |
| WO | WO02/053867 | A3 | 7/2002 | WO | WO2004/026500 | A3 | 4/2004 |
| WO | WO02/059456 | A1 | 8/2002 | WO | WO2004/027200 | A2 | 4/2004 |
| WO | WO02/066783 | A1 | 8/2002 | WO | WO2004/027200 | A3 | 4/2004 |
| WO | WO02/068792 | A1 | 9/2002 | WO | WO2004/027204 | A2 | 4/2004 |
| WO | WO02/075107 | A1 | 9/2002 | WO | WO2004/027204 | A3 | 4/2004 |
| WO | WO02/077411 | A1 | 10/2002 | WO | WO2004/027205 | A2 | 4/2004 |
| WO | WO02/081863 | A1 | 10/2002 | WO | WO2004/027205 | A3 | 4/2004 |
| WO | WO02/081864 | A2 | 10/2002 | WO | WO2004/027392 | A1 | 4/2004 |
| WO | WO02/086285 | A1 | 10/2002 | WO | WO2004/027786 | A2 | 4/2004 |
| WO | WO02/086286 | A2 | 10/2002 | WO | WO2004/027786 | A3 | 4/2004 |
| WO | WO02/090713 | | 11/2002 | WO | WO2004/053434 | A2 | 6/2004 |
| WO | WO02/095181 | A1 | 11/2002 | WO | WO2004/053434 | A3 | 6/2004 |
| WO | WO02/103150 | A2 | 12/2002 | WO | WO2004/057715 | A2 | 7/2004 |
| WO | WO03/004819 | A2 | 1/2003 | WO | WO2004/057715 | A3 | 7/2004 |
| WO | WO03/004819 | A3 | 1/2003 | WO | WO2004/067961 | A2 | 8/2004 |
| WO | WO03/004820 | A2 | 1/2003 | WO | WO2004/067961 | A3 | 8/2004 |
| WO | WO03/004820 | A3 | 1/2003 | WO | WO2004/072436 | A1 | 8/2004 |
| WO | WO03/008756 | A1 | 1/2003 | WO | WO2004/074622 | A2 | 9/2004 |
| WO | WO03/012255 | A1 | 2/2003 | WO | WO2004/074622 | A3 | 9/2004 |
| WO | WO03/016669 | A2 | 2/2003 | WO | WO2004/076798 | A2 | 9/2004 |
| WO | WO03/016669 | A3 | 2/2003 | WO | WO2004/076798 | A3 | 9/2004 |
| WO | WO03/023178 | A2 | 3/2003 | WO | WO2004/081346 | A2 | 9/2004 |
| WO | WO03/023178 | A3 | 3/2003 | WO | WO2004/083591 | A2 | 9/2004 |
| WO | WO03/023179 | A2 | 3/2003 | WO | WO2004/083591 | A3 | 9/2004 |
| WO | WO03/023179 | A3 | 3/2003 | WO | WO2004/083592 | A2 | 9/2004 |
| WO | WO03/029607 | A1 | 4/2003 | WO | WO2004/083592 | A3 | 9/2004 |
| WO | WO03/029608 | A1 | 4/2003 | WO | WO2004/083593 | A2 | 9/2004 |
| WO | WO03/042486 | A2 | 5/2003 | WO | WO2004/083594 | A2 | 9/2004 |
| WO | WO03/042486 | A3 | 5/2003 | WO | WO2004/083594 | A3 | 9/2004 |
| WO | WO03/042487 | A2 | 5/2003 | WO | WO2004/085790 | A2 | 10/2004 |
| WO | WO03/042487 | A3 | 5/2003 | WO | WO2004/089608 | A2 | 10/2004 |
| WO | WO03/042489 | A2 | 5/2003 | WO | WO2004/092527 | A2 | 10/2004 |
| WO | WO03/048520 | A1 | 6/2003 | WO | WO2004/092528 | A2 | 10/2004 |
| WO | WO03/048521 | A2 | 6/2003 | WO | WO2004/092530 | A2 | 10/2004 |
| WO | WO03/055616 | A2 | 7/2003 | WO | WO2004/092530 | A3 | 10/2004 |
| WO | WO03/058022 | A2 | 7/2003 | WO | WO2004/094766 | A2 | 11/2004 |
| WO | WO03/058022 | A3 | 7/2003 | WO | WO2005/017303 | A2 | 2/2005 |
| WO | WO03/059549 | A1 | 7/2003 | WO | WO2005/021921 | A2 | 3/2005 |
| WO | WO03/064813 | A1 | 8/2003 | WO | WO2005/021921 | A3 | 3/2005 |
| WO | WO03/071086 | A2 | 8/2003 | WO | WO2005/021922 | A2 | 3/2005 |
| WO | WO03/071086 | A3 | 8/2003 | WO | WO2005/024170 | A2 | 3/2005 |
| WO | WO03/078785 | A2 | 9/2003 | WO | WO2005/024171 | A2 | 3/2005 |
| WO | WO03/078785 | A3 | 9/2003 | WO | WO2005/028803 | A2 | 3/2005 |
| WO | WO03/086675 | A2 | 10/2003 | WO | WO2005/071212 | A1 | 4/2005 |
| WO | WO03/086675 | A3 | 10/2003 | WO | WO2005/079186 | A2 | 9/2005 |
| WO | WO03/089161 | A2 | 10/2003 | WO | WO2005/079186 | A3 | 9/2005 |
| WO | WO03/089161 | A3 | 10/2003 | WO | WO2005/081803 | A2 | 9/2005 |
| WO | WO03/093623 | A2 | 11/2003 | WO | WO2005/086614 | A2 | 9/2005 |
| WO | WO03/093623 | A3 | 11/2003 | WO | WO2006/014333 | A2 | 2/2006 |
| WO | WO03/102365 | A1 | 12/2003 | WO | WO2006/020723 | A2 | 2/2006 |
| WO | WO03/104601 | A2 | 12/2003 | WO | WO2006/020726 | A2 | 2/2006 |
| WO | WO03/104601 | A3 | 12/2003 | WO | WO2006/020734 | A2 | 2/2006 |
| WO | WO03/106130 | A2 | 12/2003 | WO | WO2006/020809 | A2 | 2/2006 |
| WO | WO03/106130 | A3 | 12/2003 | WO | WO2006/020810 | A2 | 2/2006 |
| WO | WO2004/003337 | A1 | 1/2004 | WO | WO2006/020810 | A3 | 2/2006 |

| | | |
|---|---|---|
| WO | WO2006/020827 A2 | 2/2006 |
| WO | WO2006/020827 A3 | 2/2006 |
| WO | WO2006/020913 A2 | 2/2006 |
| WO | WO2006/020913 A3 | 2/2006 |
| WO | WO2006/020960 A2 | 2/2006 |
| WO | WO2006/033720 A2 | 3/2006 |
| WO | WO2006/079072 A2 | 7/2006 |
| WO | WO2006/088743 A2 | 8/2006 |
| WO | WO2006/102171 A2 | 9/2006 |
| WO | WO2006/102556 A2 | 9/2006 |

OTHER PUBLICATIONS

Enventure Global Technology, "SET Technology: The Facts," 2004.
Flatern, "Oilfield Service Trio Target Jules Verne Territory," at http://www.oilonline.com.
Harris, "Tube Welding." At http://www.tubenet.org.uk.technical.ewi.html.
Mohawk Energy, :Minimizing Drilling Ecoprints Houston, Dec. 16, 2005.
www.RIGZONE.com/news/article.asp?a_id=1755, "Tesco Provides Casing Drilling Operations Update," 2001.
www.RIGZONE.com/news/article.asp?a_id=2603, Conoco and Tesco Unveil Revolutionary Drilling Rig 2002.
International Search Report, Application PCT/US03/15020, Nov. 14, 2005.
International Preliminary Examination Report, Application PCT/US01/28690, Sep. 4, 2003.
International Preliminary Examination Report, Application PCT/US02/39425, Nov. 16, 2005.
International Preliminary Examination Report, Application PCT/US03/15020 (corrected), Nov. 14, 2004.
International Preliminary Report on Patentability, Application PCT/US04/00631, Mar. 2, 2006.
International Preliminary Report on Patentability, Application PCT/US04/04740, Jun. 27, 2006.
International Preliminary Report on Patentability, Application PCT/US04/10317, Jun. 23, 2006.
International Preliminary Report on Patentability, Application PCT/US04/028423, Mar. 9, 2006.
International Preliminary Report on Patentability, Application PCT/US04/028423, Jun. 19, 2006.
International Preliminary Report on Patentability, Application PCT/US04/28889, Aug. 1, 2006.
Combined Search Report and Written Opinion to Application No. PCT/US04/00631, Mar. 28, 2005.
Combined Search Report and Written Opinion to Application No. PCT/US04/10317, May 25, 2006.
Combined Search Report and Written Opinion to Application No. PCT/US04/28831, Dec. 19, 2005.
Combined Search Report and Written Opinion to Application No. PCT/US04/28889, Nov. 14, 2005.
Combined Search Report and Written Opinion to Application No. PCT/US05/28473, Sep. 1, 2006.
Combined Search Report and Written Opinion to Application No. PCT/US05/28642, Jul. 14, 2006.
Combined Search Report and Written Opinion to Application No. PCT/US05/28819, Aug. 3, 2006.
Combined Search Report and Written Opinion to Application No. PCT/US05/28869, Apr. 17, 2006.
Combined Search Report and Written Opinion to Application No. PCT/US06/04809, Aug. 29, 2006.
Search Report to Application No. GB 0507980.1, Apr. 24, 2006.
Examination Report to Application No. GB 0219757.2, Oct. 31, 2004.
Examination Report to Application No. GB 03723674.2, Feb. 6, 2006.
Examination Report to Application No. GB 0400019.6, Nov. 4, 2005.
Examination Report to Application No. GB 0406257.6, Sep. 2, 2005.
Examination Report to Application No. GB 0406257.6, Nov. 9, 2005.
Examination Report to Application No. GB 0406257.6, Apr. 28, 2006.
Examination Report to Application No. GB 0406258.4, Dec. 20, 2005.
Examination Report to Application No. GB 0412876.5, Feb. 13, 2006.
Examination Report to Application No. GB 0415835.8, Dec. 23, 2005.
Examination Report to Application No. GB 0422419.2, Nov. 8, 2005.
Examination Report to Application No. GB 0422893.8, Aug. 8, 2005.
Examination Report to Application No. GB 0422893.8, Dec. 15, 2005.
Examination Report to Application No. GB 0425948.7, Nov. 24, 2005.
Examination Report to Application No. GB 0425956.0, Nov. 24, 2005.
Examination Report to Application No. GB 0428141.6, Feb. 9, 2005.
Examination Report to Application No. GB 0428141.6, Feb. 21, 2006.
Examination Report to Application No. GB 05428141.6, Jul. 18, 2006.
Examination Report to Application No. GB 0500275.3, Apr. 5, 2006.
Examination Report to Application No. GB 0501667.0, Jan. 27, 2006.
Examination Report to Application No. GB 0503250.3, Nov. 15, 2005.
Examination Report to Application No. GB 0503250.3, Mar. 2, 2006.
Examination Report to Application No. GB 0503250.3, Aug. 11, 2006.
Examination Report to Application No. GB 0506699.8, May 11, 2006.
Examination Report to Application No. GB 0506700.4, May 16, 2006.
Examination Report to Application No. GB 0506702.0, May 11, 2006.
Examination Report to Application No. GB 0507979.3, Jun. 16, 2005.
Examination Report to Application No. GB 0507979.3, Jan. 17, 2006.
Examination Report to Application No. GB 0507979.3, Jun. 6, 2006.
Examination Report to Application No. GB 0507980.1, Sep. 29, 2005.
Examination Report to Application No. GB 0509618.5, Feb. 3, 2006.
Examination Report to Application No. GB 0509620.1, Feb. 14, 2006.
Examination Report to Application No. GB 0509627.6, Feb. 3, 2006.
Examination Report to Application No. GB 0509629.2, Feb. 3, 2006.
Examination Report to Application No. GB 0509630.0, Feb. 3, 2006.
Examination Report to Application No. GB 0509630.0, May 11, 2006.
Examination Report to Application No. GB 0509630.0, Jun. 6, 2006.
Examination Report to Application No. GB 0509631.8, Feb. 14, 2006.
Examination Report to Application No. GB 0517448.7, Nov. 9, 2005.
Examination Report to Application No. GB 0517448.7, Jul. 19, 2006.
Examination Report to Application No. GB 0518025.2, Oct. 27, 2005.
Examination Report to Application No. GB 0518025.2, May 25, 2006.
Examination Report to Application No. GB 0518039.3, Nov. 29, 2005.
Examination Report to Application No. GB 0518039.3, Aug. 2, 2006.
Examination Report to Application No. GB 0518252.2, Oct. 28, 2005.
Examination Report to Application No. GB 051252.2, May 25, 2006.
Examination Report to Application No. GB 0518799.2, Nov. 9, 2005.
Examination Report to Application No. GB 0518799.2, Jun. 14, 2006.
Examination Report to Application No. GB 0518893.3, Dec. 16, 2005.
Examination Report to Application No. GB 0518893.3, Jul. 28, 2006.
Examination Report to Application No. GB 0519989.8, Mar. 8, 2006.
Examination Report to Application No. GB 0521024.0, Dec. 22, 2005.

Examination Report to Application No. GB 0522050.4, Dec. 13, 2005.
Examination Report to Application No. GB 0522892.9, Aug. 14, 2006.
Examination Report to Application No. GB 0602877.3, Mar. 20, 2006.
Examination Report to Application No. GB 0603576.0, Apr. 5, 2006.
Examination Report to Application No. GB 0603656.0, May 3, 2006.
Examination Report to Application No. GB 0603995.2, Apr. 25, 2006.
Examination Report to Application No. GB 0603996.0, Apr. 27, 2006.
Examination Report to Application No. GB 0604357.4, Apr. 27, 2006.
Examination Report to Application No. GB 0604359.0, Apr. 27, 2006.
Examination Report to Application No. GB 0604360.8, Apr. 26, 2006.
Search and Examination Report to Application No. GB 0412876.5, Sep. 27, 2005.
Search and Examination Report to Application No. GB 0507980.1, Jun. 20, 2006.
Search and Examination Report to Application No. GB 0516429.8, Nov. 7, 2005.
Search and Examination Report to Application No. GB 0516430.6, Nov. 8, 2005.
Search and Examination Report to Application No. GB 0516431.4, Nov. 8, 2005.
Search and Examination Report to Application No. GB 0522052.0, Aug. 8, 2006.
Search and Examination Report to Application No. GB 0522155.1, Mar. 7, 2006.
Search and Examination Report to Application No. GB 0522892.9 Jan. 5, 2006.
Search and Examination Report to Application No. GB 0523075.0, Jan. 12, 2006.
Search and Examination Report to Application No. GB 0523076.8, Dec. 14, 2005.
Search and Examination Report to Application No. GB 0523078.4, Dec. 13, 2005.
Search and Examination Report to Application No. GB 0523132.9, Jan. 12, 2006.
Search and Examination Report to Application No. GB 0524692.1, Dec. 19, 2005.
Search and Examination Report to Application No. GB 0525768.8, Feb. 3, 2006.
Search and Examination Report to Application No. GB 0525770.4, Feb. 3, 2006.
Search and Examination Report to Application No. GB 0525772.0, Feb. 2, 2006.
Search and Examination Report to Application No. GB 0525774.6, Feb. 2, 2006.
Search and Examination Report to Application No. GB 0602877.3, Sep. 25, 2006.
Search and Examination Report to Application No. GB 0609173.0, Jul. 19, 2006.
Examination Report to Application No. AU 2003257878, Jan. 19, 2006.
Examination Report to Application No. AU 2003257878, Jan. 30, 2006.
Examination Report to Application No. AU 2003257881, Jan. 19, 2006.
Examination Report to Application No. AU 2003257881, Jan. 30, 2006.
Examination Report to Application No. AU 2004202805, Jun. 14, 2006.
Examination Report to Application No. AU 2004202809, Jun. 14, 2006.
Examination Report to Application No. AU 2004202812, Jun. 14, 2006.
Examination Report to Application No. AU 2004202813, Jun. 14, 2006.
Examination Report to Application No. AU 2004202815, Jun. 14, 2006.
Search Report to Application No. EP 03071281.2; Nov. 7, 2005.
Search Report to Application No. EP 03071281.2; Nov. 14, 2005.
Search Report to Application No. EP 03723674.2; Nov. 22, 2005.
Search Report to Application No. EP 03723674.2; May 2, 2006.
Search Report to Application No. EP 03728326.4; Mar. 13, 2006.
Search Report to Application No. EP 03728326.4; Apr. 24, 2006.
Search Report to Application No. EP 03752486.5; Feb. 8, 2006.
Examination Report to Application No. EP 03752486.5; Jun. 28, 2006.
Search Report to Application No. EP 03759400.9; Mar. 3, 2006.
Search Report to Application No. EP 03759400.9; Mar. 24, 2006.
Search Report to Application No. EP 03793078.1; Mar. 21, 2006.
Search Report to Application No. EP 03793078.1; Jun. 16, 2006.
Examination Report to Application No. Norway 2002 1613, May 13, 2006.
Blasingame et al., "Solid Expandable Tubular Technology in Mature Basins," *Society of Petroleum Engineers* 2003.
Brass et al., "Water Production Management—PDO's Successful Application of Expandable Technology," *Society of Petroleum Engineers*, 2002.
Brock et al., "An Expanded Horizon," Hart's E&P, Feb. 2000.
Buckler et al., "Expandable Cased-hole Liner Remediates Prolific Gas Well and Minimizes Loss of Production," *Offshore Technology Conference*, 15151.
Bullock, "Advances Grow Expandable Applications," *The American Oil & Gas Reporter*, Sep. 2004.
Cales, "The Development and Applications of Solid Expandable Tubular Technology," *Enventure Global Technology*, Paper 2003-136, 2003.
Cales et al., "Reducing Non-Productive Time Through the Use of Solid Expandable Tubulars: How to Beat the Curve Through Pre-Planning," *Offshore Technology Conference*, 16669, 2004.
Cales et al., "Subsidence Remediation—Extending Well Life Through the Use of Solid Expandable Casing Systems," *AADE Houston Chapter*, Mar. 27, 2001.
Campo et al., "Case Histories—Drilling and Recompletion Applications Using Solid Expandable Tubular Technology," *Society of Petroleum Engineers*, SPE/IADC 72304, 2002.
Carstens et al., "Solid Expandable Tubular Technology: The Value of Planned Installations vs. Contingency,".
Case History, "Eemskanaal—2 Groningen," Enventure Global Technology, Feb. 2002.
Case History, "Graham Ranch No. 1 Newark East Barnett Field" Enventure Global Technology, Feb. 2002.
Case History, "K.K. Camel No. 1 Ridge Field Lafayette Parish, Louisiana," Enventure Global Technology, Feb. 2002.
Case History, "Mississippi Canyon 809 URSA TLP, OSC-G 5868, No. A-12," Enventure Global Technology, Mar. 2004.
Case History, "Unocal Sequoia Mississippi Canyon 941 Well No. 2" Enventure Global Technology, 2005.
Case History, "Yibal 381 Oman," Enventure Global Technology, Feb. 2002.
Cook, "Same Internal Casing Diameter From Surface to TD," *Offshore*, Jul. 2002.
Cottrill, "Expandable Tubulars Close in on the Holy Grail of Drilling," *Upstream*, Jul. 26, 2002.
Daigle et al., "Expandable Tubulars: Field Examples of Application in Well Construction and Remediation," *Society of Petroleum Engineers*, SPE 62958, 2000.
Daneshy, "Technology Strategy Breeds Value," E&P, May 2004.
Data Sheet, "Enventure Cased-Hole Liner (CHL) System" Enventure Global Technology, Dec. 2002.
Data Sheet, "Enventure Openhole Liner (OHL) System" Enventure Global Technology, Dec. 2002.
Data Sheet, "Window Exit Applications OHL Window Exit Expansion" Enventure Global Technology, Jun. 2003.
Dean et al., "Monodiameter Drilling Liner—From Concept to Reality," *Society of Petroleum Engineers*, SPE/IADC 79790, 2003.
Demong et al., "Breakthroughs Using Solid Expandable Tubulars to Construct Extended Reach Wells," *Society of Petroleum Engineers*, IADC/SPE 87209, 2004.

Demong et al., "Casing Design in Complex Wells: The Use of Expandables and Multilateral Technology to Attack the size Reduction Issue".

Demong et al., "Expandable Tubulars Enable Multilaterals Without Compromise on Hole Size," *Offshore*, Jun. 2003.

Demong et al., "Planning the Well Construction Process for the Use of Solid Expandable Casing," *Society of Petroleum Engineers*, SPE 85303, 2003.

Demoulin, "Les Tubes Expansibles Changent La Face Du Forage Petrolier," *L'Usine Nouvelle*, 2878:50-52, Jul. 3, 2003.

Dupal et al., "Realization of the MonoDiameter Well: Evolution of a Game-Changing Technology," *Offshore Technology Conference*, OTC 14312, 2002.

Dupal et al., "Solid Expandable Tubular Technology—A Year of Case Histories in the Drilling Environment," *Society of Petroleum Engineers*, SPE/IADC 67770, 2001.

Dupal et al., "Well Design with Expandable Tubulars Reduces Cost and Increases Success in Deepwater Applications," *Deep Offshore Technology*, 2000.

Duphorne, "Letter Re: Enventure Claims of Baker Infringement of Enventure's Expandable Patents," Apr. 1, 2005.

"EIS Expandable Isolation Sleeve" *Expandable Tubular Technology*, Feb. 2003.

Enventure Global Technology, Solid Expandable Tubulars are Enabling Technology, *Drilling Contractor*, Mar.-Apr. 2001.

"Enventure Ready to Rejuvinate the North Sea," *Roustabout*, Sep. 2004.

Escobar et al., "Increasing Solid Expandable Tubular Technology Reliability in a Myriad of Downhole Environments," *Society of Petroleum Engineers*, SPE/IADC 81094, 2003.

Etsion, "A Laser Surface Textured Hydrostatic Mechanical Seal," *Sealing Technology*, Mar. 2003.

"Expandable Casing Accesses Remote Reservoirs," *Petroleum Engineer International*, Apr. 1999.

"Expandable Sand Screens," *Weatherford Completion Systems*, 2002.

Filippov et al., "Expandable Tubular Solutions," *Society of Petroleum Engineers*, SPE 56500, 1999.

"First ever SET Workshop Held in Aberdeen," *Roustabout*, Oct. 2004.

Fischer, "Expandables and the Dream of the Monodiameter Well: A Status Report", *World Oil*, Jul. 2004.

Fontova, "Solid Expandable Tubulars (SET) Provide Value to Operators Worldwide in a Variety of Applications," *EP Journal of Technology*, Apr. 2005.

Fraunhofer Iwu, "Research Area: Sheet Metal Forming—Superposition of Vibrations," 2001.

Furlow, "Casing Expansion, Test Process Fine Tuned on Ultradeepwater Well," *Offshore*, Dec. 2000.

Furlow, "Expandable Casing Program Helps Operator Hit TD With Larger Tubulars," *Offshore*, Jan. 2000.

Furlow, "Expandable Solid Casing Reduces Telescope Effect," *Offshore*, Aug. 1998.

Furlow, "Agbada Well Solid Tubulars Expanded Bottom Up, Screens Expanded Top Down," *Offshore*, 2002.

Grant et al., "Deepwater Expandable Openhole Liner Case Histories: Learnings Through Field Applications," *Offshore Technology Conference*, OCT 14218, 2002.

Gusevik et al., "Reaching Deep Reservoir Targets Using Solid Expandable Tubulars" *Society of Petroleum Engineers*, SPE 77612, 2002.

Halliburton Completion Products, 1996.

Haut et al., "Meeting Economic Challenges of Deepwater Drilling with Expandable-Tubular Technology," *Deep Offshore Technology Conference*, 1999.

Hull, "Monodiameter Technology Keeps Hole Diameter to TD," *Offshore* Oct. 2002.

"Innovators Chart the Course,".

Langley, "Case Study: Value in Drilling Derived From Application-Specific Technology," Oct. 2004.

Linzell, "Trib-Get A Chemical Cold Welding Agent," 1999.

Lohoefer et al., "Expandable Liner Hanger Provides Cost-Effective Alternative Solution," *Society of Petroleum Engineers*, IADC/SPE 59151, 2000.

Mack et al., "How in Situ Expansion Affects Casing and Tubing Properties," *World Oil*, Jul. 1999, pp. 69-71.

Mack et al., "In-Situ Expansion of Casing and Tubing—Effect on Mechanical Properties and Resistance to Sulfide Stress Cracking,".

Merritt, "Casing Remediation—Extending Well Life Through The Use of Solid Expandable Casing Systems,".

Merritt et al., "Well Remediation Using Expandable Cased-Hole Liners", *World Oil.*, Jul. 2002.

Merritt et al., "Well Remediation Using Expandable Cased-Hole Liners—Summary of Case Histories".

Moore et al., "Expandable Liner Hangers: Case Histories," *Offshore Technology Conference*, OTC 14313, 2002.

Moore et al., "Field Trial Proves Upgrades to Solid Expandable Tubulars," *Offshore Technology Conference*, OTC 14217, 2002.

News Release, "Shell and Halliburton Agree to Form Company to Develop and Market Expandable Casing Technology," Jun. 3, 1998.

Nor, et at., "Transforming Conventional Wells to Bigbore Completions Using Solid Expandable Tubular Technology," *Offshore Technology Conference*, OTC 14315, 2002.

Patin et al., "Overcoming Well Control Challenges with Solid Expandable Tubular Technology," *Offshore Technology Conference*, OTC 15152, 2003.

Power Ultrasonics, "Design and Optimisation of An Ultrasonic Die System For Forming Metal Cans," 1999.

Ratliff, "Changing Safety Paradigms in the Oil and Gas Industry," *Society of Petroleum Engineers*, SPE 90828, 2004.

Rivenbark, "Expandable Tubular Technology—Drill Deeper, Farther, More Economically," Enventure Global Technology.

Rivenbark et al., "Solid Expandable Tubular Technology: The Value of Planned Installation vs. Contingency," *Society of Petroleum Engineers*, SPE 90821, 2004.

Rivenbark et al., "Window Exit Sidetrack Enhancements Through the Use of Solid Expandable Casing," *Society of Petroleum Engineers*, IADC/SPE 88030, 2004.

Roca et al., "Addressing Common Drilling Challenges Using Solid Expandable Tubular Technology," *Society of Petroleum Engineers*, SPE 80446, 2003.

Sanders et al., Practices for Providing Zonal Isolation In Conjunction with Expandable Casing Jobs-Case Histories, 2003.

Sanders et al., "Three Diverse Applications on Three Continents for a Single Major Operator," *Offshore Technology Conference*, OTC 16667, 2004.

"SET Technology: The Facts" 2004.

Siemers et al., "Development and Field Testing of Solid Expandable Corrosion Resistant Cased-hole Liners to Boost Gas Production in Corrosive Environments," *Offshore Technology Conference*, OTC 15149, 2003.

"Slim Well:Stepping Stone to MonoDiameter," *Hart's E&P*, Jun. 2003.

Smith, "Pipe Dream Reality," *New Technology Magazine*, Dec. 2003.

"Solid Expandable Tubulars," *Hart's E&P*, Mar. 2002.

Sparling et al., "Expanding Oil Field Tubulars Through a Window Demonstrates Value and Provides New Well Construction Option," *Offshore Technology Conference*, OTC 16664, 2004.

Sumrow, "Shell Drills World's First Monodiameter Well in South Texas," *Oil and Gas*, Oct. 21, 2002.

Touboul et al., "New Technologies Combine to Reduce Drilling Cost in Ultradeepwater Applications," *Society of Petroleum Engineers*, SPE 90830, 2004.

Turcotte et al., "Geodynamics Applications of Continuum Physics to Geological Problems," 1982.

Van Noort et al., "Using Solid Expandable Tubulars for Openhole Water Shutoff," *Society of Petroleum Engineers*, SPE 78495, 2002.

Van Noort et al., "Water Production Reduced Using Solid Expandable Tubular Technology to "Clad," in Fractured Carbonate Formation" *Offshore Technology Conference*, OTC 15153, 2003.

Von Flatern, "From Exotic to Routine—the Offshore Quick-step," *Offshore Engineer*, Apr. 2004.

Von Flatern, "Oilfield Service Trio Target Jules Verne Territory," *Offshore Engineer*, Aug. 2001.

Waddell et al., "Advances in Single-diameter Well Technology: The Next Step to Cost-Effective Optimization," *Society of Petroleum Engineers*, SPE 90818, 2004.
Waddell et al., "Installation of Solid Expandable Tubular Systems Through Milled Casing Windows," *Society of Petroleum Engineers*, IADC/SPE 87208, 2004.
Williams, "Straightening the Drilling Curve," *Oil and Gas Investor*, Jan. 2003.
www.JETLUBE.com, "Oilfield Catalog—Jet-Lok Product Applicatin Descriptions," 1998.
www.MITCHMET.com, "3d Surface Texture Parameters," 2004.
"Expand Your Opportunities." *Enventure*. CD-ROM. Jun. 1999.
"Expand Your Opportunities." *Enventure*. CD-ROM. May 2001.
International Search Report, Application PCT/US04/00631, Mar. 28, 2005.
International Preliminary Examination Report, Application PCT/US02/24399, Aug. 6, 2004.
International Preliminary Examination Report, Application PCT/US02/25608, Jun. 1, 2005.
International Preliminary Examination Report, Application PCT/US02/25727, Jul. 7, 2004.
International Preliminary Examination Report PCT/US02/36157, Apr. 14, 2004.
International Preliminary Examination Report, Application PCT/US02/36267, Jan. 4, 2004.
International Preliminary Examination Report, Application PCT/US02/39418, Feb. 18, 2005.
International Preliminary Examination Report, Application PCT/US03/04837, Dec. 9, 2004.
International Preliminary Examination Report, Application PCT/US03/06544, May 10, 2005.
International Preliminary Examination Report, Application PCT/US03/10144, Jul. 7, 2004.
International Preliminary Examination Report, Application PCT/US03/11765, Dec. 10, 2004.
International Preliminary Examination Report, Application PCT/US03/11765, Jan. 25, 2005.
International Preliminary Examination Report, Application PCT/US03/11765, Jul. 18, 2005.
International Preliminary Examination Report, Application PCT/US01/11765, Aug. 15, 2005 (Corrected).
International Preliminary Examination Report, Application PCT/US03/13787, Mar. 2, 2005.
International Preliminary Examination Report, Application PCT/US03/13787, Apr. 7, 2005.
International Preliminary Examination Report, Application PCT/US03/14153, May 12, 2005.
International Preliminary Examination Report, Application PCT/US03/15020, May 9, 2005.
International Preliminary Examination Report, Application PCT/US03/20870, Sep. 30, 2004.
International Preliminary Examination Report, Application PCT/US03/25667, May 25, 2005.
International Preliminary Examination Report, Application PCT/US03/25675, Aug. 30, 2005.
International Preliminary Examination Report, Application PCT/US03/25676, Aug. 17, 2004.
International Preliminary Examination Report, Application PCT/US03/25677, Aug. 17, 2004.
International Preliminary Examination Report, Application PCT/US03/25742, Dec. 20, 2004.
International Preliminary Examination Report, Application PCT/US03/29460, Dec. 8, 2004.
International Preliminary Examination Report, Application PCT/US03/29858, May 23, 2005.
International Preliminary Examination Report, Application PCT/US03/29859, Aug. 16, 2004.
International Preliminary Examination Report, Application PCT/US03/38550, May 23, 2005.
International Preliminary Report on Patentability, Application PCT/US04/02122, May 13, 2005.
International Preliminary Report on Patentability, Application PCT/US04/08030, Jun. 10, 2005.
International Preliminary Report on Patentability, Application PCT/US04/08073, May 9, 2005.
International Preliminary Report on Patentability, Application PCT/US04/008170, Sep. 29, 2005.
International Preliminary Report on Patentability, Application PCT/US04/08171, Sep. 13, 2005.
International Preliminary Report on Patentability, Application PCT/US04/11177, Jun. 9, 2005.
International Preliminary Report on Patentability, Application PCT/US04/28438, Sep. 20, 2005.
Written Opinion to Application No. PCT/US03/25675, May 9, 2005.
Combined Search Report and Written Opinion to Application No. PCT/US04/10762, Sep. 1, 2005.
Combined Search Report and Written Opinion to Application No. PCT/US04/11973, Sep. 27, 2005.
Combined Search Report and Written Opinion to Application No. PCT/US04/28423, Jul. 13, 2005.
Search Report to Application No. GB 0415835.8, Dec. 2, 2004.
Search Report to Application No. GB 0415835.8, Mar. 10, 2005.
Examination Report to Application No. GB 0400018.8, May 17, 2005.
Examination Report to Application No. GB 0400019.6, May 19, 2005.
Examination Report to Application No. GB 0403891.5, Jun. 30, 2005.
Examination Report to Application No. GB 0404796.5, Apr. 14, 2005.
Examination Report to Application No. GB 0406257.6, Jun. 16, 2005.
Examination Report to Application No. GB 0406258.4, Jul. 27, 2005.
Examination Report to Application No. GB 0408672.4, Mar. 21, 2005.
Examination Report to Application No. GB 0412533.2, May 20, 2005.
Examination Report to Application No. GB 0428141.6, Sep. 15, 2005.
Examination Report to Application No. GB 0500184.7, Sep. 12, 2005.
Examination Report to Application No. GB 0500600.2, Sep. 6, 2005.
Examination Report to Application No. GB 0501667.0, May 27, 2005.
Examination Report to Application No. GB 0503470.7, Sep. 22, 2005.
Examination Report to Application No. GB 0506699.8, Sep. 21, 2005.
Search and Examination Report to Application No. GB 0425948.7, Apr. 14, 2005.
Search and Examination Report to Application No. GB 0425951.1, Apr. 14, 2005.
Search and Examination Report to Application No. GB 0425956.0, Apr. 14, 2005.
Search and Examination Report to Application No. GB 0505039.8, Jul. 22, 2005.
Search and Examination Report to Application No. GB 0506697.2, May 20, 2005.
Search and Examination Report to Application No. GB 0506700.4, Sep. 20, 2005.
Search and Examination Report to Application No. GB 0509618.5, Sep. 27, 2005.
Search and Examination Report to Application No. GB 0509620.1, Sep. 27, 2005.
Search and Examination Report to Application No. GB 0509626.8, Sep. 27, 2005.
Search and Examination Report to Application No. GB 0509627.6, Sep. 27, 2005.
Search and Examination Report to Application No. GB 0509629.2, Sep. 27, 2005.
Search and Examination Report to Application No. GB 0509630.0, Sep. 27, 2005.
Search and Examination Report to Application No. GB 0509631.8, Sep. 27, 2005.
Search and Examination Report to Application No. GB 0512396.3, Jul. 26, 2005.

Search and Examination Report to Application No. GB 0512398.9, Jul. 27, 2005.
Examination Report to Application No. AU 2001278196, Apr. 21, 2005.
Examination Report to Application No. AU 2002237757, Apr. 28, 2005.
Examination Report to Application No. AU 2002240366, Apr. 13, 2005.
Search Report to Application No. EP 02806451.7; Feb. 9, 2005.
Search Report to Application No. Norway 1999 5593, Aug. 20, 2002.
Halliburton Energy Services, "Halliburton Completion Products" 1996, Page Packers 5-37, United States of America.
Turcotte and Schubert, Geodynamics (1982) John Wiley & Sons, Inc., pp. 9, 432.
Baker Hughes Incorporated, "EXPatch Expandable Cladding System" (2002).
Baker Hughes Incorporated, "EXPress Expandable Screen System".
High-Tech Wells, "World's First Completion Set Inside Expandable Screen" (2003) Gilmer, J.M., Emerson, A.B.
Baker Hughes Incorporated, "Technical Overview Production Enhancement Technology" (Mar. 10, 2003) Geir Owe Egge.
Baker Hughes Incorporated, "FORMlock Expandable Liner Hangers".
Weatherford Completion Systems, "Expandable Sand Screens" (2002).
Expandable Tubular Technology, "EIS Expandable Isolation Sleeve" (Feb. 2003).
Oilfield Catalog; "Jet-Lok Product Application Description" (Aug. 8, 2003).
Power Ultrasonics, "Design and Optimisation of an Ultrasonic Die System For Form" Chris Cheers (1999, 2000).
Research Area—Sheet Metal Forming—Superposition of Vibra; Fraunhofer IWU (2001).
Research Projects;"Analysis of Metal Sheet Formability and It's Factors of Influence" Prof. Dorel Banabic (2003).
www.materialsresources.com, "Low Temperature Bonding of Dissimilar and Hard-to-Bond Materials and Metal-Including . . . " (2004).
www.tribtech.com. "Trib-gel A Chemical Cold Welding Agent" G R Linzell (Sep. 14, 1999).
www.spurind.com, "Galvanic Protection, Metallurgical Bonds, Custom Fabrication—Spur Industries" (2000).
Lubrication Engineering, "Effect of Micro-Surface Texturing on Breakaway Torque and Blister Formation on Carbon-Graphite Faces In a Mechanical Seal" Philip Guichelaar, Karalyn Folkert, Izhak Etsion, Steven Pride (Aug. 2002).
Surface Technologies Inc., "Improving Tribological Performance of Mechanical Seals by Laser Surface Texturing" Izhak Etsion.
Tribology Transactions "Experimental Investigation of Laser Surface Texturing for Reciprocating Automotive Components" G Ryk, Y Klingerman and I Etsion (2002).
Proceeding of the International Tribology Conference, "Microtexturing of Functional Surfaces for Improving Their Tribological Performance" Henry Haefke, Yvonne Gerbig, Gabriel Dumitru and Valerio Romano (2002).
Sealing Technology, "A laser surface textured hydrostatic mechanical seal" Izhak Etsion and Gregory Halperin (Mar. 2003).
Metalforming Online, "Advanced Laser Texturing Tames Tough Tasks" Harvey Arbuckle.
Tribology Transactions, "A Laser Surface Textured Parallel Thrust Bearing" V. Brizmer, Y. Klingerman and I. Etsion (Mar. 2003).
PT Design, "Scratching the Surface" Todd E. Lizotte (Jun. 1999).
Tribology Transactions, "Friction-Reducing Surface-Texturing in Reciprocating Automotive Components" Aviram Ronen, and Izhak Etsion (2001).
Michigan Metrology "3D Surface Finish Roughness Texture Wear WYKO Veeco" C.A. Brown, PHD; Charles, W.A. Johnsen, S. Chester.
Letter From Baker Oil Tools to William Norvell in Regards to Enventure's Claims of Baker Infringement Of Eventure's Expandable Patents Apr. 1, 2005.
International Search Report, Application PCT/IL00/00245, Sep. 18, 2000.
International Search Report, Application PCT/US00/18635, Nov. 24, 2000.
International Search Report, Application PCT/US00/27645, Dec. 29, 2000.
International Search Report, Application PCT/US00/30022, Mar. 27, 2001.
International Search Report, Application PCT/US01/04753, Jul. 3, 2001.
International Search Report, Application PCT/US01/19014, Nov. 23, 2001.
International Search Report, Application PCT/US01/23815, Nov. 16, 2001.
International Search Report, Application PCT/US01/28960, Jan. 22, 2002.
International Search Report, Application PCT/US01/30256, Jan. 3, 2002.
International Search Report, Application PCT/US01/41446, Oct. 30, 2001.
International Search Report, Application PCT/US02/00093, Aug. 6, 2002.
International Search Report, Application PCT/US02/00677, Jul. 17, 2002.
International Search Report, Application PCT/US02/00677, Feb. 24, 2004.
International Search Report, Application PCT/US02/04353, Jun. 24, 2002.
International Search Report, Application PCT/US02/20256, Jan. 3, 2003.
International Search Report, Application PCT/US02/20477; Oct. 31, 2003.
International Search Report, Application PCT/US02/20477; Apr. 6, 2004.
International Search Report, Application PCT/US02/24399; Feb. 27, 2004.
International Examination Report, Application PCT/US02/24399, Aug. 6, 2004.
International Search Report, Application PCT/US02/25608; May 24, 2004.
International Search Report, Application PCT/US02/25727; Feb. 19, 2004.
Examination Report, Application PCT/US02/25727; Jul. 7, 2004.
International Search Report, Application PCT/US02/29856, Dec. 16, 2002.
International Search Report, Application PCT/US02/36157; Sep. 29, 2003.
International Search Report, Application PCT/US02/36157; Apr. 14, 2004.
International Search Report, Application PCT/US02/36267; May 21, 2004.
International Examination Report, Application PCT/US02/36267, Jan. 4, 2004.
International Search Report, Application PCT/US02/39418, Mar. 24, 2003.
International Examination Report, Application PCT/US02/39418, Feb. 18, 2005.
International Search Report, Application PCT/US02/39425, May 28, 2004.
International Search Report, Application PCT/US03/00609, May 20, 2004.
International Search Report, Application PCT/US03/04837, May 28, 2004.
International Examination Report, Application PCT/US03/04837, Dec. 9, 2004.
International Search Report, Application PCT/US03/06544, Jun. 9, 2004.
International Search Report, Application PCT/US03/10144; Oct. 31, 2003.
Examination Report, Application PCT/US03/10144; Jul. 7, 2004.
International Search Report, Application PCT/US03/11765; Nov. 13, 2003.
International Examination Report, Application PCT/US03/11765; Dec. 10, 2004.

International Examination Report, Application PCT/US03/11765;; Jan. 25, 2005.
International Search Report, Application PCT/US03/13787; May 28, 2004.
International Examination Report, Application PCT/US03/13787; Apr. 7, 2005.
International Examination Report, Application PCT/US03/13787; Mar. 2, 2005.
International Search Report, Application PCT/US03/14153; May 28, 2004.
International Search Report, Application PCT/US03/15020; Jul. 30, 2003.
International Search Report, Application PCT/US03/18530; Jun. 24, 2004.
International Search Report, Application PCT/US03/19993; May 24, 2004.
International Search Report, Application PCT/US03/20694; Nov. 12, 2003.
International Search Report, Application PCT/US03/20870; May 24, 2004.
International Search Report, Application PCT/US03/20870; Sep. 30, 2004.
International Search Report, Application PCT/US03/24779; Mar. 3, 2004.
International Search Report, Application PCT/US03/25675; May 25, 2004.
International Search Report, Application PCT/US03/25676; May 17, 2004.
International Examination Report, Application PCT/US03/25676, Aug. 17, 2004.
International Search Report, Application PCT/US03/25677; May 21, 2004.
International Examination Report, Application PCT/US03/25677, Aug. 17, 2004.
International Search Report, Application PCT/US03/25707; Jun. 23, 2004.
International Search Report, Application PCT/US03/25715; Apr. 9, 2004.
International Search Report, Application PCT/US03/25716; Jan. 13, 2005.
International Search Report, Application PCT/US03/25742; May 27, 2004.
International Search Report, Application PCT/US03/25742; Dec. 20, 2004.
International Search Report, Application PCT/US03/29460; May 25, 2004.
International Examination Report, Application PCT/US03/29460; Dec. 8, 2004.
International Search Report, Application PCT/US03/25667; Feb. 26, 2004.
International Search Report, Application PCT/US03/29858; Jun. 30, 2003.
International Search Report, Application PCT/US03/29859; May 21, 2004.
International Examination Report, Application PCT/US03/29859, Aug. 16, 2004.
International Search Report, Application PCT/US03/38550; Jun. 15, 2004.
International Preliminary Report on Patentability, Application PCT/US04/04740; Apr. 27, 2005.
International Preliminary Report on Patentability, Application PCT/US04/06246; May 5, 2005.
International Preliminary Report on Patentability, Application PCT/US04/08030; Apr. 7, 2005.
Search Report to Application No. GB 0003251.6, Jul. 13, 2000.
Search Report to Application No. GB 0004282.0, Jul. 31, 2000.
Search Report to Application No. GB 0004282.0 Jan. 15, 2001.
Search and Examination Report to Application No. GB 0004282.0, Jun. 3, 2003.
Search Report to Application No. GB 0004285.3, Jul. 12, 2000.
Search Report to Application No. GB 0004285.3, Jan. 17, 2001.
Search Report to Application No. GB 0004285.3, Jan. 19, 2001.
Search Report to Application No. GB 0004285.3, Aug. 28, 2002.
Examination Report to Application No. 0004285.3, Mar. 28, 2003.
Examination Report to Application No. GB 0005399.1; Jul. 24, 2000.
Search Report to Application No. GB 0005399.1, Feb. 15, 2001.
Examination Report to Application No. GB 0005399.1; Oct. 14, 2002.
Search Report to Application No. GB 0013661.4, Oct. 20, 2000.
Search Report to Application No. GB 0013661.4, Apr. 17, 2001.
Search Report to Application No. GB 0013661.4, Feb. 19, 2003.
Examination Report to Application No. GB 0013661.4, Nov. 25, 2003.
Search Report to Application No. GB 0013661.4, Oct. 20, 2003.
Examination Report to Application No. GB 0208367.3, Apr. 4, 2003.
Examination Report to Application No. GB 0208367.3, Nov. 4, 2003.
Examination Report to Application No. GB 0208367.3, Nov. 17, 2003.
Examination Report to Application No. GB 0208367.3, Jan. 30, 2004.
Examination Report to Application No. GB 0212443.6, Apr. 10, 2003.
Examination Report to Application No. GB 0216409.3, Feb. 9, 2004.
Search Report to Application No. GB 0219757.2, Nov. 25, 2002.
Search Report to Application No. GB 0219757.2, Jan. 20, 2003.
Examination Report to Application No. GB 0219757.2, May 10, 2004.
Search Report to Application No. GB 0220872.6, Dec. 5, 2002.
Search Report to Application No. GB 0220872.6, Mar. 13, 2003.
Examination Report to Application No. GB 0220872.6, Oct. 29, 2004.
Search Report to Application No. GB 0225505.7, Mar. 5, 2003.
Search and Examination Report to Application No. GB 0225505.7, Jul. 1, 2003.
Examination Report to Application No. GB 0225505.7, Oct. 27, 2004.
Examination Report to Application No. GB 0225505.7 Feb. 15, 2005.
Examination Report to Application No. GB 0300085.8, Nov. 28, 2003.
Examination Report to Application No. GB 030086.6, Dec. 1, 2003.
Examination Report to Application No. GB 0306046.4, Sep. 10, 2004.
Search and Examination Report to Application No. GB 0308290.6, Jun. 2, 2003.
Search and Examination Report to Application No. GB 0308293.0, Jun. 2, 2003.
Search and Examination Report to Application No. GB 0308293.0, Jul. 14, 2003.
Search and Examination Report to Application No. GB 0308294.8, Jun. 2, 2003.
Search and Examination Report to Application No. GB 0308294.8, Jul. 14, 2003.
Search and Examination Report to Application No. GB 0308295.5, Jun. 2, 2003.
Search and Examination Report to Application No. GB 0308295.5, Jul. 14, 2003.
Search and Examination Report to Application No. GB 0308296.3, Jun. 2, 2003.
Search and Examination Report to Application No. GB 0308296.3, Jul. 14, 2003.
Search and Examination Report to Application No. GB 0308297.1, Jun. 2, 2003.
Search and Examination Report to Application No. GB 0308297.1, Jul. 2003.
Search and Examination Report to Application No. GB 0308299.7, Jun. 2, 2003.
Search and Examination Report to Application No. GB 0308299.7, Jun. 14, 2003.
Search and Examination Report to Application No. GB 0308302.9, Jun. 2, 2003.
Search and Examination Report to Application No. GB 0308303.7, Jun. 2, 2003.
Search and Examination Report to Application No. GB 0308303.7, Jul. 14, 2003.
Search and Examination Report to Application No. GB 0310090.6, Jun. 24, 2003.

Search and Examination Report to Application No. GB 0310099.7, Jun. 24, 2003.
Search and Examination Report to Application No. GB 0310101.1, Jun. 24, 2003.
Search and Examination Report to Application No. GB 0310104.5, Jun. 24, 2003.
Search and Examination Report to Application No. GB 0310118.5, Jun. 24, 2003.
Search and Examination Report to Application No. GB 0310757.0, Jun. 12, 2003.
Search and Examination Report to Application No. GB 0310759.6, Jun. 12, 2003.
Search and Examination Report to Application No. GB 0310770.3, Jun. 12, 2003.
Search and Examination Report to Application No. GB 0310772.9, Jun. 12, 2003.
Search and Examination Report to Application No. GB 0310785.1, Jun. 12, 2003.
Search and Examination Report to Application No. GB 0310795.0, Jun. 12, 2003.
Search and Examination Report to Application No. GB 0310797.6, Jun. 12, 2003.
Search and Examination Report to Application No. GB 0310799.2, Jun. 12, 2003.
Search and Examination Report to Application No. GB 0310801.6, Jun. 12, 2003.
Search and Examination Report to Application No. GB 0310833.9, Jun. 12, 2003.
Search and Examination Report to Application No. GB 0310836.2, Jun. 12, 2003.
Examination Report to Application No. GB 0310836.2, Aug. 7, 2003.
Examination Report to Application No. GB 0311596.1, May 18, 2004.
Search and Examination Report to Application No. GB 0313406.1, Sep. 3, 2003.
Search and Examination Report to Application No. GB 0313406.1, Sep. 3, 2003.
Examination Report to Application No. GB 0314846.7, Jul. 15, 2004.
Search and Examination Report to Application No. GB 0316883.8, Aug. 14, 2003.
Search and Examination Report to Application No. GB 0316883.8, Nov. 25, 2003.
Search and Examination Report to Application No. GB 0316886.1, Aug. 14, 2003.
Search and Examination Report to Application No. GB 0316886.1, Nov. 25, 2003.
Search and Examination Report to Application No. GB 0316887.9, Aug. 14, 2003.
Search and Examination Report to Application No. GB 0316887.9, Nov. 25, 2003.
Search and Examination Report to Application No. GB 0318545.1, Sep. 3, 2003.
Search and Examination Report to Application No. GB 0318547.4; Sep. 3, 2003.
Search and Examination Report to Application No. GB 0318549.3; Sep. 3, 2003.
Search and Examination Report to Application No. GB 0318550.1, Sep. 3, 2003.
Search and Examination Report to Application No. GB 0320579.6, Dec. 16, 2003.
Search and Examination Report to Application No. GB 0320580.4, Dec. 17, 2003.
Examination Report to Application No. GB 0320747.9, May 25, 2004.
Search and Examination Report to Application No. GB 0323891.2, Dec. 19, 2003.
Search and Examination Report to Application No. GB 0324172.6, Nov. 4, 2003.
Search and Examination Report to Application No. GB 0324174.2, Nov. 4, 2003.
Search and Examination Report to Application No. GB 0325071.9, Nov. 18, 2003.
Examination Report to Application No. GB 0325071.9, Feb. 2, 2004.
Examination Report to Application No. GB 0325072.7, Feb. 5, 2004.
Search and Examination Report to Application No. GB 0325072.7; Dec. 3, 2003.
Examination Report to Application No. GB 0325072.7; Apr. 13, 2004.
Examination Report to Application No. GB 0400018.8; Oct. 29, 2004.
Examination Report to Application No. GB 0400019.6; Oct. 29, 2004.
Search and Examination Report to Application No. GB 0403891.5, Jun. 9, 2004.
Examination Report to Application No. GB 0403891.5, Feb. 14, 2005.
Search and Examination Report to Application No. GB 0403893.1, Jun. 9, 2004.
Examination Report to Application No. GB 0403893.1, Feb. 14, 2005.
Search and Examination Report to Application No. GB 0403894.9, Jun. 9, 2004.
Examination Report to Application No. GB 0403894.9, Feb. 15, 2005.
Search and Examination Report to Application No. GB 0403897.2, Jun. 9, 2004.
Search and Examination Report to Application No. GB 0403920.2, Jun. 10, 2004.
Examination Report to Application No. GB 0403920.2, Feb. 15, 2005.
Search and Examination Report to Application No. GB 0403921.0, Jun. 10, 2004.
Examination Report to Application No. GB 0403921.0, Feb. 15, 2005.
Search and Examination Report to Application No. GB 0403926.9, Jun. 10, 2004.
Examination Report to Application No. GB 0404796.5; May 20, 2004.
Search and Examination Report to Application No. GB 0404826.0, Apr. 21, 2004.
Search and Examination Report to Application No. GB 0404828.6, Apr. 21, 2004.
Search and Examination Report to Application No. GB 0404830.2, Apr. 21, 2004.
Search and Examination Report to Application No. GB 0404832.8, Apr. 21, 2004.
Search and Examination Report to Application No. GB 0404833.6, Apr. 21, 2004.
Search and Examination Report to Application No. GB 0404833.6, Aug. 19, 2004.
Search and Examination Report to Application No. GB 0404837.7, May 17, 2004.
Examination Report to Application No. GB 0404837.7, Jul. 12, 2004.
Search and Examination Report to Application No. GB 0404839.3, May 14, 2004.
Search and Examination Report to Application No. GB 0404842.7, May 14, 2004.
Search and Examination Report to Application No. GB 0404845.0, May 14, 2004.
Search and Examination Report to Application No. GB 0404849.2, May 17, 2004.
Examination Report to Application No. GB 0406257.6, Jun. 28, 2004.
Examination Report to Application No. GB 0406257.6, Jan. 25, 2005.
Examination Report to Application No. GB 0406258.4, May 20, 2004.
Examination Report to Application No. GB 0406258.4; Jan. 12, 2005.
Examination Report to Application No. GB 0408672.4, Jul. 12, 2004.
Examination Report to Application No. GB 0404830.2, Aug. 17, 2004.
Search and Examination Report to Application No. GB 0411698.4, Jun. 30, 2004.
Examination Report to Application No. GB 0411698.4, Jan. 24, 2005.

Search and Examination Report to Application No. GB 0411892.3, Jul. 14, 2004.
Examination Report to Application No. GB 0411892.3, Feb. 21, 2005.
Search and Examination Report to Application No. GB 0411893.3, Jul. 14, 2004.
Search and Examination Report to Application No. GB 0411894.9, Jun. 30, 2004.
Search and Examination Report to Application No. GB 0412190.1, Jul. 22, 2004.
Search and Examination Report to Application No. GB 0412191.9, Jul. 22, 2004.
Search and Examination Report to Application No. GB 0412192.7, Jul. 22, 2004.
Search Report to Application No. GB 0415835.8; Mar. 10, 2005.
Examination Report to Application No. GB 0416625.2 Jan. 20, 2005.
Search and Examination Report to Application No. GB 0416834.0, Aug. 11, 2004.
Search and Examination Report to Application No. GB 0416834.0, Nov. 16, 2004.
Search and Examination Report to Application No. GB 0417810.9, Aug. 25, 2004.
Search and Examination Report to Application No. GB 0417811.7, Aug. 25, 2004.
Search and Examination Report to Application No. GB 0418005.5, Aug. 25, 2004.
Search and Examination Report to Application No. GB 0418425.5, Sep. 10, 2004.
Search and Examination Report to Application No. GB 0418426.3 Sep. 10, 2004.
Search and Examination Report to Application No. GB 0418427.1 Sep. 10, 2004.
Search and Examination Report to Application No. GB 0418429.7 Sep. 10, 2004.
Search and Examination Report to Application No. GB 0418430.5 Sep. 10, 2004.
Search and Examination Report to Application No. GB 0418431.3 Sep. 10, 2004.
Search and Examination Report to Application No. GB 0418432.1 Sep. 10, 2004.
Search and Examination Report to Application No. GB 0418433.9 Sep. 10, 2004.
Search and Examination Report to Application No. GB 0418439.6 Sep. 10, 2004.
Search and Examination Report to Application No. GB 0418442.0 Sep. 10, 2004.
Examination Report to Application No. GB 0422419.2 Dec. 8, 2004.
Search and Examination Report to Application No. GB 0422893.8 Nov. 24, 2004.
Search and Examination Report to Application No. GB 0423416.7 Nov. 12, 2004.
Search and Examination Report to Application No. GB 0423417.5 Nov. 12, 2004.
Search and Examination Report to Application No. GB 0423418.3 Nov. 12, 2004.
Search and Examination Report to Application No. GB 0426155.8 Jan. 12, 2005.
Search and Examination Report to Application No. GB 0426156.6 Jan. 12, 2005.
Search and Examination Report to Application No. GB 0426157.4 Jan. 12, 2005.
Examination Report to Application No. GB 0428141.6 Feb. 9, 2005.
Examination Report to Application No. GB 0500184.7 Feb. 9, 2005.
Search and Examination Report to Application No. GB 0500600.2 Feb. 15, 2005.
Search and Examination Report to Application No. GB 0503470.7 Mar. 21, 2005.
Search Report to Application No. GB 9926449.1, Mar. 27, 2000.
Search Report to Application No. GB 9926449.1, Jul. 4, 2001.
Search Report to Application No. GB 9926449.1, Sep. 5, 2001.
Search Report to Application No. GB 9926450.9, Feb. 28, 2000.
Examination Report to Application No. GB 9926450.9, May 15, 2002.
Examination Report to Application No. GB 9926450.9, Nov. 22, 2002.
Search Report to Application No. GB 9930398.4, Jun. 27, 2000.
Written Opinion to Application No. PCT/US01/19014; Dec. 10, 2002.
Written Opinion to Application No. PCT/US01/23815; Jul. 25, 2002.
Written Opinion to Application No. PCT/US01/28960; Dec. 2, 2002.
Written Opinion to Application No. PCT/US01/30256; Nov. 11, 2002.
Written Opinion to Application No. PCT/US02/00093; Apr. 21, 2003.
Written Opinion to Application No. PCT/US02/00677; Apr. 17, 2003.
Written Opinion to Application No. PCT/US02/04353; Apr. 11, 2003.
Written Opinion to Application No. PCT/US02/20256; May 9, 2003.
Written Opinion to Application No. PCT/US02/24399; Apr. 28, 2004.
Written Opinion to Application No. PCT/US02/25608 Sep. 13, 2004.
Written Opinion to Application No. PCT/US02/25608 Feb. 2, 2005.
Written Opinion to Application No. PCT/US03/25675 Nov. 24, 2004.
Written Opinion to Application No. PCT/US02/25727; May 17, 2004.
Written Opinion to Application No. PCT/US02/39418; Jun. 9, 2004.
Written Opinion to Application No. PCT/US02/39425; Nov. 22, 2004.
Written Opinion to Application No. PCT/US02/39425; Apr. 11, 2005.
Written Opinion to Application No. PCT/US03/06544; Feb. 18, 2005.
Written Opinion to Application No. PCT/US03/11765 May 11, 2004.
Written Opinion to Application No. PCT/US03/13787 Nov. 9, 2004.
Written Opinion to Application No. PCT/US03/14153 Sep. 9, 2004.
Written Opinion to Application No. PCT/US03/14153 Nov. 9, 2004.
Written Opinion to Application No. PCT/US03/18530 Sep. 13, 2004.
Written Opinion to Application No. PCT/US03/19993 Oct. 15, 2004.
Written Opinion to Application No. PCT/US03/29858 Jan. 21, 2004.
Written Opinion to Application No. PCT/US03/38550 Dec. 10, 2004.
Written Opinion to Application No. PCT/US04/08171 May 5, 2005.
Combined Search Report and Written Opinion to Application No. PCT/US04/00631; Mar. 28, 2005.
Combined Search Report and Written Opinion to Application No. PCT/US04/02122 Feb. 24, 2005.
Combined Search Report and Written Opinion to Application No. PCT/US04/04740 Jan. 19, 2005.
Combined Search Report and Written Opinion to Application No. PCT/US04/06246 Jan. 26, 2005.
Combined Search Report and Written Opinion to Application No. PCT/US04/08030 Jan. 6, 2005.
Combined Search Report and Written Opinion to Application No. PCT/US04/08073 Mar. 4, 2005.
Combined Search Report and Written Opinion to Application No. PCT/US04/08170 Jan. 13, 2005.
Combined Search Report and Written Opinion to Application No. PCT/US04/08171 Feb. 16, 2005.
Combined Search Report and Written Opinion to Application No. PCT/US04/11172 Feb. 14, 2005.
Combined Search Report and Written Opinion to Application No. PCT/US04/28438 Mar. 14, 2005.

* cited by examiner

INTERPOSED JOINT SEALING LAYER
METHOD OF FORMING A WELLBORE
CASING

CROSS REFERENCE TO RELATED APPLICATIONS

The present application is the National Stage patent application for PCT patent application Ser. No. PCT/US2003/025676, filed on Aug. 18, 2003, which claimed the benefit of the filing dates of (1) U.S. provisional patent application Ser. No. 60/405,394, filed on Aug. 23, 2002, the disclosure of which is incorporated herein by reference.

The present application is a continuation-in-part of U.S. utility patent application Ser. No. 10/525,332, filed on Jul. 5, 2005, which was a continuation-in-part of U.S. utility patent application Ser. No. 10/522,029, filed on Mar. 10, 2006, which was a continuation-in-part of U.S. utility patent application Ser. No. 10/511,410, filed on Oct. 14, 2004 which claimed the benefit of the filing date of U.S. provisional patent application Ser. No. 60/372,632, filed on Apr. 15, 2002, which was a continuation-in-part of U.S. utility patent application Ser. No. 10/510,966, filed on Oct. 12, 2004, which claimed the benefit of the filing date of U.S. provisional patent application Ser. No. 60/372,048, filed on Apr. 12, 2002, which was a continuation-in-part of U.S. utility patent application Ser. No. 10/500,745, filed on Jul. 6, 2004, which claimed the benefit of the filing date of U.S. provisional patent application Ser. No. 10/500,745, filed on Dec. 10, 2002.

The present application is related to the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. Pat. No. 6,328,113, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application serial no. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S. provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May, 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; and (38) U.S. provisional patent application Ser. No. 60/397,284, filed on Jul. 19, 2002, (39) U.S. provisional patent application Ser. No. 60/398,061, filed on Jul. 24, 2002, and (40) U.S. provisional patent application No. 60/339,240, filed on Jul. 29, 2002, and (41) U.S. provisional patent application No. 60/405,610, filed on even date herewith, the disclosures of which are incorporated herein by reference.

BACKGROUND OF THE INVENTION

This invention relates generally to oil and gas exploration, and in particular to forming and repairing wellbore casings to facilitate oil and gas exploration.

Conventionally, when a wellbore is created, a number of casings are installed in the borehole to prevent collapse of the borehole wall and to prevent undesired outflow of drilling fluid into the formation or inflow of fluid from the formation into the borehole. The borehole is drilled in intervals whereby a casing which is to be installed in a lower borehole interval is lowered through a previously installed casing of an upper borehole interval. As a consequence of this procedure the casing of the lower interval is of smaller diameter than the casing of the upper interval. Thus, the casings are in a nested arrangement with casing diameters decreasing in downward direction. Cement annuli are provided between the outer surfaces of the casings and the borehole wall to seal the casings from the borehole wall. As a consequence of this nested arrangement a relatively large borehole diameter is required at the upper part of the wellbore. Such a large borehole diameter involves increased costs due to heavy casing handling equipment, large drill bits and increased volumes of drilling fluid and drill cuttings. Moreover, increased drilling rig time is involved due to required cement pumping, cement hardening, required equipment changes due to large variations in hole diameters drilled in the course of the well, and the large volume of cuttings drilled and removed.

During oil exploration, a wellbore typically traverses a number of zones within a subterranean formation. Wellbore casings are then formed in the wellbore by radially expanding and plastically deforming tubular members that are coupled to one another by threaded connections existing methods for radially expanding and plastically deforming tubular members coupled to one another by threaded connections are not always reliable and do not always produce satisfactory results. In particular, the threaded connections can be damaged during the radial expansion process. Furthermore, the threaded connections between adjacent tubular members, whether radially expanded or not, are typically not sufficiently coupled to permit the transmission of energy through the tubular members from the surface to the downhole location. Further, the damaged threads may permit undesirable leakage between the inside of the casing and the exterior of the casing.

The present invention is directed to overcoming one or more of the limitations of the existing procedures for forming new sections of casing in a wellbore.

SUMMARY OF THE INVENTION

According to one aspect of the present invention, a method of forming a wellbore casing within a borehole that traverses a subterranean formation is provided that includes assembling a tubular liner by coupling threaded portions of first and second tubular members having a multi-layer tubular insert between the threads of the first tubular member and the threads of the second tubular member, positioning the tubular liner assembly within a borehole, and radially expanding and plastically deforming the tubular liner assembly within the borehole wherein the multi-layer tubular insert includes a first layer having a first modulus of elasticity and a second layer coupled to the first layer having a second modulus of elasticity wherein the first modulus of elasticity is different from the second modulus of elasticity. According to another aspect of the present invention, a method of forming a wellbore casing within a borehole that traverses a subterranean formation is provided that includes assembling a tubular liner by coupling a multi-layer metallic insert assembly to a threaded portion of the first tubular member and coupling a threaded portion of a second tubular member to the threaded portion of first tubular member with the multi-layer tubular insert there between, and positioning the tubular liner assembly within a borehole and radially expanding and plastically deforming the tubular liner assembly and wherein the first tubular insert is a metal have a first modulus of elasticity and a second tubular insert is composed of a metal having a second modulus of elasticity different from the first modulus of elasticity. According to another aspect of the present invention, the multi-layers of the inner post tubular insert include a first insert of copper and a second tubular insert of cadmium.

According to another aspect of the present invention, both layers of the multi-layer tubular liner inserted between the threads of the wellbore casing members have a modulus of elasticity less than the tubular members. According to another aspect of the present invention, the multi-layer tubular insert includes a first tubular insert providing a fluidic seal after radially expanding and plastically deforming the tubular liner assembly, and another layer of the multi-layer insert provides a micro-fluidic seal after radially expanding and plastically deforming a tubular liner.

According to another aspect of the present invention, the multi-layer tubular liner includes a first, a second, and a third layer, each adjacent layer having a different modulus of elasticity.

According to another aspect of the present invention, the multi-layer tubular insert assembly includes a first, second, third, and fourth layer, each layer having a different modulus of elasticity from an adjacent layer.

According to another aspect of the present invention, a method of forming a wellbore casing within a borehole that traverses a subterranean formation is provided that includes expanding a joined tubular members, such as joined wellbore casings, having a layer of a metallic alloy that has a first melting temperature prior to exposure to heat and strain as a second higher melting temperature after exposure to heat and or strain (know as a eutectic material) interposed between the joint prior to radially expanding the jointed tubular members.

DETAILED DESCRIPTION OF THE ILLUSTRATIVE EMBODIMENTS

Figure 1:
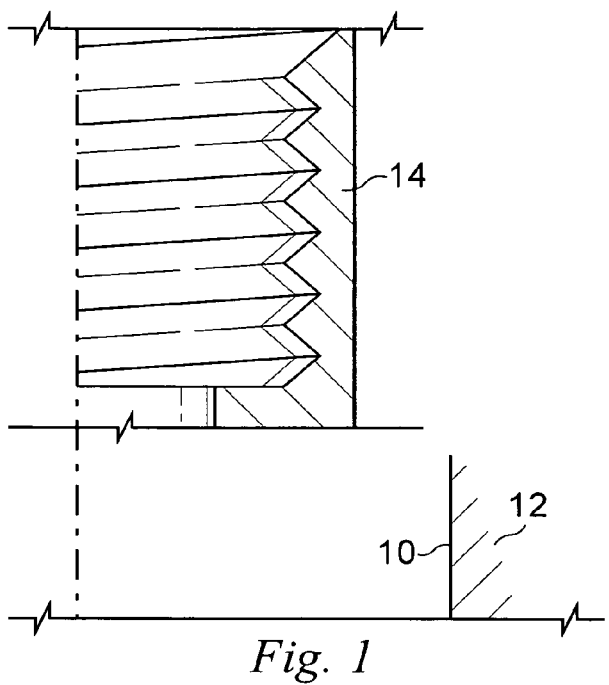
FIG. 1 is a fragmentary cross-sectional schematic illustration of a first tubular member, such as a first wellbore casing, for placement within a borehole that traverses a subterranean formation.

Referring to FIG. 1, a borehole 10 that traverses a subterranean formation 12 includes a first tubular member 14, such as a first wellbore casing 14 that may be positioned within the borehole. In several exemplary embodiments, tubular members in the form of wellbore casings will be described and depicted. It will be understood that although the methods are particularly advantageous for forming wellbore casings, certain advantageous features may also be applicable to other tubular members as described and claimed herein. In an illustrative embodiment, the first wellbore casing 14 may, for example, be positioned within and coupled to the borehole 10 using any number of conventional methods and apparatus, that may or may not include radial expansion and plastic deformation of the first wellbore casing 14, and/or using one or more of the methods and apparatus disclosed in one or more of the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. Pat. No. 6,328,113, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application Ser. No. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S. provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; and (38) U.S. provisional patent application Ser. No. 60/397,284, filed on Jul. 19, 2002, (39) U.S. provisional patent application Ser. No. 60/398,061, filed on Jul. 24, 2002, and (40) U.S. provisional patent application No. 60/339,240, filed on Jul. 29, 2002, and (41) U.S. provisional patent application No. 60/405,610, filed on even date herewith, the disclosures of which are incorporated herein by reference.

Figure 2:
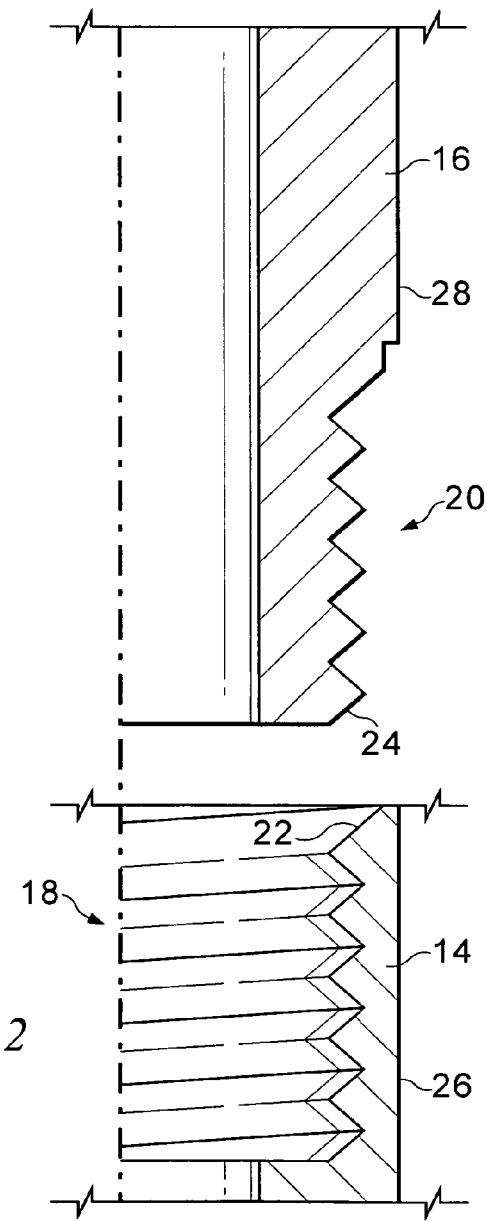
FIG. 2 is a fragmentary cross-sectional schematic illustration of the first tubular member, such as the first wellbore casing as in FIG. 1 and an aligned second tubular member, such as a second wellbore casing in position for coupling together and for placing the first and second tubular members, such as the depicted wellbore casings within a borehole.

Referring to FIG. 2, the second tubular member 16, such as second wellbore casing 16 is then overlappingly coupled to the first wellbore casing 14 for positioning within the borehole 10. In several exemplary embodiments, the first wellbore casing 14 may, for example, be coupled at a first coupling portion 18 to a second coupling portion 20 of the second wellbore casing 16 using any number of conventional methods and apparatus. For example as shown in FIG. 2, the coupling may comprise a male, or externally, threaded portion 24 engaged with a female, or internally, threaded portion 22. The method of coupling may or may not include radial expansion and plastic deformation of either of the wellbore casings 14 or 16 or both, and or using one of more of the methods disclosed in one of more of the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. Pat. No. 6,328,113, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511, 941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application Ser. No. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S. provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; and (38) U.S. provisional patent application Ser. No. 60/397, 284, filed on Jul. 19, 2002, (39) U.S. provisional patent application Ser. No. 60/398,061, filed on Jul. 24, 2002, and (40) U.S. provisional patent application No. 60/339,240, filed on Jul. 29, 2002, and (41) U.S. provisional patent application No. 60/405,610, filed on even date herewith, the disclosures of which are incorporated herein by reference.

Figure 3:
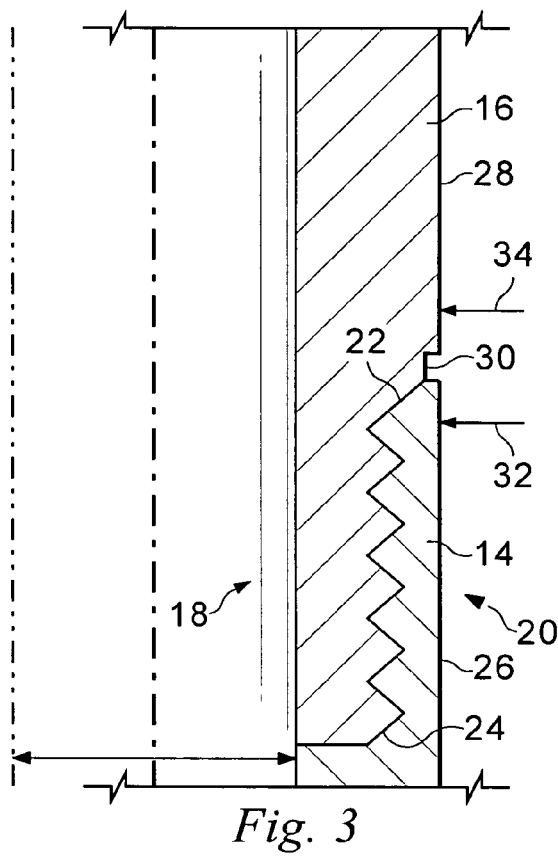
FIG. 3 is a fragmentary cross-sectional schematic illustration of first and second wellbore casings of FIG. 2 after overlapping coupling as with the first female threads and second male threads providing a substantially continuous wellbore that may be radially expanded and plastically deformed at the overlapping portions of the first and second wellbore casings.

Upon coupling the first and second tubular members, such as upon coupling the first and second wellbore casings 14 and 16, as depicted in FIG. 2, a first surface portion 26 and a second surface portion 28 are adjacently positionally in the axial direction and may or may not have the same or nearly the same outside diameters 32 and 34. It would understood that according to the foregoing methods and apparatus for expanding the wellbore casing, the depiction in FIG. 2 and FIG. 3 may or may not demonstrate an overlapping portion that has been previously expanded. In either instance, it is desirable for the present invention that the exterior first outside diameter 32 and the outside diameter 34 have the same or nearly the same dimensions. Further it will be seen that a joint 30 is formed between the first and second surfaces that may include a small gap such as a bevel or partial channel on either member as is conventional for accommodating nicks or dents so that they will not interfere with complete coupling between the first and second wellbore casings.

Referring to FIG. 4, it will again be understood that the first wellbore casing 14 and the second wellbore casing 16 may or may not have been radially expanded in the embodiment depicted. A tubular sleeve 40 is positioned overlapping the first surface portion 26 of the first wellbore casings 14 and also overlapping the second surface portion 28 of the second wellbore casing 16, thereby overlapping the joint 30 and axially extending in either direction there from at least partially over the overlapping coupling as well as at least partially over a portion of casing 16 that does not overlap first wellbore casing 14.

The tubular sleeve 40 is preferably composed of electrically conductive material that are suitably malleable or flowable to be shaped mechanically, as for example copper, aluminum, light metal, and metal alloys. Steel alloys and other metal alloys with suitable electrically conductivity and with suitable malleability or suitable flow behavior may also be used. The inside diameter 42, of the tubular sleeve 40 is only slightly larger than the outside diameter of the first and second tubular members 14 and 16 at the joint 30. This means a cylindrical gap 44 between the inside surface 46 of sleeve 40 and the first and second outside surfaces 26 and 28 of wellbore casings 14 and 16, respectively. The outside diameter 48 of tubular sleeve 40 is slightly larger than the inside diameter 42 defining a thickness 49 that is relatively thin compared the thickness of the wellbore casings 14 and 16.

Figure 4:
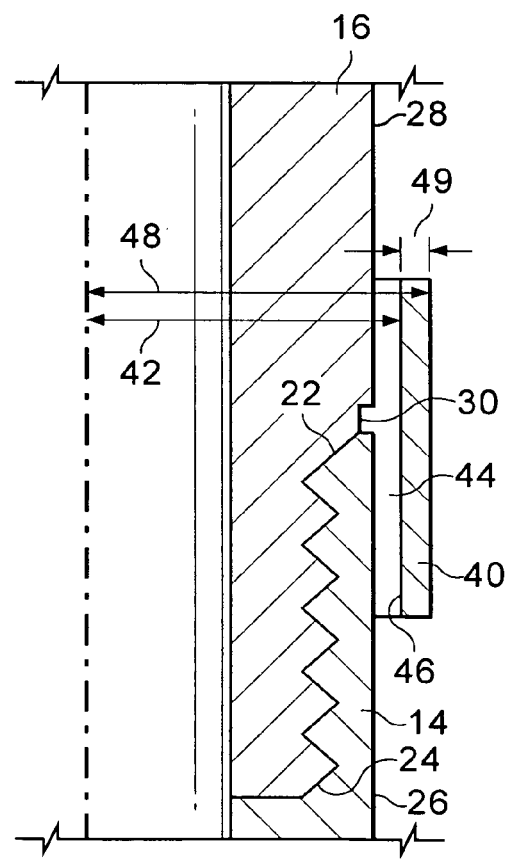
FIG. 4 is a fragmentary cross-sectional schematic illustration coupling joint of FIG. 3 after placing a tubular sleeve axially aligned with the first and second wellbore casings, and overlappingly positioned at the joint formed by coupling the first and second wellbore casings.
Figure 5:
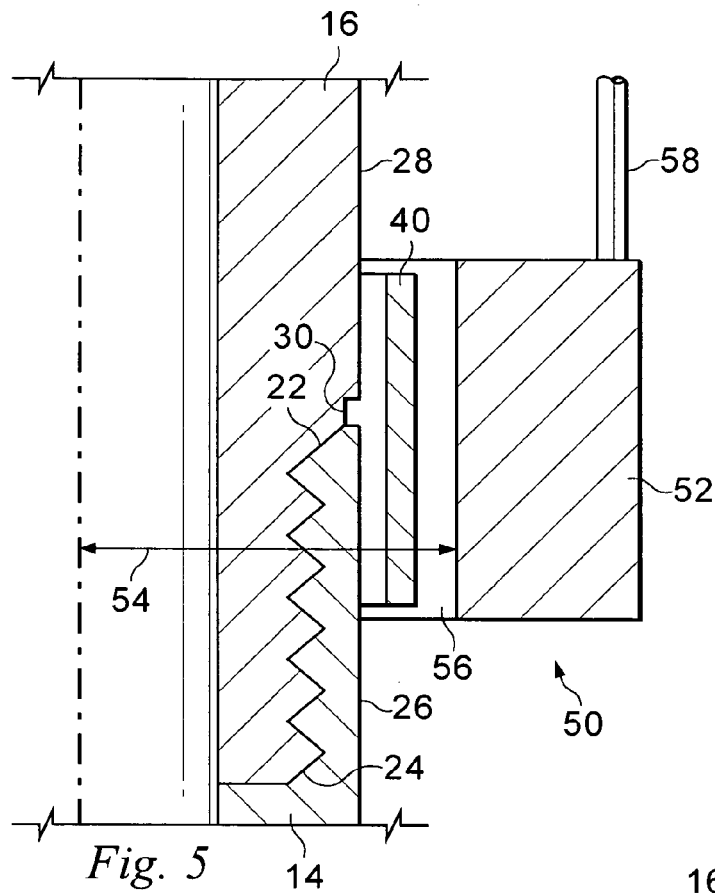
FIG. 5 is a fragmentary cross-sectional schematic illustration of the first and second wellbore casings and of the tubular sleeve of FIG. 4 and further schematically depicting one illustration of a magnetic impulse apparatus positioned at the tubular sleeve for externally applying the tubular sleeve for improved sealing of the joint formed by coupling the wellbore casings together.

FIG. 5 is a schematic illustration of the overlapping wellbore casings 14 and 16 and the overlapping tubular sleeve 40, as in FIG. 4, and further schematically depicts a magnetic impulse energy applicator 50. The impulse energy applicator 50, according to one aspect of the present invention, is aligned with the tubular sleeve 40 at a position overlapping the joint 30 and extending a distance over the surfaces 26 and 28 on either side of the joint 30. The magnetic impulse apparatus 50 may comprise an impulse conductor ring 52 having an inside diameter 54 slightly larger than the outside diameter of the ring 40, thereby leaving a small cylindrical gap 56 therebetween. Conductor ring 52 is interrupted with a radially extending gap (not shown) and is operatively connected to an impulse generator 58 such that the magnetic impulse power flows circumferentially around conductor ring 52 when applied from the impulse generator 58. This method applied to joints of wellbore casing has not heretofore been known, although there are conventional devices and it is a conventional concept for providing a magnetic impulse for shaping of cylindrical metal parts. Thus, the adaptation of one or more of the methods and apparatus according to one or more of the following may be used in connection with this aspect of the present invention: (1) U.S. Pat. No. 5,444,963 issued to Steingroever, et al., Aug. 29, 1995; (2) U.S. Pat. No. 5,586,460 issued to Steingroever Dec. 24, 1996; (3). U.S. Pat. No. 5,953, 805 issued to Steingroever Sep. 21, 1999, as well as the techniques and apparatus described on the web page of Magnetic-Physics, Inc. with reference to the shaping technique under the trademark Magnetopuls, (http://www.magnet-physics.com/st_magnetopuls.html), a copy of which is attached hereto as Exhibit A, and the disclosures of which are incorporated by reference.

Figure 6:
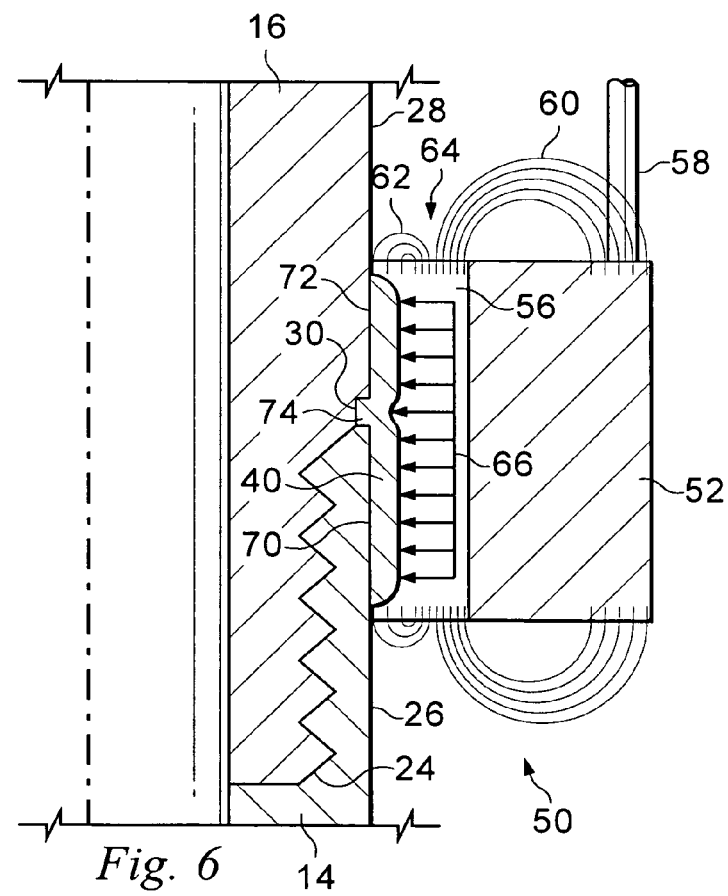
FIG. 6 is a fragmentary cross-sectional schematic illustration of the apparatus of FIG. 5, after applying magnetic impulse force to the tubular sleeve for improved sealing of the joint formed by coupling the first and second wellbore casings of FIG. 5.

With reference to FIG. 6, the method of applying the tubular sleeve to the joint of wellbore casing 14 and 16 may be more fully understood. The magnetic impulse generator 58 provides a magnetic impulse to the conductor ring 52. The magnetic impulse causes a powerful magnetic field 60 to be produced and simultaneously causes a counter current magnetic pulse 62 to be produced within tubular sleeve 40. An extremely high concentration of magnetic flux at 64 results in the gap 56 between tubular sleeve 40 and conductor ring 52. This high flux concentration due to the magnetic impulse generates a large force 66 inward from the ring 52 thereby collapsing tubular sleeve 40 onto the surfaces 26 and 28 at the joint. This effectively forms a first sealing interface 70 between the first surface 26 and the inside surface 44 of the tubular sleeve, and also forms a second sealing interface 72 between the inside surface 44 of the tubular sleeve and the surface 28 of the second wellbore casing. With sufficiently high force, the malleable or flowable material from which tubular sleeve 40 is made, flows at 74 into the joint gap 30. This method produces a surface to surface air tight metallic seal entirely over the coupling between the first wellbore casing 14 and the second wellbore casing 16. The strength of the tubular sleeve 40 also holds the joint together during the process of mechanical expansion of the wellbore casing at the joint.

Figure 7:
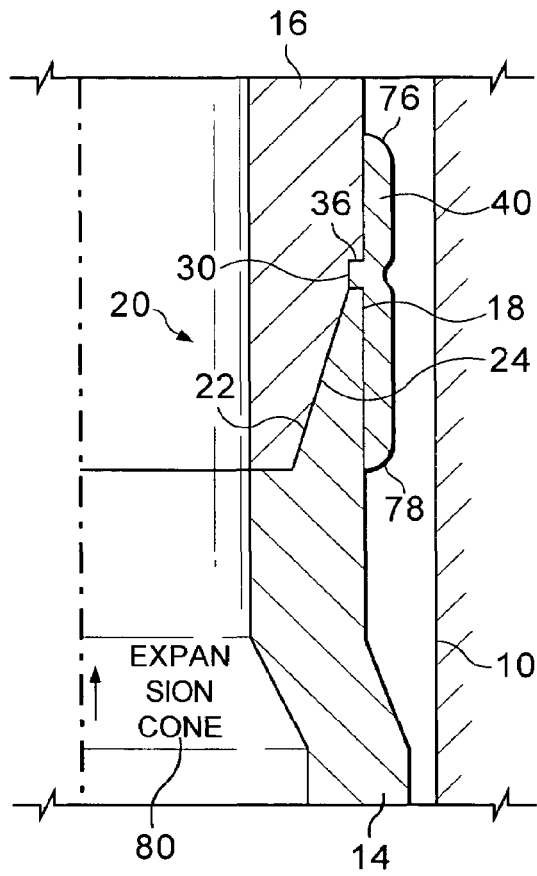
FIG. 7 is a fragmentary cross-sectional schematic illustration of a joint of a first and second tubular member, such as a first and second wellbore casing, having a tubular sleeve externally applied to the adjacent external surfaces of the first and second tubular members at the overlapping joint there between prior to expanding the first and second tubular members at the area of the joint, according to one aspect of the present invention.
Figure 8:
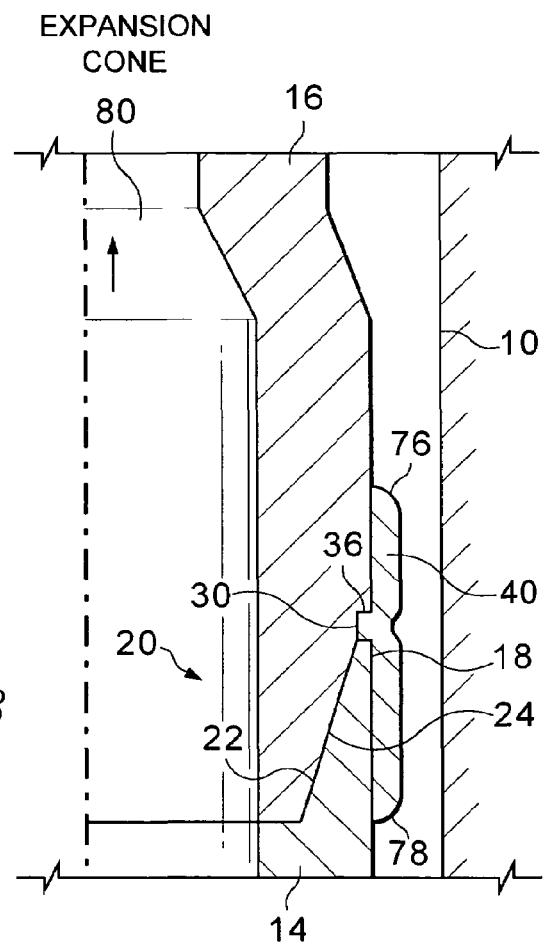
FIG. 8 is a fragmentary cross-sectional schematic illustration of the apparatus of FIG. 7, after the coupled portion of the first and second tubular member wellbore casings and the externally applied tubular sleeve have been radially expanded and plastically deformed according to one aspect of the present invention.

In an exemplary embodiment, as illustrated in FIGS. 7 and 8, the first and second tubular members, 14 and 16, and the tubular sleeve 40 may then be positioned within another structure 10 such as, for example, a wellbore 10, and radially expanded and plastically deformed, for example, by moving an expansion cone 80 through the interiors of the first and second tubular members 14 and 16. The tapered portions, 76 and 78, of the tubular sleeve 40 as may result from material flow due to large magnetic force of the type of material of sleeve 40 and facilitate the insertion and movement of the first and second tubular members 14 and 16 within and through the structure 10, and the movement of the expansion cone 80 through the interiors of the first and second tubular members, 14 and 16, may be from top to bottom or from bottom to top.

In an exemplary embodiment, during the radial expansion and plastic deformation of the first and second tubular members, 14 and 16, the tubular sleeve 40 is also radially expanded and plastically deformed. In an exemplary embodiment, as a result, the tubular sleeve 40 may be maintained in circumferential tension and the overlapping end coupling portions, 18 and 20, of the first and second tubular members, 14 and 16, may be maintained in circumferential compression.

Figure 9:
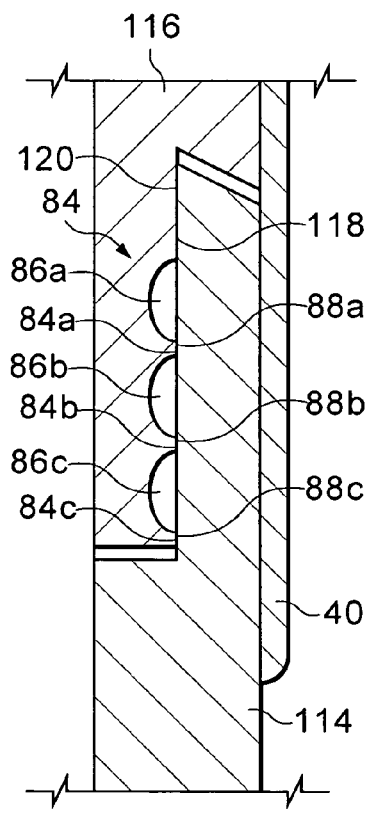
FIG. 9 is a fragmentary cross-sectional schematic illustration of the first female coupling and second male coupling and overlapping tubular sleeve with raised ridges interposed between the couplings to increase the surface to surface contact stress for maintaining sealing contact upon expanding and plastically deforming the coupling and tubular sleeve at the overlapping portions of the first and second tubular members.

In FIG. 9, a fragmentary cross-sectional schematic illustration shows an exemplary embodiment of method and apparatus in which first and second tubular members 114 and 116 are overlapping coupled together, as with a first coupling portion 118 and a second coupling portion 120 pressed together in surface-to-surface engagement, and with an overlapping tubular sleeve 40 applied to the exterior thereof and providing a substantially continuous tubular assembly that may be expanded and plastically deformed. The first coupling portion 118 and the second coupling portion 120 may be overlappingly coupled together, as with a first female coupling portion and a second male coupling portion pushed, slid or pressed together in surface-to-surface engagement. An overlapping tubular sleeve 40 is applied to the coupling to provide sealing and to stress the tubular coupling portions toward each other. In an exemplary embodiment, one or more raised ridge rings 84(*a-c*) and corresponding trough rings 86(*a-c*) are formed interposed between the first and second couplings to increase the surface to surface contact stress for maintaining sealing contact upon expanding and plastically deforming the coupling and tubular sleeve at the overlapping portions of the first and second tubular members. In this method and apparatus the peaks 88(*a-c*) of the ridges 84(*a-c*) have a small area of surface contact with the opposed coupling portion, compared to the entire overlapping coupling area, such that the stress or force per area of contact is significantly increased thereby facilitating the surface to surface seal at the coupling joint. Although the ridge rings 84 are shown formed in the second male coupling portion with the peaks toward the first female male coupling portion, it will be understood based upon this disclosure that the ridge rings 84 might alternatively be formed on the female coupling portion 118 with the peaks toward the female coupling portion 120. Also, although a specific number of ridge rings are depicted having particular shapes, a greater or lesser number of ridges having different or modified shapes may be provided consistent with this aspect of the present invention. The tubular sleeve 40 as applied to the exterior of the overlapping tubular members increases the sealing stress. In a further exemplary embodiment, the tubular sleeve 40 acting together with the raised ridge rings 84 work together to maintain the seal when the tubular members 114 and 116 are expanded and plastically deformed as disclosed herein.

Figure 10:
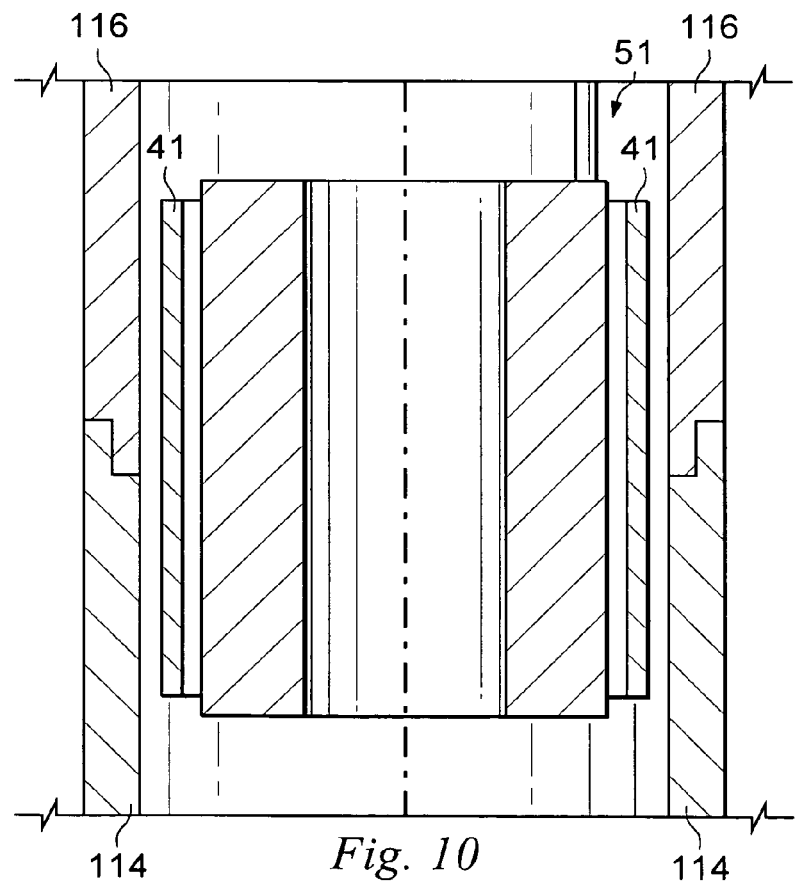
FIG. 10 is a fragmentary cross-sectional schematic illustration of an alternative embodiment of the invention in which an interior tubular sleeve is aligned with the coupling joint between tubular members and the interior tubular sleeve is forced outward and applied to the interior surfaces of the tubular members by a magnetic impulse device.

FIG. 10 depicts another exemplary embodiment of the invention in which an interior tubular sleeve 41 is aligned with coupling joint between tubular members 114 and 116. Before or after expanding the tubular members the interior tubular sleeve 41 is forced outward by magnetic impulse device 51 in a conventional manner or by the adaptation of one of more of the methods and apparatus according to one or more of the following may be used in connection with this aspect of the present invention: (1) U.S. Pat. No. 5,444,963 issued to Steingroever, et al., Aug. 29, 1995; (2) U.S. Pat. No. 5,586,460 issued to Steingroever Dec. 24, 1996; (3). U.S. Pat. No. 5,953, 805 issued to Steingroever Sep. 21, 1999, as well as the techniques an apparatus is described on the web page of Magnetic-Physics, Inc., with reference to the shaping technique under the trademark Magnetopuls, (http://www.magnet-physics.com/st_magnetopuls. html), a copy of which is attached hereto as Exhibit A, and the disclosures of which are incorporated by reference. The interior sleeve 41 is applied to the interior surfaces of the tubular members overlapping the coupling joint and thereby facilitates sealing and connection between the tubular members.

As more fully disclosed below and as referenced in co-pending U.S. provisional patent application No. 60/405,610, filed on even date herewith and the disclosure of which is incorporated herein by reference, one or more layers or coatings of softer material, such as plastic, solder, or metallic material having a modulus of elasticity lower than the modulus of elasticity of the tubular members at the coupling joint, may be interposed between the joints, to facilitate sealing before and after expanding and plastically deforming joined tubular members such as wellbore casings. The interposed material may also be a material of the type having a lower melting point before deformation than after deformation. For example the material may be an exothermic material that initially releases energy upon stress or heat input thereby melting or plastically flowing at one temperature and subsequently without the further release of such heat energy having a higher melting point or plastic flow temperature.

In several exemplary embodiments, the first and second tubular members, 14 and 16, are radially expanded and plastically deformed using the expansion cone 80 in a conventional manner and/or using one or more of the methods and apparatus disclosed in one or more of the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. patent application Ser. No. 09/440,338, filed on Nov. 15, 1999, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application serial no. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S. provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001; (31) U.S. provisional patent application Ser. No. 60/343,674, filed on Dec. 27, 2001; (32) U.S. provisional patent application Ser. No. 60/346,309, filed on Jan. 7, 2002; (33) U.S. provisional patent application Ser. No. 60/372,048, filed on Apr. 12, 2002; (34) U.S. provisional patent application Ser. No. 60/380,147, filed on May 6, 2002; (35) U.S. provisional patent application Ser. No. 60/387,486, filed on Jun. 10, 2002; (36) U.S. provisional patent application Ser. No. 60/387,961, filed on Jun. 12, 2002; (37) U.S. provisional patent application Ser. No. 60/391,703, filed on Jun. 26, 2002; and (38) U.S. provisional patent application Ser. No. 60/397,284, filed on Jul. 19, 2002, (39) U.S. provisional patent application Ser. No. 60/398,061, filed on Jul. 24, 2002, and (40) U.S. provisional patent application No. 60/339,240, filed on Jul. 29, 2002, and (41) U.S. provisional patent application No. 60/405,610, filed on even date herewith, the disclosures of which are incorporated herein by reference.

In several alternative embodiments, the first and second tubular members, 14 and 16, are radially expanded and plastically deformed using other conventional methods for radially expanding and plastically deforming tubular members such as, for example, internal pressurization and/or roller expansion devices such as, for example, that disclosed in U.S. patent application publication no. US 2001/0045284 A1, the disclosure of which is incorporated herein by reference.

The use of the tubular sleeve during (a) the coupling of the first tubular member to the second tubular member, (b) the placement of the first and second tubular members in the structure, (c) the radial expansion and plastic deformation of the first and second tubular members, and (d) magnetic impulse applying tubular sleeve to the overlapping coupling ends between the first and second tubular members provides a number of significant benefits. For example, the tubular sleeve 40 protects the exterior surfaces of the end portions, 18 and 20, of the first and second tubular members, 14 and 16, during handling and insertion of the tubular members within the structure 10. In this manner, damage to the exterior surfaces of the end portions, 18 and 20, of the first and second tubular member, 14 and 16, are prevented that could result in stress concentrations that could result in a catastrophic failure during subsequent radial expansion operations. In this manner, misalignment that could result in damage to the threaded connections, 22 and 24, of the first and second tubular members, 14 and 16, may be avoided. In addition, the relative rotation of the second tubular member with respect to the first tubular member, after the threaded coupling of the first and second tubular members is resisted by the tubular sleeve 40. Tubular sleeve 40 may also provide an indication of to what degree the first and second tubular members are threadably coupled. For example, if the tubular sleeve 40 can be easily rotated, that would indicate that the first and second tubular members, 14 and 16, are not fully threadably coupled and in intimate contact with the internal flange 36 of the tubular sleeve. Furthermore, the tubular sleeve 16 may prevent crack propagation during the radial expansion and plastic deformation of the first and second tubular members, 14 and 16. In this manner, failure modes such as, for example, longitudinal cracks in the end portions, 18 and 20, of the first and second tubular members may be limited in severity or eliminated all together. In addition, after completing the radial expansion and plastic deformation of the first and second tubular members, 14 and 16, the tubular sleeve 40 may provide a fluid tight metal-to-metal seal between interior surface of the tubular sleeve and the exterior surfaces of the end portions, 18 and 20, of the first and second tubular members. In this manner, fluidic materials are prevented from passing through the threaded connections, 22 and 24, of the first and second tubular members, 14 and 16, into the annulus between the first and second tubular members and the structure 10. Furthermore, because, following the radial expansion and plastic deformation of the first and second tubular members, 14 and 16, the tubular sleeve 40 may be maintained in circumferential tension and the end portions, 18 and 20, of the first and second tubular members, 14 and 16, may be maintained in circumferential compression, axial loads and/or torque loads may be transmitted through the tubular sleeve. In addition, the tubular sleeve 40 may also increase the collapse strength of the end portions, 18 and 20, of the first and second tubular members, 14 and 16.

Figure 11:
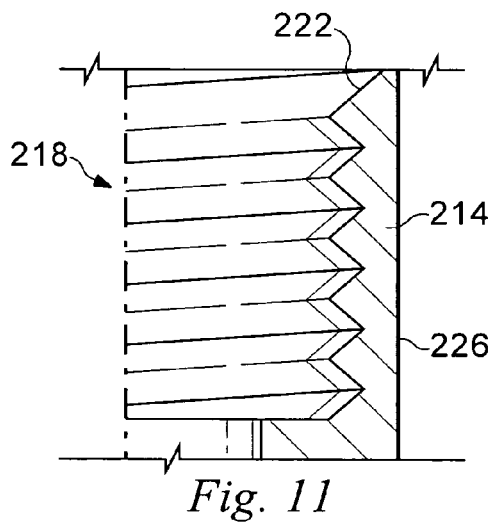
FIG. 11 is a fragmentary cross-sectional schematic illustration of a first tubular member, such as a first wellbore casing, for placement within a borehole that traverses a subterranean formation.

FIG. 11 depicts a fragmentary schematic illustration of a wellbore casing 214 having a first coupling portion 218 that may, for example, comprise threads 222.

Figure 12:
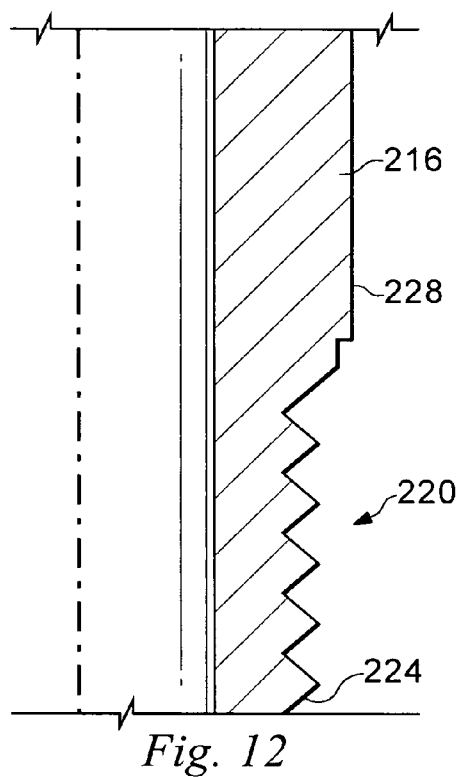
FIG. 12 is a fragmentary cross-sectional schematic illustration of a second tubular member, such as a second wellbore casing having a second threading coupling portion formed thereon for threaded coupling with the first tubular member or wellbore casing as depicted in FIG. 11.

FIG. 12 depicts a fragmentary schematic view of a second wellbore casing 216 being a coupling portion 220 formed thereon such as threaded mail coupling 224. Adjacent to the coupling portion will be cylindrical surface portion 228.

Figure 13:
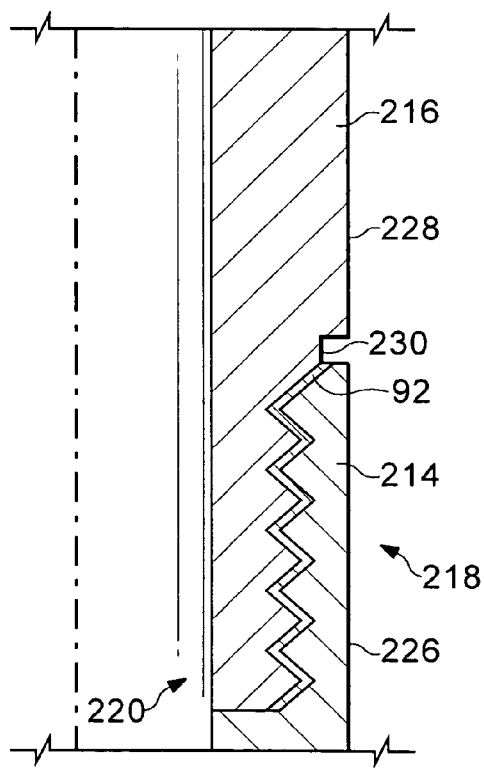
FIG. 13 is a fragmentary cross-sectional illustration of the and second wellbore casings of FIGS. 11 and 12 threadably coupled with a tubular insert interproposed between the first threaded coupling and portion and the second threaded coupling portion.

With reference to FIG. 13 which is a schematic depiction of wellbore casing 214 coupled to wellbore casing 216 at a joint 230, the wellbore casing 214 and 216 are formed with their coupling portions 218 and 220 appropriately sized to leave a gap 91 there between. The gap 91 is, according to one exemplary embodiment, depicted in FIG. 13 filled with an interposed material layer 92. The interposed layer 92 is preferably a material that is softer than the wellbore casing 214 and 216 at their coupling portions 218 and 220. In an exemplary embodiment, the interposed layer 92 may be composed of plastic or metal. It may be implied in the coils or springs and it may be an exothermic material defined as one having a low temperature during joining, a much higher temperature after influence of deformation and or temperature. Examples of the interpose material might include plastic or metals such as copper, zinc, cadmium, tin and alloy. In an exemplary embodiment, the depose layer may comprise an exothermic alloy material being one having a low melting temperature during joining and a much higher temperature after solidification of the solid joint as a result of plastic deformation stress and or temperature. The combination of the responding sizes of the coupling portion 218 and 220 such as threads 222 and 224 are calculated to determine the soft coding volume or the thickness of the interpose layer 92 in order to fill the gap before and after radial expansion and plastic deformation of the tubular members at the joint.

Figure 14:
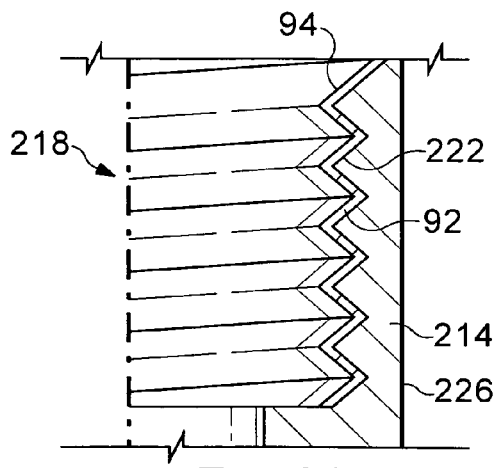
FIG. 14 is a fragmentary cross-section of the first threaded coupling of FIG. 11. The tubular insert material formed inside and coupled to the first threaded portion of the first tubular member.

FIG. 14 shows a fragmentary cross sectional view of the male coupling 218 and in particular threads 222 in which the posed layer 92 is formed by reposition or insert onto the threads 222 that 94.

Figure 15:
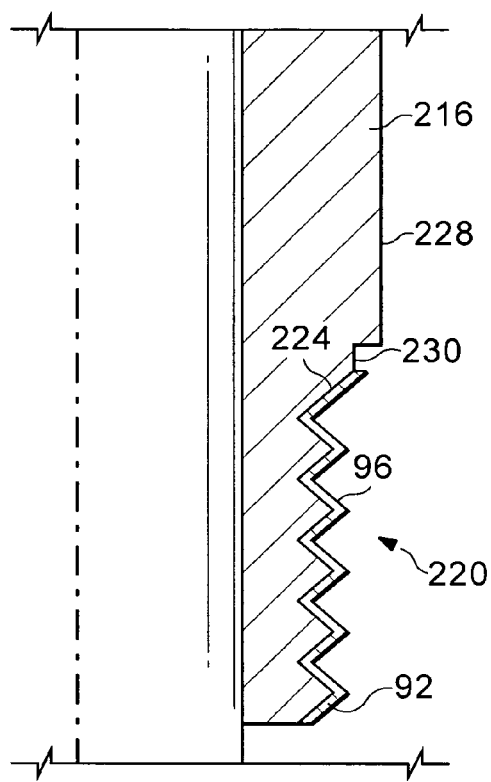
FIG. 15 is a fragmentary cross sectional schematic illustration of a second tubular member with the second threaded coupling having a tubular insert applied to the exterior of the second threaded coupling.

FIG. 15 is a fragmentary cross sectional illustration of wellbore casing 216 with the coupling portion 220 formed at male threads 224 and the interpose layer 92 deposited or attached to the threads 224 as at 96.

Figure 16:
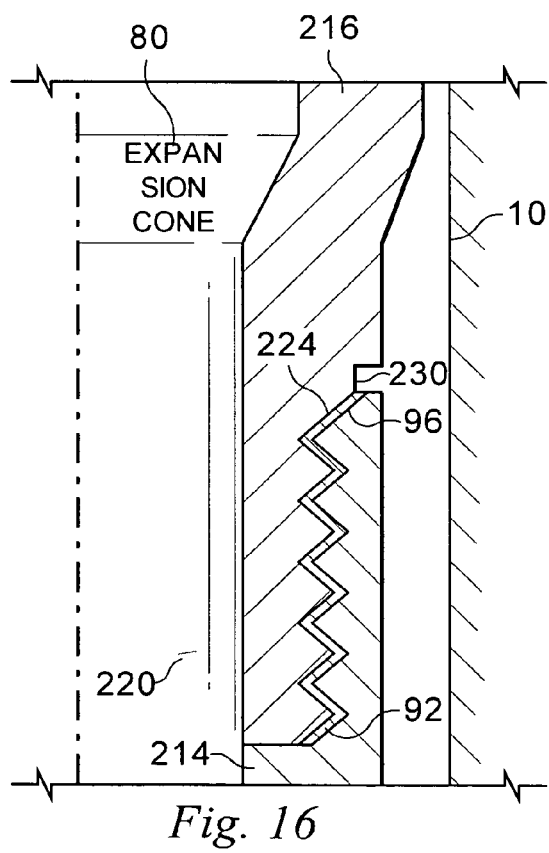
FIG. 16 is a fragmentary cross-sectional schematic illustration of the first and second tubular members coupled together with a tubular insert assembly engaged between the threads and further showing the progressive operation of an expansion cone for expanding and plastically deforming the tubular liner formed by coupling the first and second wellbore casings.

FIG. 16 schematically depicts a fragmentary illustration first casing 214 coupled to second casing 216 with the interposed layer 92 there between. Further depicted is a expansion cone 80 moving along the axis of the coupled casings thereby radially expand and plastically deform. The tubular casings and as discussed previously the overlapping coupling joint.

Figure 17:
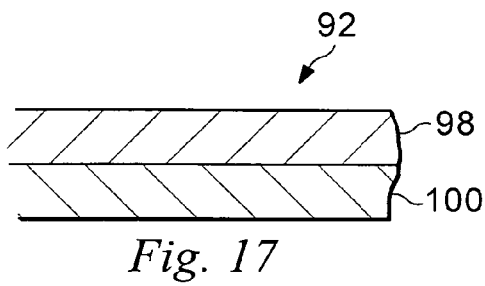
FIG. 17 is a fragmentary cross sectional schematic illustration of a multi-layer tubular insert with two layers of materials.
Figure 18:
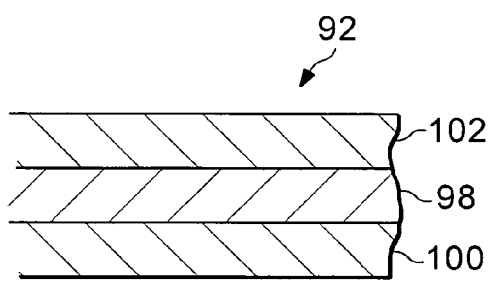
FIG. 18 is a fragmentary cross sectional schematic illustration of another embodiment of a tubular insert assembly, including a first, second, and third layer of material.
Figure 19:
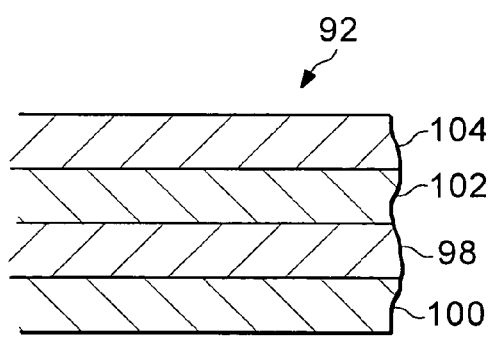
FIG. 19 is a fragmentary cross sectional schematic illustration of a multi-layer tubular insert assembly having four layers of material.

With reference to FIGS. 17, 18, and 19, it will be more fully understood that the interposed layer 92 in an illustrative example may comprise multiple layers, which has layers 98 and 100 in FIG. 17, layers 98, 100, 102 in FIG. 18 and layers 98, 100, 102, and 104 in FIG. 19. The layers are preferably each with a different modulus of elasticity such as for example in FIG. 17 layer 98 comprising a relatively harder material and layer 100 comprising a softer material, as for example copper layer 98 and a cadmium layer 100 in such an embodiment the copper may plastically deform to provide a sealing layer sealing along the entire joint surface and layer 100 cadmium may provide a micro-sealing layer.

In FIG. 18 the triple layer comprising layer 98, 100, and 102 comprise of the sealing layer 98 and the micro-sealing layer 100 in FIG. 17. Layer 102 might ventageously be another micro sealing layer more to layer 100 alternatively might be there are having an even greater modulus of elasticity than layer 98 provide additional rigidity for maintaining contact with the coupling services while the micro layer 100 and the interpose layer 98 act too effectively micro seal from the surface of the coupling in contact with layer 100 through the lay 98 and layer 102.

In FIG. 19 depicting four layers 98, 100, 102, and 104 to form the interposed lay 92 it will be understood that the combination of hard and soft layers and or exothermic materials in any relative combination might be accomplished or advantageous sealing of the coupling joint. Again, for example layer 102 might be a solid material and layer 104 might be flux for promoting sealing engagement with the coupling surface. In an illustrative example, layer 102 might be an alloy of copper, other materials that provide for a low initial melting point during a deformation and or heating and after deformation stress and or heating having a higher melting point. In this matter upon coupling and then radial expansion, layer 102 may be caused to melt with flux 104 acting in a traditional manner to allow a bonding between layer 102 and the surface of the coupling such that upon cooling and resolidifation a strong soldered joint is formed and remains sealed and that has a high melting temperature to prevent later separation.

Figure 20:
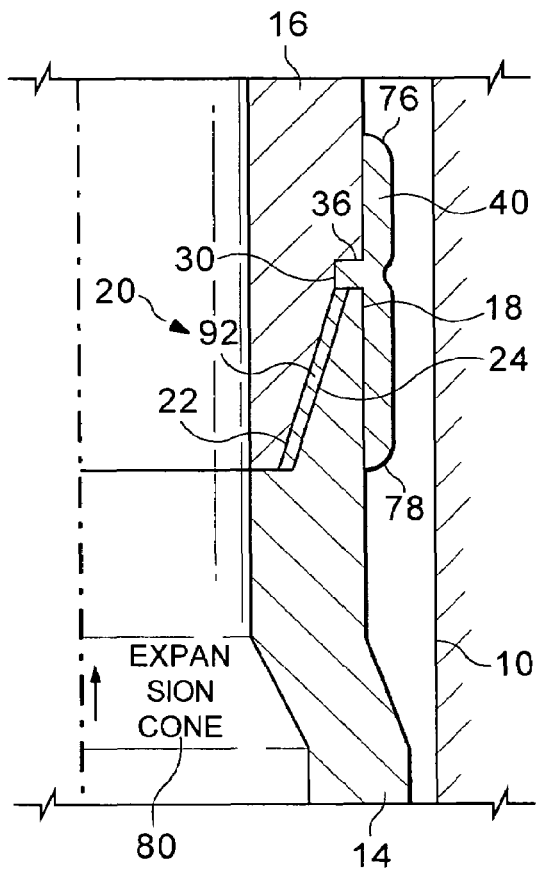
FIG. 20 is a schematic cross sectional illustration of a method step of expanding the tubular member, with an expansion cone progressing toward the coupled portion of the first and second tubular member wellbore casings and the multi-layer tubular insert according to one aspect of the present invention.

FIG. 20 depicts a coupling joint having a layer 92 interposed there between and further having a tubular sleeve 40 applied overlapping the coupling. Prior to expansion as with an expansion cone 80.

Figure 21:
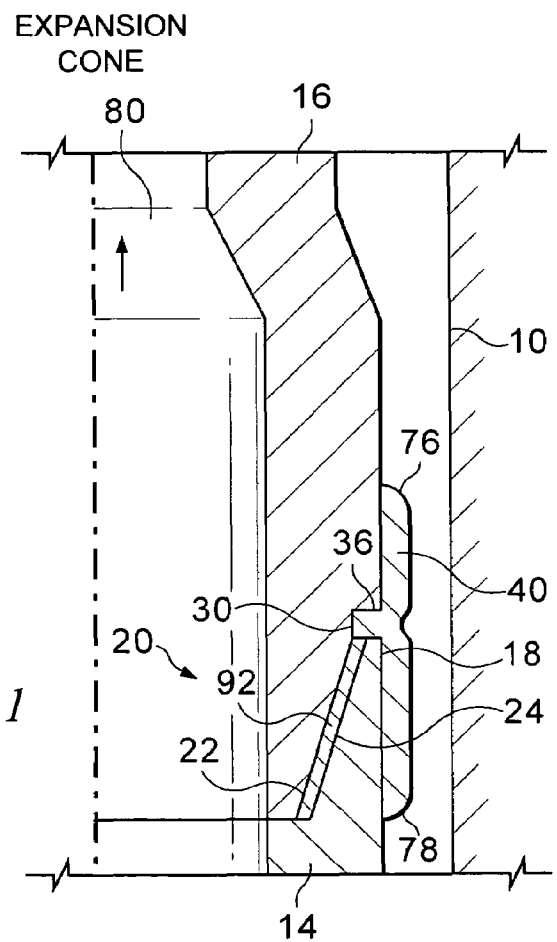
FIG. 21 is a schematic cross sectional illustration of a method step of expanding the tubular member, with an expansion cone progressing past the coupled portion of the first and second tubular member wellbore casings and the multi-layer tubular insert according to one aspect of the present invention.

FIG. 21 further depicts the method of coupling with a layer 92 interposed there between the coupling joint with the tubular sleeve 40 all having been expanded by the expansion cone 80 for retaining a tight sealing engagement between the coupling surfaces for both strength and sealing rigidity.

A useful method of forming a wellbore casing within a borehole that traverses a subterranean formation has been described that includes a first wellbore casing for positioning within the borehole and coupling the first wellbore casing to a second wellbore casing for positioning within the borehole such that the second wellbore casing overlaps with and is coupled to a portion of the first wellbore casing thereby forming a joint, positioning a tubular sleeve so that it overlaps with and is coupled to at least a portion of the first wellbore casing and to a portion of the second wellbore casing, the tubular sleeve extending a length in either axial direction from the joint between the first and second wellbore casings, causing the tubular sleeve to collapse inwardly onto the respective end portions of the first and second wellbore casings and to sealingly engage the exterior surfaces of the end portions of the first and second wellbore casings respectively on either side of the joint there between, thereby facilitating sealing the joint.

In an exemplary embodiment, the method further includes regularly expanding and plastically deforming the overlapping portions of the first and second wellbore casing and regularly expanding and plastically deforming the tubular sleeve that was sealingly collapsed onto the overlapping portions of the first and second wellbore casings. In an exemplary embodiment, the exterior diameters of the first and second wellbore casings axially adjacent to the joint there between are substantially equal. In an exemplary embodiment, the inside diameters of the first wellbore casings and the inside diameter of the second wellbore casing are substantially equal. In an exemplary embodiment, the inside diameters of the first wellbore casing and the second wellbore casing are substantially constant.

It will further understood by those skilled in the art upon reading the foregoing disclosure and the claims that follow, and upon review of the drawings that the method may further include forming a wellbore casing within a borehole that traverses a subterranean formation including positioning first wellbore casing, second wellbore casing and additional wellbore casings within the borehole that overlaps one with the other and that are coupled to one another at a joint between each successive wellbore casing. In the method with additional wellbore casings would further includes additional tubular sleeves positioned to overlap each successive joint of the successive wellbore casings and causing each sleeve to collapse inwardly onto the respective end portions of the first, second, and additional wellbore casings to sealingly engage the exterior surfaces of the respective end portions. The method further includes the use of magnetic impulse energy to collapse the tubular sleeves onto the surfaces of the wellbore casings at the joints thereof, thereby facilitating sealing of the joints.

It is understood that variations may be made in the foregoing without departing from the scope of the invention. For example, the teachings of the present illustrative embodiments may be used to provide a wellbore casing, a pipeline, or a structural support. Furthermore, the elements and teachings of the various illustrative embodiments may be combined in whole or in part in some or all of the illustrative embodiments.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A method of forming a wellbore casing within a borehole that traverses a subterranean formation, comprising:
    assembling a tubular liner by a process comprising:
        coupling a multi-layer tubular insert assembly to a threaded portion of a first tubular member; and
        coupling a threaded portion of a second tubular member to the threaded portion of the first tubular member and the multi-layer tubular insert;
    positioning the tubular liner assembly within the borehole; and
    radially expanding and plastically deforming the tubular liner assembly within the borehole;
    wherein the multilayer tubular insert comprises:
        a first tubular insert having a first modulus of elasticity; and
        a second tubular insert coupled to the first tubular insert having a second modulus of elasticity;
        wherein the first modulus of elasticity is different from the second modulus of elasticity.

2. The method of claim 1, wherein the first and second tubular inserts comprise metallic materials.

3. The method of claim 2, wherein the first tubular insert comprises copper; and wherein the second tubular insert comprises cadmium.

4. The method of claim 1, wherein the modulus of elasticities of the first and second tubular inserts are less than the modulus of elasticities of the first and second tubular members.

5. The method of claim 1, wherein the modulus of elasticity for at least one of the tubular inserts is less than the modulus of elasticity of the first and second tubular members.

6. The method of claim 1, wherein the melting point for at least one of the tubular inserts prior to the radial expansion and plastic deformation is less than the melting point after the radial expansion and plastic deformation.

7. The method of claim 1, wherein at least one of the tubular inserts releases energy during the radial expansion and plastic deformation.

8. The method of claim 1, wherein assembling the tubular liner further comprises: coupling a tubular sleeve to the first and second tubular member.

9. The method of claim 8, wherein the sleeve receives the first and second tubular members.

10. The method of claim 8, wherein the sleeve is received within the first and second tubular members.

11. The method of claim 1, wherein assembling the tubular liner further comprises:
    concentrating contact stresses between the first and second tubular member.

12. A method of forming a wellbore casing within a borehole that traverses a subterranean formation, comprising:
    assembling a tubular liner by a process comprising:
        coupling a multilayer tubular insert assembly to a threaded portion of a first tubular member; and
        coupling a threaded portion of a second tubular member to the threaded portion of the first tubular member and the multilayer tubular insert;
    positioning the tubular liner assembly within the borehole; and
    radially expanding and plastically deforming the tubular liner assembly within the borehole;
    one of the layers of the multilayer tubular insert providing a fluidic seal after radially expanding and plastically deforming the tubular liner assembly; and
    another one of the layers of the multilayer insert providing a micro fluidic seal after radially expanding and plastically deforming the tubular liner assembly.

13. The method of claim 12, wherein the modulus of elasticity for at least one of the layers of the multilayer insert is less than the modulus of elasticity of the first and second tubular members.

14. The method of claim 12, wherein the melting point for at least one of the layers of the multilayer insert prior to the radial expansion and plastic deformation is less than the melting point after the radial expansion and plastic deformation.

15. The method of claim 12, wherein at least one of the layers of the multilayer insert releases energy during the radial expansion and plastic deformation.

16. The method of claim 12, wherein assembling the tubular liner further comprises:
    coupling a tubular sleeve to the first and second tubular member.

17. The method of claim 16, wherein the sleeve receives the first and second tubular members.

18. The method of claim 16, wherein the sleeve is received within the first and second tubular members.

19. The method of claim 12, wherein assembling the tubular liner further comprises:
    concentrating contact stresses between the first and second tubular member.

20. A method of forming a wellbore casing within a borehole that traverses a subterranean formation, comprising:
    assembling a tubular liner by a process comprising:
        coupling a multi-layer tubular insert assembly to a threaded portion of a first tubular member;
        coupling a threaded portion of a second tubular member to the threaded portion of the first tubular member and the multi-layer tubular insert; and
        positioning a portion of the multi-layer tubular insert within a joint gap between the first tubular member and the second tubular member;
    positioning the tubular liner assembly within the borehole; and
    radially expanding and plastically deforming the tubular liner assembly within the borehole.

21. The method of claim 20, wherein assembling the tubular liner further comprises:
    coupling a tubular sleeve to the first and second tubular member.

22. The method of claim 21, wherein the sleeve receives the first and second tubular members.

23. The method of claim 21, wherein the sleeve is received within the first and second tubular members.

24. The method of claim 20, wherein assembling the tubular liner further comprises:
    concentrating contact stresses between the first and second tubular member.

25. The method of claim 20, wherein the modulus of elasticity for at least one of the layers of the multilayer insert is less than the modulus of elasticity of the first and second tubular members.

26. The method of claim 20, wherein the melting point for at least one of the layers of the multilayer insert prior to the radial expansion and plastic deformation is less than the melting point after the radial expansion and plastic deformation.

27. The method of claim 20, wherein at least one of the layers of the multilayer insert releases energy during the radial expansion and plastic deformation.

28. A method of forming a wellbore casing within a borehole that traverses a subterranean formation, comprising:
assembling a tubular liner by a process comprising:
positioning a multi-layer tubular sleeve within a first tubular member and a second tubular member;
coupling an end of the first tubular member to an end of the second tubular member; and
coupling the multi-layer tubular sleeve to the end of the second tubular member and the end of the first tubular member;
positioning the tubular liner assembly within the borehole; and
radially expanding and plastically deforming the tubular liner assembly within the borehole.

29. The method of claim 28, wherein assembling the tubular liner further comprises:
concentrating contact stresses between the first and second tubular member.

30. The method of claim 28, wherein the melting point for at least one of the layers of the multilayer sleeve prior to the radial expansion and plastic deformation is less than the melting point after the radial expansion and plastic deformation.

31. The method of claim 28, wherein at least one of the layers of the multilayer sleeve releases energy during the radial expansion and plastic deformation.

32. The method of claim 28, wherein the multilayer tubular sleeve comprises:
a first tubular insert having a first modulus of elasticity; and
a second tubular insert coupled to the first tubular insert having a second modulus of elasticity;
wherein the first modulus of elasticity is different from the second modulus of elasticity.

33. The method of claim 32, wherein the first and second tubular inserts comprise metallic materials.

34. The method of claim 33, wherein the first tubular insert comprises copper; and wherein the second tubular insert comprises cadmium.

35. The method of claim 32, wherein the modulus of elasticities of the first and second tubular inserts are less than the modulus of elasticities of the first and second tubular members.

36. A tubular liner apparatus, comprising:
a first tubular member comprising a threaded portion;
a multi-layer tubular insert coupled to the threaded portion of the first tubular member; and
a second tubular member comprising a threaded portion coupled to the threaded portion of the first tubular member and the multi-layer tubular insert;
wherein the multilayer tubular insert comprises:
a first tubular insert having a first modulus of elasticity; and
a second tubular insert coupled to the first tubular insert having a second modulus of elasticity;
wherein the first modulus of elasticity is different from the second modulus of elasticity.

37. The apparatus of claim 36, wherein the first and second tubular inserts comprise metallic materials.

38. The apparatus of claim 37, wherein the first tubular insert comprises copper; and wherein the second tubular insert comprises cadmium.

39. The apparatus of claim 36, wherein the modulus of elasticities of the first and second tubular inserts are less than the modulus of elasticities of the first and second tubular members.

40. The apparatus of claim 36, wherein the melting point for at least one of the tubular inserts prior to a radial expansion and plastic deformation is less than the melting point after the radial expansion and plastic deformation.

41. The apparatus of claim 36, wherein at least one of the tubular inserts releases energy during a radial expansion and plastic deformation.

42. The apparatus of claim 36, wherein the apparatus further comprises: a tubular sleeve coupled to the first and second tubular member.

43. The apparatus of claim 42, wherein the sleeve receives the first and second tubular members.

44. The apparatus of claim 42, wherein the sleeve is received within the first and second tubular members.

45. The apparatus of claim 36, wherein the apparatus further comprises:
means for concentrating contact stresses between the first and second tubular members.

46. A tubular liner apparatus, comprising:
a first tubular member comprising a threaded portion;
a multi-layer tubular insert coupled to the threaded portion of the first tubular member; and
a second tubular member comprising a threaded portion coupled to the threaded portion of the first tubular member and the multi-layer tubular insert;
wherein one of the layers of the multilayer tubular insert provide a fluidic seal; and
wherein another one of the layers of the multilayer insert provide a micro fluidic seal.

47. The apparatus of claim 46, wherein the modulus of elasticity for at least one of the layers of the multilayer insert is less than the modulus of elasticity of the first and second tubular members.

48. The apparatus of claim 46, wherein the melting point for at least one of the layers of the multilayer insert prior to a radial expansion and plastic deformation is less than the melting point after the radial expansion and plastic deformation.

49. The apparatus of claim 46, wherein at least one of the layers of the multilayer insert releases energy during a radial expansion and plastic deformation.

50. The apparatus of claim 46, further comprising:
a tubular sleeve coupled to the first and second tubular member.

51. The apparatus of claim 50, wherein the sleeve receives the first and second tubular members.

52. The apparatus of claim 50, wherein the sleeve is received within the first and second tubular members.

53. The apparatus of claim 46, further comprising: means for concentrating contact stresses between the first and second tubular member.

54. A tubular liner apparatus, comprising:
a first tubular member comprising a threaded portion;
a multi-layer tubular insert coupled to the threaded portion of the first tubular member and a portion of the second tubular member, a portion of the multi-layer insert coupled between the first tubular member and the second tubular member within a joint gap; and
a second tubular member comprising a threaded portion coupled to the threaded portion of the first tubular member and the multi-layer tubular insert.

55. The apparatus of claim 54, wherein the apparatus further comprises:
a tubular sleeve coupled to the first and second tubular member.

56. The apparatus of claim 55, wherein the sleeve receives the first and second tubular members.

57. The apparatus of claim 55, wherein the sleeve is received within the first and second tubular members.

58. The apparatus of claim 54, further comprising:
means for concentrating contact stresses between the first and second tubular member.

59. The apparatus of claim 54, wherein the modulus of elasticity for at least one of the layers of the multilayer insert is less than the modulus of elasticity of the first and second tubular members.

60. The apparatus of claim 54, wherein the melting point for at least one of the layers of the multilayer insert prior to a radial expansion and plastic deformation is less than the melting point after the radial expansion and plastic deformation.

61. The apparatus of claim 54, wherein at least one of the layers of the multilayer insert releases energy during a radial expansion and plastic deformation.

62. A tubular liner apparatus, comprising:
a first tubular member;
a multi-layer tubular sleeve coupled to the first tubular member; and
a second tubular member coupled to the first tubular member and the multi-layer tubular sleeve, wherein the multi-layer tubular sleeve is received within the first and second tubular members.

63. The apparatus of claim 62, further comprising:
means for concentrating contact stresses between the first and second tubular member.

64. The apparatus of claim 62, wherein the melting point for at least one of the layers of the multilayer sleeve prior to a radial expansion and plastic deformation is less than the melting point after the radial expansion and plastic deformation.

65. The apparatus of claim 62, wherein at least one of the layers of the multilayer sleeve releases energy during a radial expansion and plastic deformation.

66. The apparatus of claim 62, wherein the multilayer tubular sleeve comprises:
a first tubular insert having a first modulus of elasticity; and
a second tubular insert coupled to the first tubular insert having a second modulus of elasticity;
wherein the first modulus of elasticity is different from the second modulus of elasticity.

67. The apparatus of claim 66, wherein the first and second tubular inserts comprise metallic materials.

68. The apparatus of claim 67, wherein the first tubular insert comprises copper; and wherein the second tubular insert comprises cadmium.

69. The apparatus of claim 66, wherein the modulus of elasticities of the first and second tubular inserts are less than the modulus of elasticities of the first and second tubular members.

* * * * *